United States Patent
Nakata et al.

(10) Patent No.: US 8,565,227 B2
(45) Date of Patent: Oct. 22, 2013

(54) MOBILE IP DATA COMMUNICATION SYSTEM COMPRISING A MOBILE ROUTER THAT DETECTS A CHANGE IN CONNECTION STATUS

(75) Inventors: Tsuneo Nakata, Tokyo (JP); Masahiro Ono, Tokyo (JP); Morihisa Momona, Tokyo (JP); Kazuhiro Okanoue, Tokyo (JP)

(73) Assignee: NEC Corporation, Tokyo (JP)

( * ) Notice: Subject to any disclaimer, the term of this patent is extended or adjusted under 35 U.S.C. 154(b) by 1591 days.

(21) Appl. No.: 10/526,725

(22) PCT Filed: May 21, 2004

(86) PCT No.: PCT/JP2004/007325
§ 371 (c)(1),
(2), (4) Date: Jan. 26, 2006

(87) PCT Pub. No.: WO2004/105331
PCT Pub. Date: Dec. 2, 2004

(65) Prior Publication Data
US 2006/0182128 A1      Aug. 17, 2006

(30) Foreign Application Priority Data

| May 22, 2003 | (JP) | 2003-144283 |
| Dec. 26, 2003 | (JP) | 2003-432192 |
| Apr. 30, 2004 | (JP) | 2004-135103 |

(51) Int. Cl.
*H04L 12/28* (2006.01)
(52) U.S. Cl.
USPC ........... 370/389; 370/338; 370/401; 370/328; 455/433
(58) Field of Classification Search
USPC .......... 370/338, 401, 389, 331, 328; 709/245, 709/238, 225, 227, 223
See application file for complete search history.

(56) References Cited

U.S. PATENT DOCUMENTS

| 2002/0021689 A1 | 2/2002 | Robbins et al. |
| 2002/0165982 A1* | 11/2002 | Leichter et al. ............... 709/244 |
| 2003/0016636 A1* | 1/2003 | Tari et al. ....................... 370/328 |
| 2003/0063611 A1* | 4/2003 | Schaub et al. ............. 370/395.32 |
| 2003/0108063 A1* | 6/2003 | Joseph et al. ................. 370/465 |
| 2004/0141477 A1* | 7/2004 | Xu et al. ........................ 370/328 |

FOREIGN PATENT DOCUMENTS

| JP | 62-226264 | 10/1987 |
| JP | 3-38942 | 2/1991 |

(Continued)

OTHER PUBLICATIONS

Network Mobility Support Terminology, Thierry Ernst, Wide and Inria, Hong-Yon Lach, Motorola Labs Paris, Nov. 2002, draft-ernst-nemo-terminology-01.txt, pp. 1-18.

*Primary Examiner* — Kiet Doan
*Assistant Examiner* — Dung Lam
(74) *Attorney, Agent, or Firm* — Dickstein Shapiro LLP

(57) ABSTRACT

The present invention provides a data communication technology which is capable of securing flexibly a bandwidth for a traffic that is generated and which enables effective use of access lines or wireless resource. A mobile router uses a plurality of communication means, retains a plurality of narrow band communication routes for communicating with the home agent, and configures a broad band communication route by using the plurality of the narrow band communication routes as a single logical communication route. This enables a bandwidth to be flexibly secured in accordance with the traffic which is generated in the mobile network. In this case, the home agent is enabled to effectively use the access lines by referring to the route information so as to determine the destination address. Furthermore, it is possible to save the wireless resource under the initiative of the user by dynamically connecting to an alternative line or disconnecting a line which is being used in response to a request of the user.

14 Claims, 36 Drawing Sheets

(56) References Cited

FOREIGN PATENT DOCUMENTS

| JP | 4-168825 | 6/1992 |
| JP | 5-95373 | 4/1993 |
| JP | 8-163152 | 6/1996 |
| JP | Hei 08-237717 A2 | 9/1996 |
| JP | 8-321845 | 12/1996 |
| JP | 2003-101565 A | 4/2003 |
| JP | 2003-228583 A | 4/2003 |
| WO | WO-00/13436 A2 | 3/2000 |

* cited by examiner

Fig. 5

| HOME ADDRESS | COMMUNICATION IF ADDRESS | COMMUNICATION IF NUMBER | COMMUNICATION IF TYPE | BANDWIDTH | STATUS |
|---|---|---|---|---|---|
| A.A.A.254/24 | B.B.B.200 | 1 | IMT-2000 | 384kbps | BEING REGISTERED |
| | B.B.B.201 | 2 | IMT-2000 | 384kbps | REGISTERED |
| | B.B.B.202 | 3 | IMT-2000 | 0 | BEING DELETED |
| | C.C.C.50 | 4 | WIRELESS LAN | 11Mbps | REGISTERED |

Fig. 6

| HOME ADDRESS | COMMUNICATION IF ADDRESS | COMMUNICATION IF TYPE | BANDWIDTH | NEXT PACKET TRANSMISSION ENABLING TIME |
|---|---|---|---|---|
| A.A.A.254/24 | B.B.B.200 | IMT-2000 | 384kbps | 10.01 |
| | B.B.B.201 | IMT-2000 | 384kbps | 10.03 |
| | C.C.C.50 | WIRELESS LAN | 11Mbps | 10.003 |

Fig. 9

| HOME ADDRESS | C/O ADDRESS | BANDWIDTH | BILLING SYSTEM | |
|---|---|---|---|---|
| | | | 6:00 TO 8:00 | 18:00 TO 6:00 |
| A.A.A.254/24 | B.B.B.200 | 384kbps | MEASURED-RATE (¥0.05 / PACKET) | MEASURED-RATE (¥0.05 / PACKET) |
| | B.B.B.201 | 144kbps | MEASURED-RATE (¥0.05 / PACKET) | FLAT-RATE |
| | C.C.C.50 | 11Mbps | FLAT-RATE | FLAT-RATE |

Fig. 10

| HOME ADDRESS | C/O ADDRESS | BANDWIDTH | BILLING SYSTEM | |
|---|---|---|---|---|
| | | | EASTERN JAPAN | WESTERN JAPAN |
| A.A.A.254/24 | B.B.B.200 | 384kbps | MEASURED-RATE (¥0.01 / PACKET) | MEASURED-RATE (¥0.01 / PACKET) |
| | B.B.B.201 | 144kbps | MEASURED-RATE (¥0.02 / PACKET) | FLAT-RATE |
| | C.C.C.50 | 11Mbps | FLAT-RATE | FLAT-RATE |

Fig. 19

| HOME ADDRESS | C/O ADDRESS | COMMUNICATION IF # | TYPE | BANDWIDTH | BILLING SYSTEM | STATUS |
|---|---|---|---|---|---|---|
| A.A.A..254/24 | C.C.C.50 | 1 | WIRELESS LAN | 11Mbps | MEASURED-RATE | ALREADY REGISTERED |
| | B.B.B.200 | 2 | IMT-2000 | 384kbps | MEASURED-RATE | ALREADY REGISTERED |
| | B.B.B.201 | 3 | IMT-2000 | 384kbps | MEASURED-RATE | ALREADY REGISTERED |
| | B.B.B.202 | 4 | IMT-2000 | 384kbps | MEASURED-RATE | ALREADY REGISTERED |

Fig. 20

| HOME ADDRESS | C/O ADDRESS | COMMUNICATION IF # | TYPE | BANDWIDTH | BILLING SYSTEM | STATUS |
|---|---|---|---|---|---|---|
| A.A.A..254/24 | C.C.C.50 | 1 | WIRELESS LAN | 11Mbps | FLAT-RATE | ALREADY REGISTERED |
| | B.B.B.200 | 2 | IMT-2000 | 384kbps | MEASURED-RATE | ALREADY REGISTERED |
| | B.B.B.201 | 3 | IMT-2000 | 384kbps | MEASURED-RATE | ALREADY REGISTERED |
| | B.B.B.202 | 4 | IMT-2000 | 384kbps | MEASURED-RATE | ALREADY REGISTERED |

Fig. 21

| HOME ADDRESS | C/O ADDRESS | TYPE | BANDWIDTH | BILLING SYSTEM |
|---|---|---|---|---|
| A.A.A..254/24 | C.C.C.50 | WIRELESS LAN | 11Mbps | MEASURED-RATE |
| | B.B.B.200 | IMT-2000 | 384kbps | MEASURED-RATE |
| | B.B.B.201 | IMT-2000 | 384kbps | MEASURED-RATE |
| | B.B.B.202 | IMT-2000 | 384kbps | MEASURED-RATE |

Fig. 22

| HOME ADDRESS | C/O ADDRESS | TYPE | BANDWIDTH | BILLING SYSTEM |
|---|---|---|---|---|
| A.A.A..254/24 | C.C.C.50 | WIRELESS LAN | 11Mbps | FLAT-RATE |
| | B.B.B.200 | IMT-2000 | 384kbps | MEASURED-RATE |
| | B.B.B.201 | IMT-2000 | 384kbps | MEASURED-RATE |
| | B.B.B.202 | IMT-2000 | 384kbps | MEASURED-RATE |

Fig. 24

| COMMUNICATION IF TYPE | STATUS | DOWNLOAD COMMUNICATION RATE | UPLOAD COMMUNICATION RATE | NUMBER OF RECEIVED PACKETS PER UNIT HOUR | NUMBER OF TRANSMITTED PACKETS PER UNIT HOUR | CONNECTION TIME | LINE UTILIZATION |
|---|---|---|---|---|---|---|---|
| PDC#1 | off | 0kbps | 0kbps | 0 | 0 | 0 | - |
| PDC#2 | off | 0kbps | 0kbps | 0 | 0 | 0 | - |
| UMTS#1 | on | 256kbps | 53kbps | 1260000 | 6180000 | - | 100% |
| UMTS#2 | on | 192kbps | 45kbps | 960000 | 5280000 | - | 100% |
| 1×#1 | on | 56kbps | 36kbps | 240000 | 4200000 | - | 100% |
| 1×#2 | off | 0kbps | 0kbps | 0 | 0 | - | - |
| 1×EV-DO#1 | on | 1200kbps | 120kbps | 6000000 | 14040000 | - | 100% |
| 1×EV-DO#2 | on | 500kbps | 80kbps | 2520000 | 9360000 | - | 100% |

MOBILE IP DATA COMMUNICATION SYSTEM COMPRISING A MOBILE ROUTER THAT DETECTS A CHANGE IN CONNECTION STATUS

TECHNICAL FIELD

The present invention relates to a communication technology utilizing a mobile network. More specifically, the present invention relates to an art combining lines of communication means including a same or different services so as to configure a logical line, thereby securing a broad-band access line.

BACKGROUND ART

For the purpose of sufficiently explaining the current level of the art related to the present invention, descriptions of all patents, patent applications, patent gadgets, scientific literatures and the like quoted or specified herein are incorporated herein by reference in its entirety.

Examples of a technology related to network mobility include a technology by Internet Engineering Task Force Network Mobility Working Group (IETF NEMO WG). This art will be explained hereafter referring to IETF Internet Draft (draft-ernst-nemo-terminology-01.txt) as shown in FIG. 18. The internet 002 is connected with a correspondent node 001, a home agent 003 and an access router 004. The home agent 003 is further connected to a network 005. The access router 004 is also connected to the network 006 which is connected to a mobile network 011.

The inside of the mobile network 011 is configured by a mobile network node 009, a mobile network node 010 and a mobile router 007, each of which is connected to each other through a network 008. The mobile network 011 is connected to the external network 006 via the mobile router 007 as a gateway, and is accessible to the Internet 002 via the access router 004.

The home agent 003 belongs to a home network for the mobile network 011. A home network 021 is a subnet including a Home Address (HoA) of the mobile router 007. All mobile network nodes that belong to the mobile network 011 have an address of the home network 021. The mobile network 011 is a network where all component nodes are mobile together.

In the configuration as described above, the conventional art operates as follows.

First, when the mobile network 011 moves, the mobile router 007 that serves as a connection node with the outside acquires a Care of Address (CoA) acquired in the home agent 003 that belongs to a subnet managed by the access router 004, and notifies the home agent 003 of the acquired CoA.

This address registration process operation enables the home agent 003 to understand a position of the mobile router 007.

Thereafter, when a packet addressed to an address belonging to the home network 021 reaches the home network 021, the home agent 003 receives the packet on behalf of it.

The home agent 003 uses the received packet as a payload to encapsulate it by a header with CoA as the destination and an address of CoA as the source, and transfers the packet to CoA. The mobile router 007 that has received the encapsulated packet retrieves a packet corresponding to the payload portion, and transfers it to the mobile network node, which is an actual destination.

In a similar manner, the packet transmitted from the mobile network node is encapsulated by a header with an address of the home agent 003 as the destination and CoA as the source at the mobile router 007, and is transferred to the home agent 003. The home agent 003 that has received the encapsulated packet retrieves a packet corresponding to the payload and transfers it to the actual destination. Such an interactive tunnel allows the mobile network 011 to logically exist as a subnet which is connected to the network 005 managed by the home agent 003. Accordingly, the mobile network node is capable of communicating with the correspondent node 001 without detecting mobility.

The mobile network 011 repeats an address deletion process operation from and address registration process operation in the home agent 003 every time the network is moving, so as to re-configure the interactive tunnel.

Accordingly, it is possible to continue communication also when the network is moving, without this move being detected by the mobile network node.

Moreover, the mobile router 007 is capable of using a plurality of communication interfaces for connecting to the external network. A sub-interface is used for a back-up use when the main interface breaks down.

However, in a communication method studied in the conventional NEMO, a problem is caused where the bandwidth is not wide enough for the traffic that is generated when the access line used the mobile router uses a narrow-band line.

Meanwhile, there is a service in which line with a broad band is configured by bundling access lines of the same service.

An example of the service is disclosed in the AirH" 128 kbps service internet (in the URL: http://www.ddipocket-.co.jp/data/i_air.html) by DDI Pocket Inc. Although a specific configuration of this service is unknown, this company provides a packet communication service at 128 kbps, by using an ISDN line from the wireless base station free from jitter and bundling at most four 32 kbps-lines.

Meanwhile, in order to save the wireless resource, what is common currently is that a wireless network operator, upon the request from the user to establish the line, executes a connection admission control by comparing the wireless resource status in the cell at that point and the wireless resource amount required for the line.

However, the conventional art represented by the aforementioned IETF Internet Draft (drafternst-nemo-terminology-01.txt) is used for a line exchange network.

Therefore, there are some cases where a plurality of access lines containing a same or different types of services and of which quality fluctuates in time are bundled via a packet exchange network. In this case, where there is no means for combining optimal routes (or addresses) as the destination and the route (or address) to be used is randomly determined, packets cannot be properly transmitted and many packets requiring re-transmission are generated. Accordingly, though the bundled lines cannot be effectively used, and thus the conventional art cannot be applied to the packet exchange network as it is. Note that, the service herein refers to a communication service provided by a telecommunications carrier hereinafter merely referred to as carrier). Moreover, different types of service refers not only to services provided by different carriers, but also a service with different communication systems or billing systems even if provided by a same carrier.

Moreover, when the network is moving in a wide area such as a network configured in a vehicle, communication is not always made not only within one service area. Instead, communication is more often made while the user is moving among several service areas. In this case, the same service is not always provided in the place to which the user has moved, or the existing service cannot always be maintained due to a change of an external environment. Therefore, there is a risk that communication may be interrupted or the communication band may substantially decrease.

For example, as shown in FIG. 37, the following case is assumed. The carrier X provides services x1 and x2 in an area A, the carrier X provides the service x1 and a carrier Y provides a service y1 in an area B, and the carrier Y provide the service y1 and a service y2 in an area C. A user of a network N configured in a train subscribes to the services x1 and x2 provided by the carrier X and the services y1 and y2 provided by the carrier Y The network N moves in the sequence of the area A, area B and area C.

In this case, the network N performs communication using the services x1, x2 provided by the carrier X in the area A. However, when the network N has moved to the area B, the service x2 has become unusable, whereby the amount of the data that can be transmitted decreases. Furthermore, the network N having moved to the area C has become unable to get the service provided by the carrier X, which disables the communication. Though the network N also subscribes to the service provided by the carrier Y, the conventional art is not capable of combining services provided by the different carriers, that is, the service provided by the carrier X and the service provided by the carrier Y. Therefore, the user is not able to get a service provided by the carrier Y at a place to which the user has moved. Moreover, the conventional art represented by the aforementioned IETF Internet Draft (drafternst-nemo-terminology-01.txt) has no means for saving the wireless resources without replying on a network operator.

DISCLOSURE OF THE INVENTION

Therefore, in viewing of the foregoing problems, it is an object of the present invention to provide an art securing a broadband access line in a packet exchange network by appropriately combining lines of plurality of communication means containing a same or different types of services so as to configure a logical line.

It is another object to provide an art flexibly securing a bandwidth for a traffic that is generated by appropriately combining routes (i.e., lines), and enabling effective use of access lines or wireless resource.

Moreover, the present invention enables configuration of a logical line with a communication fee of a packet exchange network for a user, and the like, being taken into consideration, by appropriately combining routes (lines) based on the policy information such as communication fee.

The $1^{st}$ invention to solve the aforementioned problem is a data communication system comprising: a home agent; a correspondent node capable of communicating with the home agent; a mobile router; and a mobile network node capable of communicating with the mobile router, the mobile router comprising:
a plurality of communication means of a communication service containing a same or different types of services;
a control table which stores an address assigned to the communication means and route information of the communication means, such that the address and the route information are associated with each other; and
transferring means which receives a packet from the mobile network node to the correspondent node, selects usable communication means based on the control table, and transfers the packet to the home agent; and the home agent comprising:
means for identifying the address assigned to the usable communication means of the mobile router;
a control table which stores the address which is identified and route information of the address, such that the address and the route information are associated with each other; and
transferring means which receives a packet from the correspondent node to the mobile network node, selects an address based on the control table, and transfers the packet to the address; wherein
a logical line is configured by combining lines of the plurality of communication means, through which the mobile network node and the correspondent node communicate with each other.

The $2^{nd}$ invention to solve the aforementioned problem is a data communication system comprising: a home agent; and a mobile router, the mobile router comprising:
a plurality of communication means of a communication service containing a same or different types of services;
a control table which stores an address assigned to the communication means and route information of the communication means, such that the address and the route information are associated with each other; and
transferring means which receives a packet, selects usable communication means based on the control table, and transfers the packet to the home agent; and
the home agent comprising:
means for identifying an address assigned to usable communication means of the mobile router;
a control table which stores the address which is identified and route information of the address, such that the address and the route information are associated with each other; and
transferring means which receives a packet, selects an address based on the control table, and transfers the packet to the address; wherein
a logical line is configured by combining lines of the plurality of communication means, through which the home agent and the mobile router communicate with each other.

The $3^{rd}$ invention to solve the aforementioned problem is a data communication system comprising; a home agent; a correspondent node capable of communicating with the home agent; a mobile router; and a mobile network node capable of communicating with the mobile router, the mobile router comprising;
a plurality of communication means which communicate with the home agent;
a control table which stores route information containing an address assigned to the plurality of communication means; and
means for receiving a packet from the mobile network node to the correspondent node, selecting at least one of the communication means based on the control table, and transferring the packet to the home agent; and
the home agent comprising:
means for identifying an address assigned to usable communication means of the mobile router;
a control table which stores route information containing the address which is identified; and
means for receiving a packet from the correspondent node addressed to the mobile network node, selecting at least one address based on the control table, and transferring the packet to the address; wherein
a logically multiplexed line is configured by combing the plurality of communication means between the mobile router and the home agent, through which the mobile network node and the correspondent node communicate with each other.

The $4^{th}$ invention to solve the aforementioned problem is as described in one of the $1^{st}$ to $3^{rd}$ invention, wherein the mobile router comprises: means for detecting a change in connection status of the communication means currently-in-use; and means for notifying the home agent of the change in connection status and an address assigned to the communication means, and
the home agent comprises means for updating, based on the notification, information in a control table that manages an address of the communication means of the mobile router.

The 5$^{th}$ invention to solve the aforementioned problem is as described in one of the 1$^{st}$ to 4$^{th}$ invention, wherein the mobile router comprises means for notifying the home agent of an address of the communication means scheduled to be disconnected, before disconnecting a currently-connected line of the communication means, and
the home agent comprises means for deleting, based on the notification, information related to an address of the communication means which the home agent is notified of, from the control table.

The 6$^{th}$ invention to solve the aforementioned problem is as described in one of the 1$^{st}$ to 4$^{th}$ invention, wherein
the mobile router comprises: means for notifying the home agent of an address of the communication means predicted to be disconnected, when an event occurs where disconnection of a currently-connected line of the communication means is predictable, and
the home agent comprises means for updating, based on the notification, information in a control table that manages an address of the mobile router.

The 7$^{th}$ invention to solve the aforementioned problem is as described in one of the 1$^{st}$ to 6$^{th}$ invention, wherein the mobile router comprises means for responding to a packet from the home agent; and
the home agent comprises: means for regularly transmitting a packet to a plurality of addresses the mobile router has; and means for determining an address as unusable if no response is made from the address to the packet, and updating information in a control table that manages an address of the mobile router.

The 8$^{th}$ invention to solve the aforementioned problem is as described in one of the 1$^{st}$ to 7$^{th}$ invention, wherein the home agent comprises: means for estimating an address of usable communication means of the mobile router based on positional information of the mobile router; and means for updating information in a control table that manages an address of the mobile router based on the estimation.

The 9$^{th}$ invention to solve the aforementioned problem is as described in one of the 1$^{st}$ to 8$^{th}$ invention, wherein the route information in the control table of the mobile router includes at least one of a type of communication means or line, a packet delay, a bandwidth of the line, or usage information.

The 10$^{th}$ invention to solve the aforementioned problem is as described in one of the 1st to 9$^{th}$ invention, wherein the route information in the control table of the home agent includes at least one of a type of communication means or line, a packet delay, a bandwidth of the line, or a timing enabling transmission of the next packet.

The 11$^{th}$ invention to solve the aforementioned problem is as described in one of the 1$^{st}$ to 10$^{th}$ invention, wherein the transferring means of the home agent is means for selecting an address to which transmission is possible by calculating a transmission timing based on the route information in the control table, so as not to generate a packet loss.

The 12$^{th}$ invention to solve the aforementioned problem is as described in one of the 1$^{st}$ to 11$^{th}$ invention, wherein the home agent selects a transmission timing and a destination address using means which is different depending on a QoS class of a received packet.

The 13$^{th}$ invention to solve the aforementioned problem is as described in one of the 1$^{st}$ to 12$^{th}$ invention, wherein the mobile router selects communication means using means which is different depending on a QoS class of a received packet.

The 14$^{th}$ invention to solve the aforementioned problem is as described in one of the 1$^{st}$ to 13$^{th}$ invention, wherein the mobile router comprises: means for monitoring a traffic amount of a mobile network node thereunder; and means for connecting and disconnecting a channel to the outside based on the traffic amount.

The 15$^{th}$ invention to solve the aforementioned problem is as described in one of the 1$^{st}$ to 14$^{th}$ invention, wherein the mobile router comprises:
a control table which manages policy information mapped to respective communication means; and
transferring means, when transferring a packet to the home agent, which selects the communication means based on the policy information and transfers the packet, and
the home agent comprises:
a control table which manages policy information mapped to respective addresses of the mobile router; and transferring means, when transferring a packet to the mobile router, which selects an address of the mobile router based on the policy information and transfers the packet, wherein utilization of a plurality of communication means is determined between the home agent and the mobile router, based on the policy information.

The 16$^{th}$ invention to solve the aforementioned problem is as described in the 15$^{th}$ invention, wherein the policy information refers to information on a communication fee of individual communication means.

The 17$^{th}$ invention to solve the aforementioned problem is as described in one of the 15$^{th}$ or 16$^{th}$ invention, wherein utilization of individual communication means is determined based on the policy information, such that a total of the communication fees is minimized.

The 18$^{th}$ invention to solve the aforementioned problem is as described in one of the 15$^{th}$ to 17$^{th}$ invention, wherein when it is assumed that:
the communication means adopts a measured-rate billing system;
the data communication system comprises "N" units of communication means, that is, the first to the N$^{th}$ communication means;
the information on the communication fee is given such that:
the first communication means has a communication unit price of a1, and a bandwidth of B1;
the second communication means has a communication unit price of a2 (>a1), and a bandwidth of B2;
as repeated in the same manner hereafter,
the Nth communication means has a communication unit price of aN (>a(N−1)) and a bandwidth of BN, and
a bandwidth required for current communication is C;
the data communication system:
finds the largest M which satisfies the inequality: C>=B1+B2+ . . . +BM, when the bandwidths of the communication means are sequentially added starting from that of the first communication means;
uses all the bandwidths of the first to the M$^{th}$ communication means; and
uses C−B1−B2− . . . −BM from of the bandwidth of the (M+1)$^{th}$ communication means, thereby
using a line such that a total of the communication fees is minimized.

The 19$^{th}$ invention to solve the aforementioned problem is as described in one of the 16$^{th}$ to 18$^{th}$ invention, uses communication means adopting a flat-rate billing system in preference to communication means adopting a measured-rate billing system.

The 20th invention to solve the aforementioned problem is as described in one of the 16th to 19th invention, wherein when it is assumed that:
the first to $M^{th}$ communication means adopts a flat-rate billing system;
the $M^{th}$ to $N^{th}$ communication means adopts a measured-rate billing system;
the data communication system comprises "N" units of communication means, that is, the first to the $N^{th}$ communication means;
a total bandwidth of the first to $M^{th}$ communication means is B0,
the information on the communication fee is given such that:
the $(M+1)^{th}$ communication means has a communication unit price of a(M+1), and a bandwidth of B(M+1); and the $(M+2)^{th}$ communication means has a communication unit price of a(M+2) (>a(M+1)), and a bandwidth of B(M+2);
as repeated in the same manner hereafter,
the $N^{th}$ communication means has a communication unit price of aN (>a(N−1)) and a bandwidth of BN, and
a bandwidth required for current communication is C,
the data communication system:
if C<=B0, uses one of the first to $M^{th}$ communication means, and
if C>B0, finds the largest L which satisfies the inequality: C>=B0+B1+B2+ . . . +BL, when the bandwidths of the communication means are sequentially added starting from that of the first communication means;
uses all the bandwidths of the first to the $L^{th}$ communication means; and
uses C−B1−B2− . . . −BL of the bandwidth of the $(L+1)^{th}$ communication means, thereby
using a line such that a total of the communication fees is minimized.

The 21st invention to solve the aforementioned problem is as described in one of the 16th to 20th invention, wherein a communication fee is changed in accordance with a date and time, and utilization of individual communication means is changed in accordance with this change.

The 22nd invention to solve the aforementioned problem is as described in one of the 16th to 21st invention, wherein the mobile router and the home agent change the policy information based on positional information of the mobile router.

The 23rd invention to solve the aforementioned problem is as described in one of the 16th to 22nd invention, wherein a communication fee is changed in accordance with a place, and utilization of individual communication means is changed in accordance with this change.

The 24th invention to solve the aforementioned problem is as described in one of the 16th to 23rd invention, wherein the home agent comprises means for including the policy information in the response message when receiving notification of an address from the mobile router, and distributing the policy information to the mobile router.

The 25th invention to solve the aforementioned problem is as described in one of the 16th to 24th invention, wherein the mobile router comprises sequence control means which controls a sequence of a received packets.

The 26th invention to solve the aforementioned problem is as described in one of the 16th to 25th invention, wherein the home agent comprises sequence control means which controls a sequence of a received packets.

The 27th invention to solve the aforementioned problem is A mobile router in a data communication system configured by a home agent; a correspondent node capable of communicating with the home agent; a mobile router; and a mobile network node capable of communicating with the mobile router, the mobile router comprising:
a plurality of communication means of a communication service containing a same or different types of services;
a control table which stores an address assigned to the communication means and route information of the communication means, such that the address and the route information are associated with each other; and
transferring means which receives a packet from the mobile network node to the correspondent node, selects usable communication means based on the control table, and transfers the packet to the home agent, and
transferring a packet addressed to the correspondent node from the mobile network node to the home agent though a line configured by combining lines of the plurality of communication means.

The 28th invention to solve the aforementioned problem is a mobile router in a data communication system configured by a home agent and a mobile router, the mobile router comprising:
a plurality of communication means of a communication service containing a same or different types of services;
a control table which stores an address assigned to the communication means and route information of the communication means, such that the address and the route information are associated with each other; and
transferring means which receives a packet, selects usable communication means based on the control table, and transfers the packet to the home agent; and
communicates with the home agent though a line which is configured by combining lines of the plurality of communication means.

The 29th invention to solve the aforementioned problem is a mobile router in a data communication system configured by a home agent; a correspondent node capable of communicating with the home agent; a mobile router; and a mobile network node capable of communicating with the mobile router, the mobile router comprising:
a plurality of communication means which communicate with the home agent;
a control table which stores route information containing an address assigned to the plurality of communication means; and
means for receiving a packet from the mobile network node to the correspondent node, selecting at least one of the communication means based on the control table, and transferring the packet to the home agent; and
transferring a packet addressed to the correspondent node from the mobile network node to the home agent though a logically multiplexed line which is configured by combing the plurality of communication means.

The 30th invention to solve the aforementioned problem is as described in one of the 27th to 29th invention, which comprises: means for detecting a change in connection status of the communication means currently-in-use; and
means for notifying the home agent of the change in connection status and an address assigned to the communication means.

The 31st invention to solve the aforementioned problem is as described in one of the 27th to 30th invention, which comprises: means for notifying the home agent of an address of the communication means scheduled to be disconnected, before disconnecting a currently-connected line of the communication means.

The 32$^{nd}$ invention to solve the aforementioned problem is as described in one of the 27$^{th}$ to 31$^{st}$ invention, which comprises means for notifying the home agent of an address of the communication means predicted to be disconnected, when an event occurs where disconnection of a currently-connected line of the communication means is predictable.

The 33$^{rd}$ invention to solve the aforementioned problem is as described in one of the 27$^{th}$ to 32$^{nd}$ invention, which comprises means for responding to a packet from the home agent for investigating a usable address.

The 34$^{th}$ invention to solve the aforementioned problem is as described in one of the 27$^{th}$ to 33$^{rd}$ invention, wherein the route information in the control table of the mobile router includes at least one of a type of communication means or line, a packet delay, a bandwidth of the line, or usage information.

The 35$^{th}$ invention to solve the aforementioned problem is as described in one of the 27$^{th}$ to 34$^{th}$ invention, which selects communication means using means which is different depending on a QoS class of a received packet.

The 36$^{th}$ invention to solve the aforementioned problem is as described in one of the 27$^{th}$ to 35$^{th}$ invention, which comprises: means for monitoring a traffic amount of a mobile network node thereunder; and means for connecting and disconnecting a channel to the outside based on the traffic amount.

The 37$^{th}$ invention to solve the aforementioned problem is as described in one of the 27$^{th}$ to 36$^{th}$ invention, which comprises:
a control table which manages policy information mapped to respective communication means; and
transferring means, when transferring a packet to the home agent, which selects the communication means based on the policy information and transfers the packet, and
which determines utilization of a plurality of communication means based on the policy information.

The 38$^{th}$ invention to solve the aforementioned problem is as described in the 37$^{th}$ invention, wherein the policy information refers to information on a communication fee of individual communication means.

The 39$^{th}$ invention to solve the aforementioned problem is as described in one of the 37$^{th}$ or 38$^{th}$ invention, wherein the transferring means determines utilization of individual communication means based on the policy information, such that a total of the communication fees is minimized.

The 40$^{th}$ invention to solve the aforementioned problem is as described in one of the 37$^{th}$ to 39$^{th}$ invention, wherein when it is assumed that:
the communication means adopts a measured-rate billing system;
the data communication system comprises "N" units of communication means, that is, the first to the N$^{th}$ communication means;
the information on the communication fee is given such that:
the first communication means has a communication unit price of a1, and a bandwidth of B1;
the second communication means has a communication unit price of a2 (>a1), and a bandwidth of B2;
as repeated in the same manner hereafter,
the N$^{th}$ communication means has a communication unit price of aN (>a(N−1)) and a bandwidth of BN, and
a bandwidth required for current communication is C,
the mobile router:
finds the largest M which satisfies the inequality: C>=B1+B2+ . . . +BM, when the bandwidths of the communication means are sequentially added starting from that of the first communication means;
uses all the bandwidths of the first to the M$^{th}$ communication means; and uses C−B1−B2− . . . −BM of the bandwidth of the (M+1)$^{th}$ communication means, thereby
using a line such that a total of the communication fees is minimized.

The 41$^{st}$ invention to solve the aforementioned problem is as described in one of the 38$^{th}$ to 40$^{th}$ invention, which uses communication means adopting a flat-rate billing system in preference to communication means adopting a measured-rate billing system.

The 42$^{nd}$ invention to solve the aforementioned problem is as described in one of the 37$^{th}$ to 41$^{st}$ invention, wherein when it is assumed that:
the first to M$^{th}$ communication means adopts a flat-rate billing system;
the Mth to N$^{th}$ communication means adopts a measured-rate billing system;
the data communication system comprises "N" units of communication means, that is, the first to the N$^{th}$ communication means;
a total bandwidth of the first to M$^{th}$ communication means is B0,
the information on the communication fee is given such that:
the (M+1)$^{th}$ communication means has a communication unit price of a(M+1), and a bandwidth of B(M+1); and the (M+2)$^{th}$ communication means has a communication unit price of a(M+2) (>a(M+1)), and a bandwidth of B(M+2);
as repeated in the same manner hereafter;
the N$^{th}$ communication means has a communication unit price of aN (>a(N−1)) and a bandwidth of BN, and
a bandwidth required for current communication is C,
the mobile router:
if C<=B0, uses one of the first to Mth communication means, and
if C>B0, finds the largest L which satisfies the inequality: C>=B0+B1+B2+ . . . +BL, when the bandwidths of the communication means are sequentially added starting from that of the first communication means; uses all the bandwidths of the first to the Lth communication means; and
uses C−B1−B2− . . . −BL of the bandwidth of the (L+1)$^{th}$ communication means, thereby
using a line such that a total of the communication fees is minimized.

The 43$^{rd}$ invention to solve the aforementioned problem is as described in one of the 37$^{th}$ to 42$^{th}$ invention, wherein a communication fee is changed in accordance with a date and time, and utilization of individual communication means is changed in accordance with this change.

The 44$^{th}$ invention to solve the aforementioned problem is as described in one of the 37$^{th}$ to 43$^{rd}$ invention, which changes the policy information based on positional information of the mobile router.

The 45$^{th}$ invention to solve the aforementioned problem is as described in one of the 37$^{th}$ to 44$^{th}$ invention, wherein a communication fee is changed in accordance with a place, and utilization of individual communication means is changed in accordance with this change.

The 46$^{th}$ invention to solve the aforementioned problem is as described in one of the 37$^{th}$ to 45$^{th}$ invention, wherein the mobile router comprises sequence control means which controls a sequence of a received packets.

The 47$^{th}$ invention to solve the aforementioned problem is a home agent in a data communication system configured by a home agent; a correspondent node capable of communicating with the home agent; a mobile router; and a mobile network node capable of communicating with the mobile router, the home agent comprising:

means for identifying an address assigned to usable communication means among communication means of a communication service containing the same or different types of services of the mobile router;
a control table which stores the identified address and route information of the address, such that the address and the route information are associated with each other; and
transferring means which receives a packet addressed to the mobile network node from the correspondent node, selects the address based on the control table, and transfers the packet to the address; and
transferring a packet addressed to the mobile network node from the correspondent node to the mobile router though a line configured by a combining lines of the plurality of communication means.

The $48^{th}$ invention to solve the aforementioned problem is a home agent in a data communication system configured by a home agent and a mobile router,
which comprises:
means for identifying an address assigned to usable communication means among communication means of a communication service containing the same or different types of services of the mobile router;
a control table which stores the identified address and route information of the address, such that the address and the route information are associated with each other; and
means which receives a packet, selects an address based on the control table, and transfers the packet to the address; and which communicates with the mobile router though a logical line configured by combining lines of the plurality of communication means.

The $49^{th}$ invention to solve the aforementioned problem is a home agent in a data communication system configured by a home agent; a correspondent node capable of communicating with the home agent; a mobile router; and a mobile network node capable of communicating with the mobile router, the home agent
comprising:
means for identifying an address assigned to usable communication means of the mobile router;
a control table which stores route information containing the identified address; and
means for receiving a packet addressed to the mobile network node from the correspondent node, selecting at least one of the addresses of the mobile router based on the control table, and transferring the packet to the address; and
communicating with the mobile router though a logically multiplexed line configured by combing the plurality of communication means.

The $50^{th}$ invention to solve the aforementioned problem is as described in one of the $47^{th}$ to $49^{th}$ invention, which comprises means for updating the information of the control table that manages an address of the communication means of the mobile router, based on a change in connection status with the mobile router and notification of the address assigned to the communication means.

The $51^{st}$ invention to solve the aforementioned problem is as described in one of the $47^{th}$ to $50^{th}$ invention, which comprises means for deleting from the control table, information related to an address of the communication means which the home agent is notified of, based on notification of an address of the communication means scheduled to be disconnected from the mobile router.

The $52^{nd}$ invention to solve the aforementioned problem is as described in one of the $47^{th}$ to $51^{st}$ invention, which comprises means for updating information in a control table that manages an address of the mobile router, based on notification of an address of the communication means predicted to be disconnected from the mobile router.

The $53^{rd}$ invention to solve the aforementioned problem is as described in one of the $47^{th}$ to $52^{nd}$ invention, which comprises: means for regularly transmitting a packet to a plurality of addresses the mobile router has; and means for determining an address as unusable if no response is made to the packet from the address, and updating information in a control table that manages an address of the mobile router.

The $54^{th}$ invention to solve the aforementioned problem is as described in one of the $47^{th}$ to $53^{rd}$ invention, which comprises: means for estimating an address of usable communication means of the mobile router based on positional information of the mobile router; and
means for updating information in a control table that manages an address of the mobile router, based on the estimation.

The $55^{th}$ invention to solve the aforementioned problem is as described in one of the $47^{th}$ to $54^{th}$ invention, wherein the route information in the control table of the home agent includes at least one of a type of communication means or line, a packet delay, a bandwidth of the line, or a timing enabling transmission of the next packet.

The $56^{th}$ invention to solve the aforementioned problem is as described in one of the $47^{th}$ to $55^{th}$ invention, wherein the transferring means of the home agent is means for selecting an address to which transmission is possible by calculating a transmission timing based on the route information in the control table, so as not to generate a packet loss.

The $57^{th}$ invention to solve the aforementioned problem is as described in one of the $47^{th}$ to $56^{th}$ invention, which selects a transmission timing and a destination address using means which is different depending on a QoS class of a received packet.

The $58^{th}$ invention to solve the aforementioned problem is as described in one of the $47^{th}$ to $57^{th}$ invention, which comprises a control table which manages policy information mapped to respective addresses of the mobile router; and transferring means, when transferring a packet to the mobile router, which selects an address of the mobile router based on the policy information and transfers the packet, and
which determines utilization of a plurality of communication means based on the policy information between the home agent and the mobile router.

The $59^{th}$ invention to solve the aforementioned problem is as described in the $58^{th}$ invention, wherein the policy information refers to information on a communication fee of individual communication means.

The $60^{th}$ invention to solve the aforementioned problem is as described in one of the $58^{th}$ or $59^{th}$ invention, wherein the transferring means determines utilization of individual communication means based on the policy information, such that a total of the communication fees is minimized.

The $61^{st}$ invention to solve the aforementioned problem is as described in one of the $58^{th}$ to $60^{th}$ invention, wherein
when it is assumed that;
the communication means adopts a measured-rate billing system;
the data communication system comprises "N" units of communication means, that is, the first to the $N^{th}$ communication means;
the information on the communication fee is given such that:
the first communication means has a communication unit price of a1, and a bandwidth of B1;
the second communication means has a communication unit price of a2 (>a1), and a bandwidth of B2;
as repeated in the same manner hereafter, the $N^{th}$ communication means has a communication unit price of aN
($>$a(N−1)) and a bandwidth of BN, and
a bandwidth required for current communication is C,
the home agent:
finds the largest M which satisfies the inequality: C$>$=B1+B2+ . . . +BM,
when the bandwidths of the communication means are sequentially added starting from that of the first communication means;
uses all the bandwidths of the first to the $M^{th}$ communication means; and
uses C−B1−B2− . . . −BM of the bandwidth of the $(M+1)^{th}$ communication means, thereby
using a line such that a total of the communication fees is minimized.

The $62^{nd}$ invention to solve the aforementioned problem is as described in one of the $58^{th}$ to $61^{st}$ invention, which uses communication means adopting a flat-rate billing system in preference to communication means adopting a measured-rate billing system.

The $63^{rd}$ invention to solve the aforementioned problem is as described in one of the $58^{th}$ to $62^{nd}$ invention, wherein when it is assumed that:
the first to $M^{th}$ communication means adopts a flat-rate billing system;
the $M^{th}$ to $N^{th}$ communication means adopts a measured-rate billing system;
the data communication system comprises "N" units of communication means, that is, the first to the $N^{th}$ communication means;
a total bandwidth of the first to $M^{th}$ communication means is B0,
the information on the communication fee is given such that:
the $(M+1)^{th}$ communication means has a communication unit price of a(M+1) and a bandwidth of B(M+1); and the (M+2)th communication means has a communication unit price of a(M+2) ($>$a(M+1)) and a bandwidth of B(M+2);
as repeated in the same manner hereafter,
the $N^{th}$ communication means has a communication unit price of aN ($>$a(N−1)) and a bandwidth of BN, and
a bandwidth required for current communication is C,
the data communication system:
if C$<$=B0, uses one of the first to $M^{th}$ communication means, and
if C$>$B0, finds the largest L which satisfies the inequality: C$>$=B0+B1+B2+ . . . +BL, when the bandwidths of the communication means are sequentially added starting from that of the first communication means;
uses all the bandwidths of the first to the Lth communication means; and
uses C−B1−B2− . . . −BL of the bandwidth of the $(L+1)^{th}$ communication means, thereby
using a line such that a total of the communication fees is minimized.

The $64^{th}$ invention to solve the aforementioned problem is as described in one of the $58^{th}$ to $63^{rd}$ invention, wherein a communication fee is changed in accordance with a date and time, and utilization of individual communication means is changed in accordance with this change.

The $65^{th}$ invention to solve the aforementioned problem is as described in one of the $58^{th}$ to $64^{th}$ invention, which changes the policy information based on positional information of the mobile router.

The $66^{th}$ invention to solve the aforementioned problem is as described in one of the $58^{th}$ to $65^{th}$ invention, wherein a communication fee is changed in accordance with a place, and utilization of individual communication means is changed in accordance with this change.

The $67^{th}$ invention to solve the aforementioned problem is as described in one of the $58^{th}$ to $66^{th}$ invention, which comprises means for including the policy information in the response message when receiving notification of an address from the mobile router, and distributing the policy information to the mobile router.

The $68^{th}$ invention to solve the aforementioned problem is as described in one of the $58^{th}$ to $67^{th}$ invention, which comprises sequence control means which controls a sequence of a received packets.

The $69^{th}$ invention to solve the aforementioned problem is a program of a mobile router in a data communication system configured by: a home agent; a correspondent node capable of communicating with the home agent; a mobile router; and a mobile network node capable of communicating with the mobile router, the program
causing the mobile router:
to function as a plurality of communication means of a communication service containing a same or different types of services;
to function as transferring means which receives a packet from the mobile network node to the correspondent node, selects usable communication means based on the control table which stores an address assigned to the communication means and route information of the communication means, such that the address and the route information are associated with each other, and transfers the packet to the home agent; and
configuring a logical line by combining lines of the plurality of communication means and transfers a packet addressed to the correspondent node from the mobile network node to the home agent.

The $70^{th}$ invention to solve the aforementioned problem is a program of a mobile router in a data communication system configured by a home agent and a mobile router; the program causing the mobile router
to function as a plurality of communication means of a communication service containing a same or different types of services;
to function as transferring means which receives a packet, selects usable communication means based on the control table which stores an address assigned to the communication means and route information of the communication means, such that the address and the route information are associated with each other, and transfers the packet to the home agent; and
configuring a logical line by combining lines of the plurality of communication means, and communicates with the home agent through this line.

The $71^{st}$ invention to solve the aforementioned problem is a program of a mobile router in a data communication system configured by: a home agent; a correspondent node capable of communicating with the home agent; a mobile router; and a mobile network node capable of communicating with the mobile router, the program
causing the mobile router
to function as a plurality of communication means to communicate with the home agent;
to function as a control table which stores route information assigned to the plurality of communication means; and
to function as means which receives a packet from the mobile network node to the correspondent node, selects at least one of the communication means based on the control table, and transfers the packet to the home agent; and configuring a logically multiplexed line by combining lines of the plurality of communication means, and to transfers a packet addressed to the correspondent node from the mobile network node to the home agent through this logically multiplexed line.

The 72$^{nd}$ invention to solve the aforementioned problem is as described in one of the 69$^{th}$ to 71$^{st}$ invention, wherein the program causes the mobile router to function as means for detecting a change in connection status of the communication means currently-in-use; and to function as means for notifying the home agent of the change in connection status and an address assigned to the communication means.

The 73$^{rd}$ invention to solve the aforementioned problem is as described in one of the 69$^{th}$ to 72$^{nd}$ invention, wherein the program causes the mobile router to function as means for notifying the home agent of an address of the communication means scheduled to be disconnected, before disconnecting a currently-connected line of the communication means.

The 74$^{th}$ invention to solve the aforementioned problem is as described in one of the 69$^{th}$ to 73$^{rd}$ invention, wherein the program which causes the mobile router to function as means for notifying the home agent of an address of the communication means predicted to be disconnected, when an event occurs where disconnection of a currently-connected line of the communication means is predictable.

The 75$^{th}$ invention to solve the aforementioned problem is as described in one of the 69$^{th}$ to 74$^{th}$ invention, wherein the program causes the mobile router to function as means for responding to a packet from the home agent for investigating a usable address.

The 76$^{th}$ invention to solve the aforementioned problem is as described in one of the 69$^{th}$ to 75$^{th}$ invention, wherein the route information in the control table of the mobile router includes at least one of a type of communication means or line, a packet delay, a bandwidth of the line, or usage information.

The 77$^{th}$ invention to solve the aforementioned problem is as described in one of the 69$^{th}$ to 76$^{th}$ invention, which selects communication means using means which is different depending on a QoS class of a received packet.

The 78$^{th}$ invention to solve the aforementioned problem is as described in one of the 69$^{th}$ to 77$^{th}$ invention, wherein the program causes the mobile router to function as means for monitoring a traffic amount of a mobile network node thereunder; and means for connecting and disconnecting a channel to the outside based on the traffic amount.

The 79$^{th}$ invention to solve the aforementioned problem is as described in one of the 69$^{th}$ to 78$^{th}$ invention, wherein the program causes the mobile router to function as transferring means, when transferring a packet to the home agent, which selects the communication means based on the policy information mapped to respective communication means; and determines utilization of a plurality of communication means based on the policy information.

The 80$^{th}$ invention to solve the aforementioned problem is as described in the 79$^{th}$ invention, wherein the policy information refers to information on a communication fee of individual communication means.

The 81$^{st}$ invention to solve the aforementioned problem is as described in the 79$^{th}$ or 80$^{th}$ invention, wherein the transferring means determines utilization of individual communication means based on the policy information, such that a total of the communication fees is minimized.

The 82$^{nd}$ invention to solve the aforementioned problem is as described in one of the 79$^{th}$ to 81$^{st}$ invention, wherein when it is assumed that:

the communication means adopts a measured-rate billing system;

the data communication system comprises "N" units of communication means, that is, the first to the N$^{th}$ communication means;

the information on the communication fee is given such that:

the first communication means has a communication unit price of a1, and a bandwidth of B1;

the second communication means has a communication unit price of a2 (>a1), and a bandwidth of B2;

as repeated in the same manner hereafter, the N$^{th}$ communication means has a communication unit price of aN (>a(N−1)) and a bandwidth of BN, and a bandwidth required for current communication is C, the program:

finds the largest M which satisfies the inequality: C>=B1+B2+ . . . +BM, when the bandwidths of the communication means are sequentially added starting from that of the first communication means;

uses all the bandwidths of the first to the M$^{th}$ communication means; and uses C−B1−B2− . . . −BM of the bandwidth of the (M+1)$^{th}$ communication means, thereby using a line such that a total of the communication fees is minimized.

The 83$^{rd}$ invention to solve the aforementioned problem is as described in one of the 79$^{th}$ to 82$^{nd}$ invention, which uses communication means adopting a flat-rate billing system in preference to communication means adopting a measured-rate billing system.

The 84$^{th}$ invention to solve the aforementioned problem is as described in one of the 79$^{th}$ to 83$^{rd}$ invention, wherein when it is assumed that:

the first to M$^{th}$ communication means adopts a flat-rate billing system;

the M$^{th}$ to N$^{th}$ communication means adopts a measured-rate billing system;

the data communication system comprises "N" units of communication means, that is, the first to the N$^{th}$ communication means;

a total bandwidth of the first to M$^{th}$ communication means is B0, the information on the communication fee is given such that:

the (M+1)$^{th}$ communication means has a communication unit price of a(M+1), and a bandwidth of B(M+1); and the (M+2)$^{th}$ communication means has a communication unit price of a(M+2) (>a(M+1)), and a bandwidth of B(M+2);

as repeated in the same manner hereafter, the N$^{th}$ communication means has a communication unit price of aN (>a(N−1)) and a bandwidth of BN, and a bandwidth required for current communication is C, the program:

if C<=B0, uses one of the first to M$^{th}$ communication means, and if C>B0, finds the largest L which satisfies the inequality: C>=B0+B1+B2+ . . . +BL, when the bandwidths of the communication means are sequentially added starting from that of the first communication means;

uses all the bandwidths of the first to the L$^{th}$ communication means; and uses C−B1−B2− . . . −BL of the bandwidth of the (L+1)$^{th}$ communication means, thereby using a line such that a total of the communication fees is minimized.

The 85$^{th}$ invention to solve the aforementioned problem is as described in one of the 79$^{th}$ to 84$^{th}$ invention, wherein a communication fee is changed in accordance with a date and time, and utilization of individual communication means is changed in accordance with this change.

The 86$^{th}$ invention to solve the aforementioned problem is as described in as described in the 79$^{th}$ to 85$^{th}$ invention, which changes the policy information based on positional information of the mobile router.

The 87$^{th}$ invention to solve the aforementioned problem is as described in one of the 79$^{th}$ to 86$^{th}$ invention, wherein a communication fee is changed in accordance with a place, and utilization of individual communication means is changed in accordance with this change.

The 88$^{th}$ invention to solve the aforementioned problem is as described in one of the 79$^{th}$ to 87$^{th}$ invention, wherein the program causes the mobile router to function as sequence control means which controls a sequence of a received packets.

The 89$^{th}$ invention to solve the aforementioned problem is program of a home agent in a data communication system configured by: a home agent; a correspondent node capable of communicating with the home agent; a mobile router; and a mobile network node capable of communicating with the mobile router, the program
causing the home agent
to function as means for identifying an address assigned to the communication means which is usable among the communication means of a communication service containing a same or different types of services; and
to function as transferring means which receives a packet from the correspondent node to the mobile network node, selects an address based on the control table which stores the identified address and route information of the address, such that the address and the route information are associated with each other, and transfers the packet to the address;
thereby
configuring a logical line by combining lines of the plurality of communication means, and transferring a packet from the correspondent node addressed to the mobile network node through this line to the mobile router.

The 90$^{th}$ invention to solve the aforementioned problem is a A program of a home agent in a data communication system configured by a home agent and a mobile router; the program causing the home agent
to function as means for identifying an address assigned to the communication means which is usable among the communication means of a communication service containing a same or different types of services; and
to function as transferring means which receives a packet, selects an address based on the control table which stores the identified address and route information of the address, such that the address and the route information are associated with each other, and transfers the packet to the address; thereby configuring a logical line by combining lines of the plurality of communication means, and communicating with the mobile router through this line.

The 91$^{st}$ invention to solve the aforementioned problem is a program of a home agent in a data communication system configured by: a home agent; a correspondent node capable of communicating with the home agent; a mobile router; and a mobile network node capable of communicating with the mobile router, the program
causing the home agent:
to function as means for identifying an address assigned to the usable communication means of the mobile router;
to function as a control table which stores route information containing the identified address; and
to function as means which receives a packet from the correspondent node to the mobile network node, selects at least one of the addresses of the mobile router based on the control table, and transfers the packet to the address; thereby communicating with the mobile router through a logically multiplexed line configured by combining lines of the plurality of communication means.

The 92$^{nd}$ invention to solve the aforementioned problem is as described in one of the 89$^{th}$ to 91$^{st}$ invention, wherein the program causes the home agent to function as means for updating information in a control table that manages an address of the communication means of the mobile router, based on notification of a change in connection status and an address assigned to the communication means.

The 93$^{rd}$ invention to solve the aforementioned problem is as described in one of the 89$^{th}$ to 92$^{nd}$ invention, wherein the program causes the home agent to function as means for deleting from the control table, information related to the address of the communication means which the home agent is notified of, based on the notification of an address scheduled to be disconnected from the mobile router.

The 94$^{th}$ invention to solve the aforementioned problem is as described in one of the 89$^{th}$ to 93$^{rd}$ invention, wherein the program causes the home agent to function as means for updating information in a control table that manages an address of the mobile router, based on notification of an address of the communication means predicted to be disconnected from the mobile router.

The 95$^{th}$ invention to solve the aforementioned problem is as described in one of the 89$^{th}$ to 94$^{th}$ invention, wherein the program causes the home agent to
function as means for regularly transmitting a packet to a plurality of addresses the mobile router has; and
function as means for determining an address as unusable if no response is made to the packet from the address, and updating information in a control table that manages an address of the mobile router.

The 96$^{th}$ invention to solve the aforementioned problem is as described in one of the 89$^{th}$ to 95$^{th}$ invention, wherein the program causes the home agent
to function as means for estimating, based on positional information of the mobile router, an address of usable communication means of the mobile router; and
to function as means for updating, based on the estimation, information in a control table that manages an address of the mobile router.

The 97$^{th}$ invention to solve the aforementioned problem is as described in one of the 89$^{th}$ to 96$^{th}$ invention, wherein the route information in the control table of the home agent includes at least one of a type of communication means or line, a packet delay, a bandwidth of the line, or a timing enabling transmission of the next packet.

The 98$^{th}$ invention to solve the aforementioned problem is as described in one of the 89$^{th}$ to 97$^{th}$ invention, wherein the transferring means of the home agent is means for selecting an address to which transmission is possible by calculating a transmission timing based on the route information in the control table, so as not to generate a packet loss.

The 99$^{th}$ invention to solve the aforementioned problem is as described in one of the 89$^{th}$ to 98$^{th}$ invention, which selects a transmission timing and a destination address using means which is different depending on a QoS class of a received packet.

The 100$^{th}$ invention to solve the aforementioned problem is as described in one of the 89$^{th}$ to 99$^{th}$ invention, wherein the program causes the home agent to function as transferring means, when transferring a packet to the mobile router, which selects the address of the mobile router based on the policy information mapped to respective addresses of the mobile router, and transfers the packet, and determines utilization of a plurality of communication means with the mobile router based on the policy information.

The $101^{st}$ invention to solve the aforementioned problem is as described in the $100^{th}$ invention, wherein the policy information refers to information on a communication fee of individual communication means.

The $102^{nd}$ invention to solve the aforementioned problem is as described in the $100^{th}$ to $101^{st}$ invention, wherein the transferring means determines utilization of individual communication means based on the policy information, such that a total of the communication fees is minimized.

The $103^{rd}$ invention to solve the aforementioned problem is as described in one of the $100^{th}$ to $102^{nd}$ invention, wherein when it is assumed that:

the communication means adopts a measured-rate billing system;

the data communication system comprises "N" units of communication means, that is, the first to the $N^{th}$ communication means;

the information on the communication fee is given such that:

the first communication means has a communication unit price of a1, and a bandwidth of B1;

the second communication means has a communication unit price of a2 (>a1), and a bandwidth of B2;

as repeated in the same manner hereafter, the $N^{th}$ communication means has a communication unit price of aN (>a(N−1)) and a bandwidth of BN, and a bandwidth required for current communication is C, the program:

finds the largest M which satisfies the inequality: C>=B1+B2+ . . . +BM, when the bandwidths of the communication means are sequentially added starting from that of the first communication means;

uses all the bandwidths of the first to the $M^{th}$ communication means; and uses C−B1−B2− . . . −BM of the bandwidth of the $(M+1)^{th}$ communication means, thereby using a line such that a total of the communication fees is minimized.

The $104^{th}$ invention to solve the aforementioned problem is as described in one of the $100^{th}$ to $103^{rd}$ invention, which uses communication means adopting a flat-rate billing system in preference to communication means adopting a measured-rate billing system.

The $105^{th}$ invention to solve the aforementioned problem is as described in one of the $100^{th}$ to $104^{th}$ invention, wherein when it is assumed that:

the first to $M^{th}$ communication means adopts a flat-rate billing system;

the Mth to $N^{th}$ communication means adopts a measured-rate billing system;

the data communication system comprises "N" units of communication means, that is, the first to the $N^{th}$ communication means;

a total bandwidth of the first to $M^{th}$ communication means is B0, the information on the communication fee is given such that:

the (M+1)th communication means has a communication unit price of a(M+1), and a bandwidth of B(M+1); and the $(M+2)^{th}$ communication means has a communication unit price of a(M+2) (>a(M+1)), and a bandwidth of B(M+2);

as repeated in the same manner hereafter, the $N^{th}$ communication means has a communication unit price of aN (>a(N−1)) and a bandwidth of BN, and a bandwidth required for current communication is C, the data communication system:

if C<=B0, uses one of the first to $M^{th}$ communication means, and if C>B0, finds the largest L which satisfies the inequality: C>=B0+B1+B2+ . . . +BL, when the bandwidths of the communication means are sequentially added starting from that of the first communication means;

uses all the bandwidths of the first to the $L^{th}$ communication means; and uses C−B1−B2− . . . −BL of the bandwidth of the $(L+1)^{th}$ communication means, thereby using a line such that a total of the communication fees is minimized.

The $106^{th}$ invention to solve the aforementioned problem is as described in one of the $100^{th}$ to $105^{th}$ invention, wherein a communication fee is changed in accordance with a date and time, and utilization of individual communication means is changed in accordance with this change.

The $107^{th}$ invention to solve the aforementioned problem is as described in one of the $100^{th}$ to $106^{th}$ invention, which changes the policy information based on positional information of the mobile router.

The $108^{th}$ invention to solve the aforementioned problem is as described in one of the $100^{th}$ to $107^{th}$ invention, wherein a communication fee is changed in accordance with a place, and utilization of individual communication means is changed in accordance with this change.

The $109^{th}$ invention to solve the aforementioned problem is as described in one of the $100^{th}$ to $107^{th}$ invention, wherein the program causes the home agent to function as means for including the policy information in the response message when receiving notification of an address from the mobile router, and distributing the policy information to the mobile router.

The $110^{th}$ invention to solve the aforementioned problem is as described in one of the $89^{th}$ to $109^{th}$ invention, wherein the program causes the home agent to have sequence control means which controls a sequence of a received packets.

Hereafter, the summary of the present invention will be explained referring to FIG. 1, in which the mobile router 105 is able to use a plurality of wireless lines 106, 107, 108, 109. The wireless lines 106, 107, 108, 109 contain a same or different types of services.

The mobile router 105 monitors a status of the wireless lines 106, 107, 108, 109, registers addresses assigned to communication means of the wireless lines 106, 107, 108, 109 and route information which is status information in the control table, and manages currently-available lines.

Moreover, the mobile router 105 appropriately combines the currently-available lines based on the policy information of the user, thereby configuring a logical line between the mobile router 105 and the home agent.

The present invention enables the mobile router to efficiently use a plurality of lines, thereby having a beneficial effect of providing the communication band in a flexible manner, in accordance with the mobile network node in the mobile network which moves as a result of use of the plurality of lines.

Moreover, the present invention enables the mobile router to efficiently use a plurality of lines, thereby having a beneficial effect of flexibly providing a communication bandwidth, in accordance with the status of the mobile network node in the mobile network which moves as a result of use of the plurality of lines.

Furthermore, in the present invention, the home agent knows the address of the usable communication means of the mobile router, thereby enabling efficient use of the plurality of the access lines.

Furthermore, the present invention selects the address which transmits a packet based on the policy information, thereby enabling data transmission and receiving reflecting the intention of users. Particularly, when the user's communication fee is set as the policy information, it is possible to configure a logical line by combining lines intended for the target value of the user's communication fee.

Furthermore, the present invention, when updating the route information, estimates transmission delay after update by referring to a transmission history after the update becomes effective and the route information after update, and selects the route (address) and reflects it to a packet scheduling sending packets. Accordingly, it is possible to prevent decrease in multiplication efficiency in a system where the status of individual routes (addresses) dynamically vary.

Furthermore, according to the present invention, it is possible to configure a logical line by combining lines of a same or different types of services communication means, even in a case where the network, such as a network configured in a vehicle, moves in a wider area. Accordingly, it is possible to minimize decrease in a number of usable communication means associated with the area where service is provided, decrease in the communication bandwidth due to external environment, or the like, thereby providing a stable communication environment.

BRIEF DESCRIPTION OF DRAWINGS

FIG. 5 shows one example of a control table the mobile router has.

FIG. 6 shows one example of a control table the home agent has.

FIG. 9 shows an example of a control table including a billing information the mobile router and the home agent have.

FIG. 10 shows another example of a control table including a billing information the mobile router and the home agent have.

FIG. 19 shows one example of a control table the mobile router has.

FIG. 20 shows one example of a control table the mobile router has.

FIG. 21 shows one example of a control table the home agent has.

FIG. 22 shows one example of a control table the home agent has.

FIG. 24 shows one example of a control table the mobile router has.

BEST MODE FOR CARRYING OUT THE INVENTION

An embodiment of the present invention will be explained referring to FIG. 1.

Figure 1:
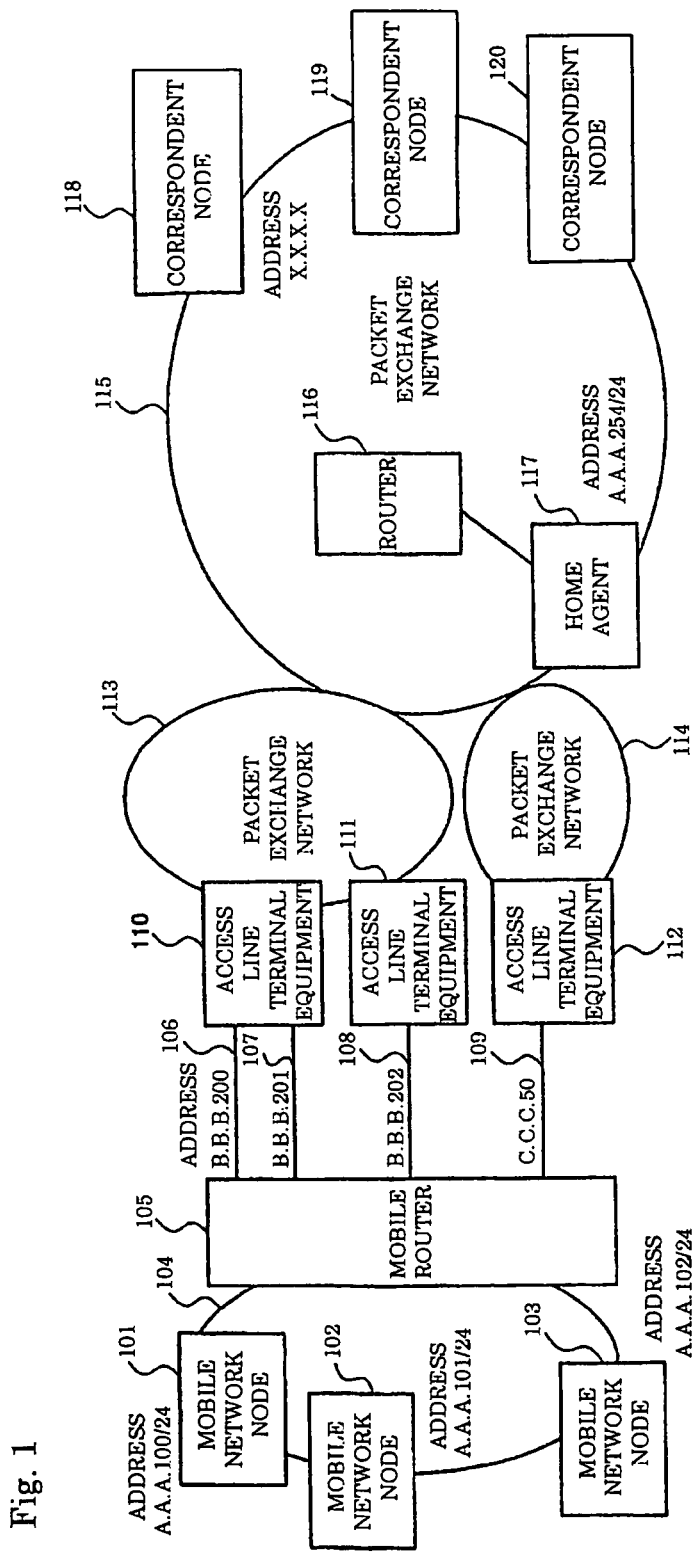
FIG. 1 shows a configuration of a communication network according to the present invention.

FIG. 1 shows a whole configuration of the present embodiment.

Referring to FIG. 1, the embodiment of the present invention is a network configuration configured by a mobile network 104 and packet exchange networks 113 to 115.

Examples of the mobile network 104 include a network configured in a vehicle such as a train, automobile or the like. The mobile network 104 is configured by an arbitrary number of terminals (hereinafter referred to as mobile network nodes) 101, 102, 103 and a mobile router 105.

There are a router 116, a home agent 117 and an arbitrary number of correspondent nodes 118 to 120 in the network of the packet exchange network 115. Note that the packet exchange network 115 is connected with the packet exchange networks 113, 114.

The mobile router 105 is connected to access line terminal equipment 110 using wireless lines 106, 107, to access line terminal equipment 111 using a wireless line 108, and access line terminal equipment 112 using wireless line 109, respectively. Furthermore, each of the access line terminal equipment 110, 111 is connected to the packet exchange network 113, and the access line terminal equipment 112 is connected to the packet exchange network 114.

In this case, the wireless lines 106, 107, 108, 109 contain are lines containing a same or different types of services, a logical line is configured by appropriately combining the wireless lines 106, 107, 108, 109. Note that the service herein refers not only to a communication service provided by different carriers, but also to a communication service with different communication systems, billing systems or the like, even if provided by the same carrier.

Moreover, in the present embodiment wireless lines are used as the access lines, the access lines may be fixed-lines. Furthermore, any numbers of lines at which the access line terminal equipment ends, any numbers of access line terminal equipment used to be connected to a single packet exchange network, and any numbers of packet exchange networks between the mobile router 105 and the packet exchange network 115 may be used.

Moreover, the network may have a nested structure wherein another mobile network exists.

Next a configuration of the mobile router 105 will be explained.

Figure 2:
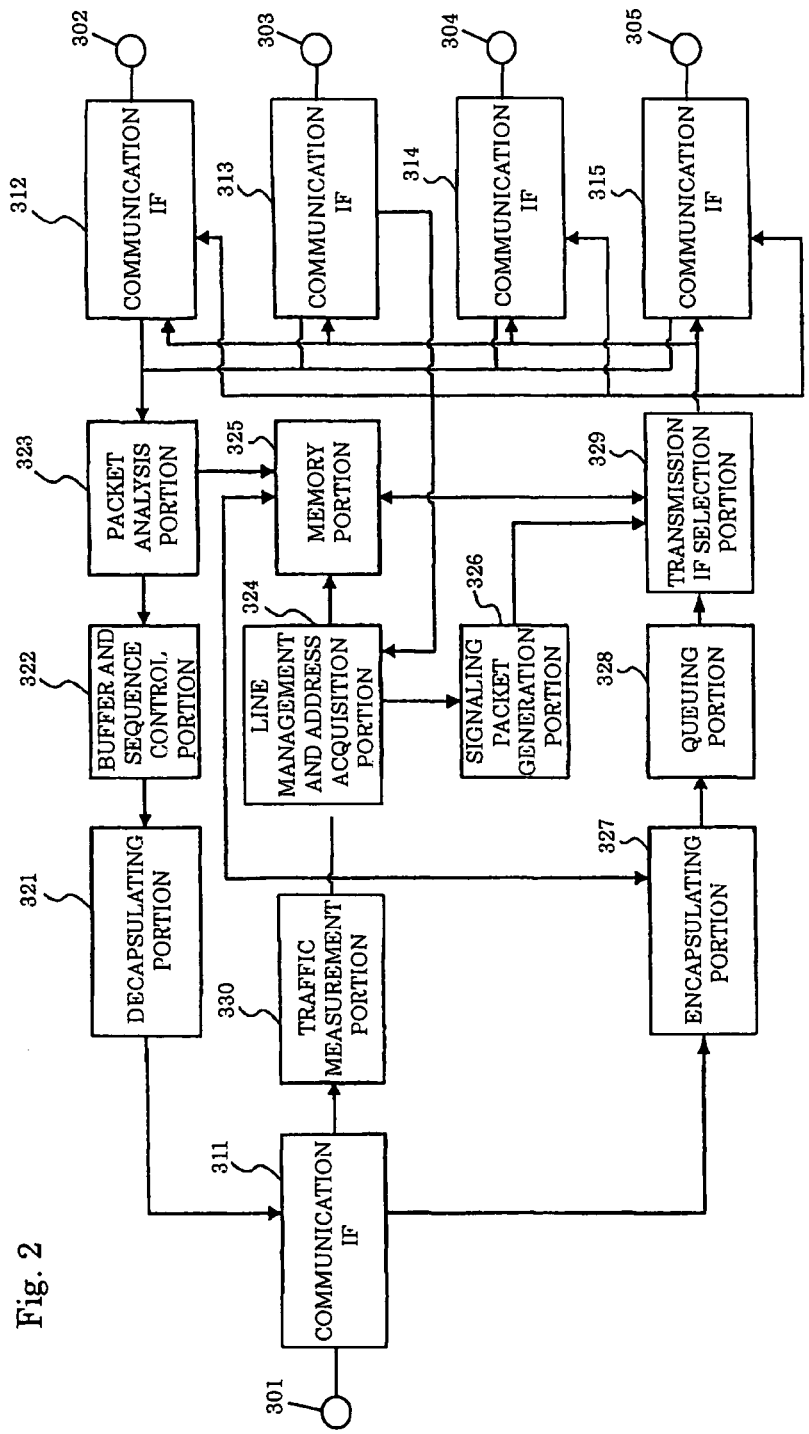
FIG. 2 shows a configuration of a mobile router.

FIG. 2 shows a configuration of the mobile router 105.

The mobile router 105 is configured by: an I/O terminal 301 connected to the mobile network 104; a communication interface 311 input to and output from the I/O terminal 301; I/O terminals 302 to 305 connected to the access lines; communication interfaces 312 to 315 that are connected to the I/O terminals 302 to 305; a packet analysis portion 323 which analyses the input packet from the access line; a buffer and sequence control portion 322 which manages a serial number of the received packets and buffers the received packets so as to control sequence thereof; a decapsulating portion 321 which removes a capsule of an encapsulated packet; a memory portion 325 which stores information such as a control table, or the like; a line management and address acquisition portion 324 which detects movement of the mobile network 104 and acquires a new address; a signaling packet generation portion 326 which generates a signaling message addressed to the home agent 117; an encapsulating portion 327 encapsulating the packet; a queuing portion 328 which executes queuing when the packet cannot be transmitted immediately; a transmission interface selection portion 329 which selects a suitable transmission interface; and a traffic measurement portion 330.

The control table stored in the memory portion 325 is a table storing route information as shown in FIG. 5. The route information herein refers to an address assigned to the communication interface, and line information of the communication interface. The line information includes, for example, a type of communication interface, a bandwidth of the line, status as to whether communication is possible or not, and the like.

The traffic measurement portion 330 monitors the communication interface 311, and measures a traffic that flows into the mobile network and a traffic that flows out of the mobile network. If necessary, the traffic measurement portion 330 instructs the line management and address acquisition portion 324 to disconnect and/or connect the line.

Next, a configuration of the home agent 117 will be explained.

Figure 3:
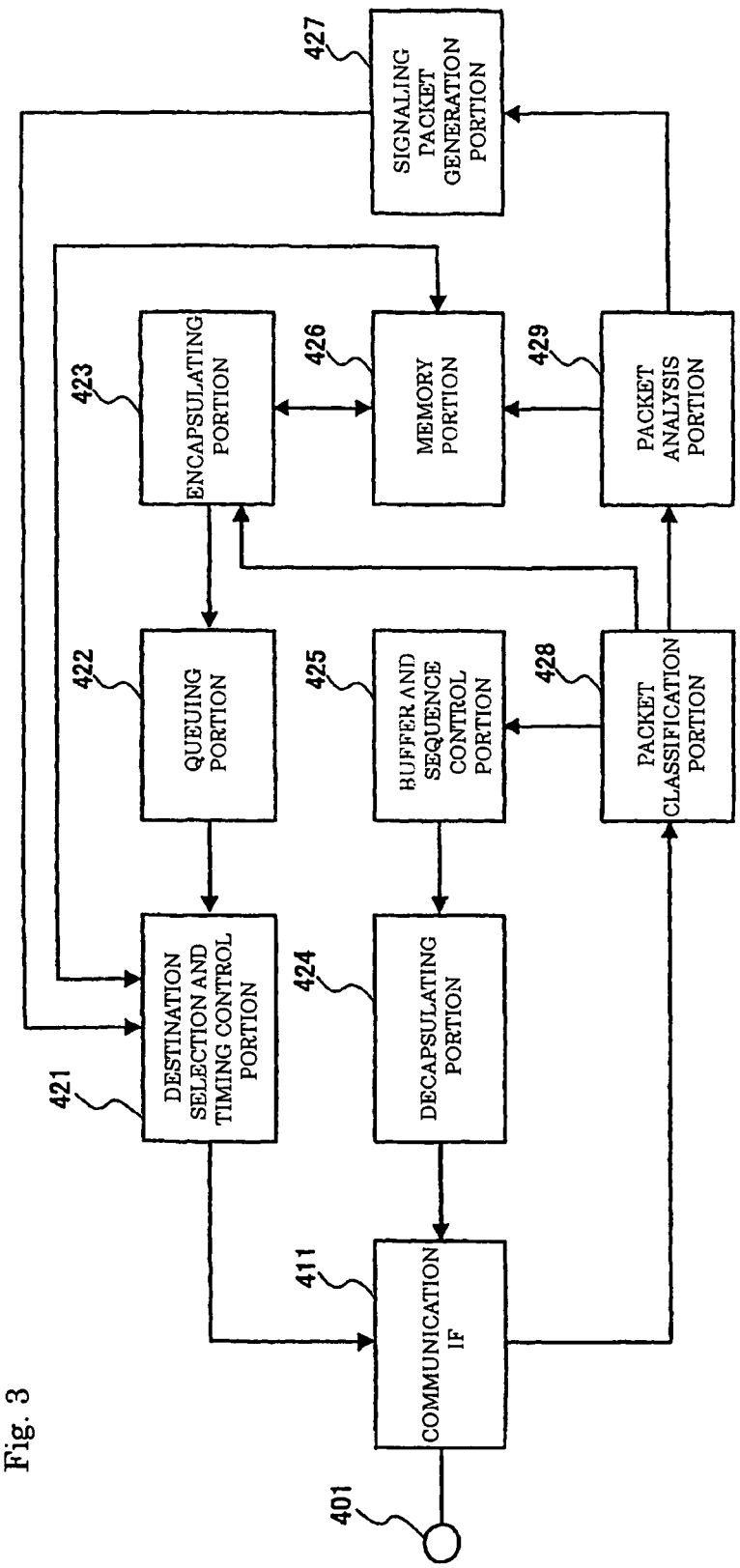
FIG. 3 shows a configuration of a home agent.

FIG. 3 shows a configuration of the home agent 117.

The home agent 117 is configured by: an I/O terminal 401 on the packet exchange network side; a communication interface 411 input to and output from the I/O terminal 401; a packet classification portion 428 which classifies input packets; a packet analysis portion 429 which analyzes a content if the input packet is a signaling packet; a memory portion 426 which stores the information such as the control table; a signaling packet generation portion 427 which returns a response to the signaling; a encapsulating portion 423 which encapsulates the packet; a destination selection and timing control portion 421 which selects a destination of the packet to be transmitted from one of the addresses of the mobile router 105; a buffer and sequence control portion 425 which manages a serial number of the received packets and buffers the data packet so as to control the sequence thereof; and a decapsulating portion 404 which removes a capsule of the encapsulated packet.

The control table stored in the memory portion 426 is a table which stores the route information as shown in FIG. 6. The route information herein refers to an address assigned to the communication interface of the mobile router 105 capable of communication, and the line information of the communication interface (address). The line information herein, refers to, for example, a type of communication interface, a bandwidth of the line, a time enabling transmission of the next packet.

Next, an operation in the aforementioned configurations will be explained from FIG. 4 to FIG. 8.

Figure 4:
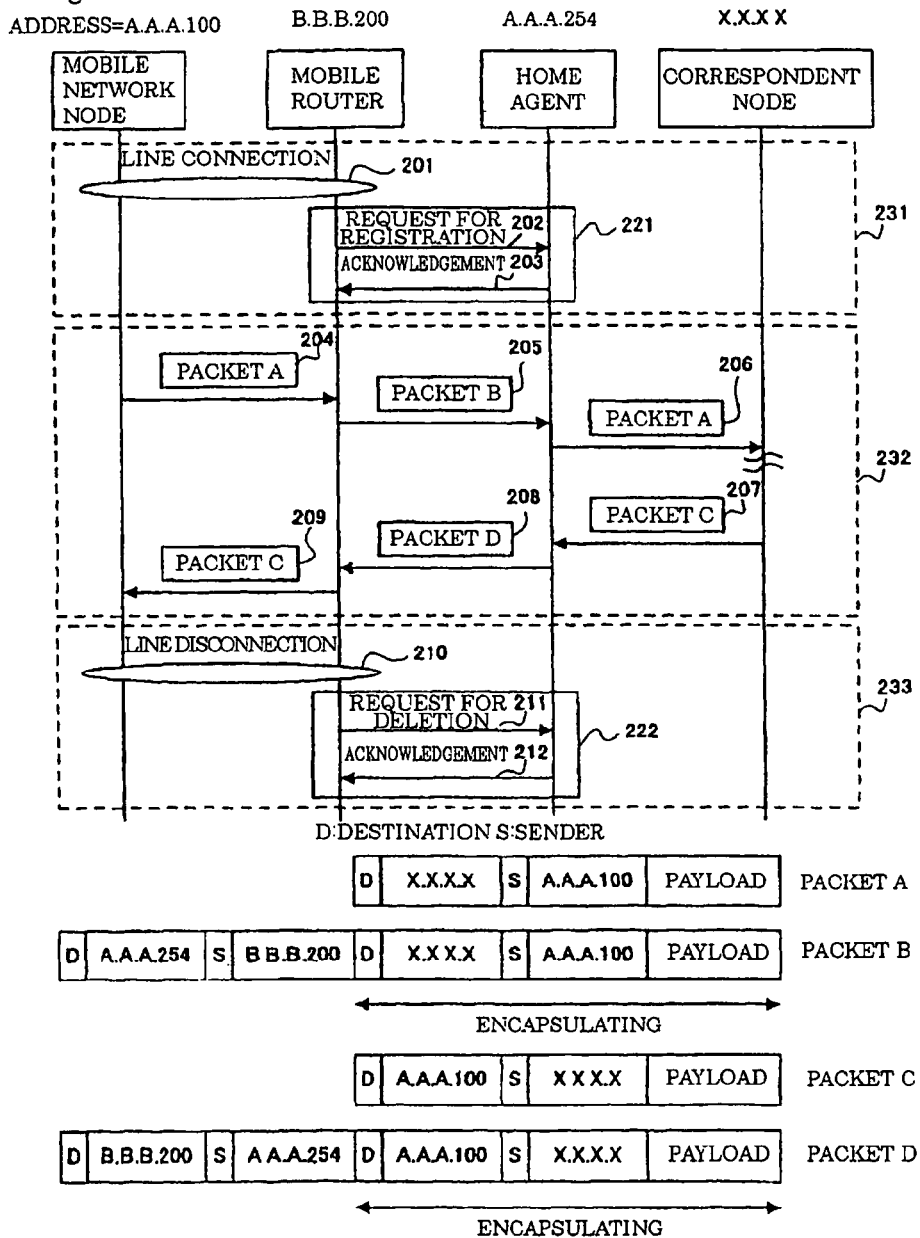
FIG. 4 shows a communication sequence of a mobile network node, the mobile router, the home agent, and a correspondent node.

FIG. 4 shows a sequence of address registration process operation and an address deletion process operation and an address deletion process operation between the mobile router 105 and the home agent 117 and the data communication between the mobile network node and the correspondent node. FIG. 5 shows a control table the mobile router 105 has as described above, and FIG. 6 shows a control table that home agent 117 has as described above.

As shown in FIG. 4, the process in the present embodiment is roughly divided into a route setting process 231 triggered by an event of a line connection 201; a route cancellation process 233 triggered by an event of a line disconnection 210; and a data communication process 232 which executes data communication between the mobile network node and the correspondent node. Note that, the data communication process 232 is executed in the state where the route setting process 231 is complete.

The purpose of the route setting process 231 and the route cancellation process 233 is to share, between the mobile router 105 and the home agent 117, information on an available address (i.e., an address assigned to available communication interfaces 312 to 315, hereinafter merely referred to as c/o address or address) and the route information of the address. For this purpose, the route setting process 231 and the route cancellation process 233 are executed, every time when the address information of the communication interface of the mobile router 105 changes and/or when the line status changes, such as the line connection 201 and the line disconnection 210. Furthermore, when the address changes and/or the line status changes, the address registration process operation 221 is executed in the event of the line connection 201, and deletion process operation 222 is executed in the event of the line disconnection 210.

Hereafter, a specific change in the line status (hereinafter, merely referred to as change in the line status) which triggers the route setting process 231 and the route cancellation process 233. Next, the address registration process operation 221 and the address deletion process operation 222 which will are executed, triggered by the change in the line status.

<The First Example of Change in the Line Status>

The first example of a change in the line status refers to a case where the mobile network 104 actively executes the line connection 201. When the mobile network 104 is connected to another network for the first time, the mobile router 105 actively executes the line connection 201.

The line management and address acquisition portion 324 of the mobile router 105 executes the line connection 201, using the communication interfaces 312 to 315, and acquires the line information used for the route information at this time. The information includes, for example, a type of communication interface, a bandwidth of the line, and a combination thereof. Next, the address registration process operation 221 is executed.

<The Second Example of Change in the Line Status>

The second example of a change in the line status refers to a case where the mobile network 104 actively executes the line disconnection 210. In this case, the address deletion process operation 222 was executed in advance.

Subsequently, the line management and address acquisition portion 324 of the mobile router 105 executes the line disconnection 210 for the communication interfaces 312 to 315 that are recorded in the memory portion 325, and deletes the applicable address and line information in the control table of the memory portion 325.

This case is specifically applied to a case such as where the use of the network of that day is complete and it is judged that no traffic will be generated thereafter for a certain period of time. Alternatively, this case is applied to a case where since plurality of lines of IMT 2000 are used the number of currently-connected lines may be reduced due to decreased traffic amount. In this case, the traffic measurement portion 330 monitors bidirectional traffic between the mobile router and the home agent, passing through the communication interface 311. When the traffic amount decreases to a certain threshold or lower, the traffic measurement portion 330 notifies the line management and address acquisition portion 324 of the decrease, and disconnects the currently-connected line. On the other hand, when the traffic amount increases to a certain threshold or higher, the traffic measurement portion 330 notifies the line management and address acquisition portion 324 of the increase, allowing connection to a new line where the address registration process operation is executed. This operation enables saving of the wireless resource within the cell, which thereby reducing a possibility that voice communications executed by individual passengers is rejected in the case where the mobile network is configured in a train such as a bullet train.

<The Third Example of Change in the Line Status>

The third example of a change in the line status refers to a case where a change in the line status occurs irrespective of the intention of the mobile router 105. That is, the line disconnection and/or the line reconnection occur irrespective of the intention of the mobile router 105, caused by a coverage status change caused by change in the wireless resource or in the surrounding buildings in the case of wireless communication, and caused by events such as plugging and/or unplugging of a cable or network congestion in the case of wired communication.

In preparation to these events, the mobile router 105 regularly checks the line status of individual communication interfaces. Alternatively, receiving the notification of the change in the line status by the communication interface, the line management and address acquisition portion 324 detects a change in the line status.

When the change in the line status is the line connection, the line information of the route information is also acquired at the same time.

The line information includes, for example, a type of communication interface, a bandwidth of the line, and combination thereof. Subsequently, the address registration process operation 221 is executed. On the other hand, in the case where the change in the line status is the line disconnection, the memory portion 325 is referred to, and if another communication interface is usable, the address deletion process operation 222 is executed using that communication interface.

<The Fourth Example of Change in the Line Status>

The fourth example of a change in the line status refers to a case where the mobile router 105 knows occurrence of a line disconnection before the line is actually disconnected. In this case, the address deletion process operation 222 was executed before the line is disconnected.

For example, in the case where a line is predicted to be disconnected in the near future due to some reasons, since the mobile router 105 is able to know a change in the line status in advance, it notifies the change in the line status to the home agent 117, prior to the change in the line status.

Specifically, this refers to a case where the mobile router 105 uses both a wireless LAN and a wireless line of IMT 2000 as access lines, and it has known in advance that the mobile router 105 will move to outside of the communication area of the wireless LAN in several seconds. In this case, the address deletion process operation 222 is executed, triggered by an event such positional information, opening and/or closing of a train door, traveling speed or the like.

<The Fifth Example of Change in the Line Status>

The fifth example of a change in the line status refers to a case where the home agent, in place of the mobile router, takes a lead in responding to the change in the line status (i.e., change in the address information).

Specifically, this example refers to a case where the home agent 117 investigates a change in the line status and updates the address information, and the mobile router 105 shares the address information upon the notification from the home agent.

The home agent 117 regularly transmits a packet for testing whether an address is usable or not to an address of the mobile router 105 that is registered in the control table, using ping or the like. Then it estimates that an address is not usable if there is no response from the mobile router 105 to that address, and deletes the address in the control table. In this case, the address deletion process 222 does not occur.

<The Sixth Example of Change in the Line Status>

The sixth example of a change in the line status refers to a case where the home agent 117 takes a lead in updating the address information.

The home agent 117 estimates currently-available addresses, based on the current position estimated based on the previously-known moving route of the mobile network 104 and the current time, or the positional information of the mobile network 104 using a system such as OPS, and updates the control table. In this case, the address registration process operation 221 or the address deletion process operation 222 does not occur.

<The Seventh Example of Change in the Line Status>

The seventh example of a change in the line status refers to a case where the address registration process operation 221 and the address deletion process operation 222 are executed, triggered by movement of the mobile network 104.

The mobile router 105 regularly checks the line status of individual communication interfaces. Alternatively, the line management and address acquisition portion 324 detects the line disconnection, upon receipt of the notification of the change in the line status by the communication interface.

Subsequently, when the mobile network 104 moves to a place where there is a network to which the mobile network 104 is connected, the mobile router 105 regularly checks the line status of individual communication interfaces, or the communication interface notifies the change in the line status. Accordingly, the line management and address acquisition portion 324 detects the line connection. Moreover, the line information is also acquired at the same time. For example, the line information includes, for example, a type of communication interface, a bandwidth of the line, and the combination thereof. Furthermore, both the address registration process operation 221 and the address deletion process operation 222 are executed.

Next, the address registration process operation 221 and the address deletion process operation 222 that occur triggered by the change in the line status as described above will be explained.

First, the address registration process operation 221 will be explained.

The address registration process operation 221 is operated as follows.

In the mobile router 105, the line management and address acquisition portion 324 acquires the address of the communication interfaces 312 to 315 using the DHCP protocol, an automatic address generation process of IPv6 or the like, and records a newly-acquired address, an interface number and the line information as the route information in the control table of the memory portion 325, thereby changing the status into "being registered." Next, the signaling packet generation portion 326 generates a signaling packet for requesting registration (registration request packet 202) which notifies the home agent 117 of a newly-acquired address and the characteristic information of the line, and delivers it to the transmission interface selection portion 329.

The transmission interface selection portion 329 refers to the control table of the memory portion 325, selects an interface which transmits the registration request packet 202 from currently-usable interfaces (that is, the interfaces of which the status of the line information is "registered" in the control table as shown in FIG. 5), and selects one of the I/O terminals 302 to 305 which corresponds to the interface selected from the communication interface 312 to 315. Accordingly, the registration request packet 202 is transmitted to the home agent 117, through the selected communication interface and I/O terminal. The registration request packet 202 reaches the home agent 117 through the access line terminal equipment, the packet exchange network, and the router.

When the registration request packet 202 reaches the home agent 117, it passes through the I/O terminal 401 and the communication interface 411 in the home agent 117, and reaches the packet classification portion 428.

The packet classification portion 428 identifies that the received packet is the registration request packet 202, and delivers the registration request packet 202 to the packet analysis portion 429. The packet analysis portion 429 analyzes the packet by associating it with the home address of the mobile router 105, and records the extracted new address and line information in the control table of the memory portion 426. Moreover, the packet analysis portion 429 instructs the signaling packet generation portion 427 to generate a signaling packet for acknowledgement (acknowledgement packet 203) in order to acknowledge normal completion of registration to the mobile router 105.

The signaling packet generation portion 427 delivers the acknowledgement packet 203 to the destination selection and timing control portion 421.

The destination selection and timing control portion 421 refers to the memory portion 426, selects one of the addresses that the mobile router 105 uses as a destination, and transmits the acknowledgement packet 203 to the mobile router 105 through the communication interface 411 and the I/O terminal 401.

The acknowledgement packet 203 reaches the mobile router 105, through the packet exchange network and the access line terminal equipment corresponding to the destination.

When the mobile router 105 receives the acknowledgement packet 203 from one of the communication interfaces 312 to 315 corresponding to one of the I/O terminals 302 to 305, the packet analysis portion 323 analyzes the received packet, thereby identifying that the packet is the acknowledgement packet.

Furthermore, the packet analysis portion 323 extracts the address which is successfully registered from the acknowledgement packet 203, changes the status of the applicable address in the control table of the memory portion 325 from "being registered" to "registered," and then discards the acknowledgement packet 203.

The address registration process operation 221 as described above enables the information on the usable addresses of the mobile router 105 to be shared between the mobile router 105 and the home agent 117, as shown in FIG. 5 of an example of the control table the mobile router 105 has and shown in FIG. 6 of an example of the control table the home agent 117 has.

Moreover, the home agent may add further route information by measuring a round-trip time for each address of the mobile router, or the like. Note that in the case where an address registration request is made from another interface before completion of registration of an address of an interface, a plurality of address registration process operations may be executed in parallel.

Furthermore, the policy information which is contained in the acknowledgement packet from the home agent may be distributed to the mobile router.

Next, the address deletion process operation 222 will be explained.

When the line disconnection 210 occurs, the following address deletion process operation 222 is executed.

When the line disconnection 210 occurs, the line management and address acquisition portion 324 notifies the memory portion 325 of the interface number which changed and occurrence of disconnection status event, and updates the status of that interface of the route information in the control table to "being deleted."

Next, the line management and address acquisition portion 324 notifies the signaling packet generation portion 326. The signaling packet generation portion 326 generates a deletion request packet 211 addressed to the home agent 117, in order to notify that the address which has been used becomes unusable of the interface that changed, and delivers it to the transmission interface selection portion 329.

The transmission interface selection portion 329 refers to the control table of the memory portion 325, and selects the interface to which the deletion request packet 211 is transmitted from the currently-usable communication interfaces. The deletion request packet 211 is transmitted to the home agent 117, passing through one of the I/O terminals 302 to 305 corresponding to one of the selected communication interfaces 312 to 315.

The deletion request packet 211 reaches the home agent 117, through the access line terminal equipment, the packet exchange network and the router.

When the deletion request packet 211 reaches the home agent 117, passes through the I/O terminal 401 and the communication interface 411 in the home agent 117, and reaches the packet classification portion 428.

The packet classification portion 428 identifies that the received packet is the deletion request packet 211, and delivers the deletion request packet 211 to the packet analysis portion 429. The packet analysis portion 429 analyzes the packet and extracts the address which has become unusable in the mobile router 105. Subsequently, it deletes the mute information of that address which is recorded, with being associated with the home address of the mobile router 105 in the control table of the memory portion 426.

Moreover, the packet analysis portion 429 instructs the signaling packet generation portion 427 to generate a signaling packet for acknowledgement (acknowledgement packet 212) in order to acknowledge normal completion of deletion to the mobile router 105.

The signaling packet generation portion 427 delivers the acknowledgement packet 212 to the destination selection and timing control portion 421.

The destination selection and timing control portion 421 refers to the memory portion 426, selects one of the addresses that are currently used by the mobile router 105 as a destination, and transmits the acknowledgement packet 212 to the mobile router 105 through the communication interface 411 and the I/O terminal 401.

The acknowledgement packet 212 passes through the packet exchange network and the access line terminal equipment corresponding to the destination, and reaches the mobile router 105.

When the mobile router 105 receives the acknowledgement packet 212 from one of the communication interfaces 312 to 315 corresponding to one of the I/O terminals 302 to 305, the packet analysis portion 323 analyzes the received packet and identifies that the packet is the acknowledgement packet. Furthermore, the packet analysis portion 323 extracts the address which is successfully deleted from the acknowledgement packet 212, changes the status of that address in the control table of the memory portion 325 from "being deleted" to "being stopped," and then discards the acknowledgement packet 212.

The address deletion process operation 222 as described above enables sharing of the usable address information of the mobile router 105 between the mobile router 105 and the home agent 117, based on the route information in the control rabies as shown in FIG. 5 and FIG. 6.

Next, the data communication process 232 between the mobile network node and the correspondent node will explained.

First, a flow of the packet from the mobile network node to the correspondent node will be explained.

A packet (packet A204) of which the destination is the correspondent node (address X.X.X.X in FIG. 4) and the sender is the mobile network node (address A.A.A.100 in FIG. 4) is transmitted from the mobile network node, and received through the I/O terminal 301 and the communication interface 311 (address A.A.A.100 in FIG. 4) that are connected to the mobile network 104 side of the mobile router 105.

The communication interface 311 of the mobile router 105 delivers the packet to the encapsulating portion 327 which encapsulates the received packet. Specifically, the encapsulating portion 327 uses the received packet A204 as the payload to generate a packet of which the destination in the header portion is set as the home agent 117 (address A.A.A.254 in FIG. 4). The encapsulating portion 327 delivers the packet it generates to the queuing portion 328.

The queuing portion 328 temporarily stores the delivered packets which are waiting for being transmitted. In a multi-traffic environment that includes traffics that belong to different classes, the queuing portion 28 stores packets in individual queues classified by Quality of Service (QoS) classes. The queue may further be divided by each flow.

Figure 7:
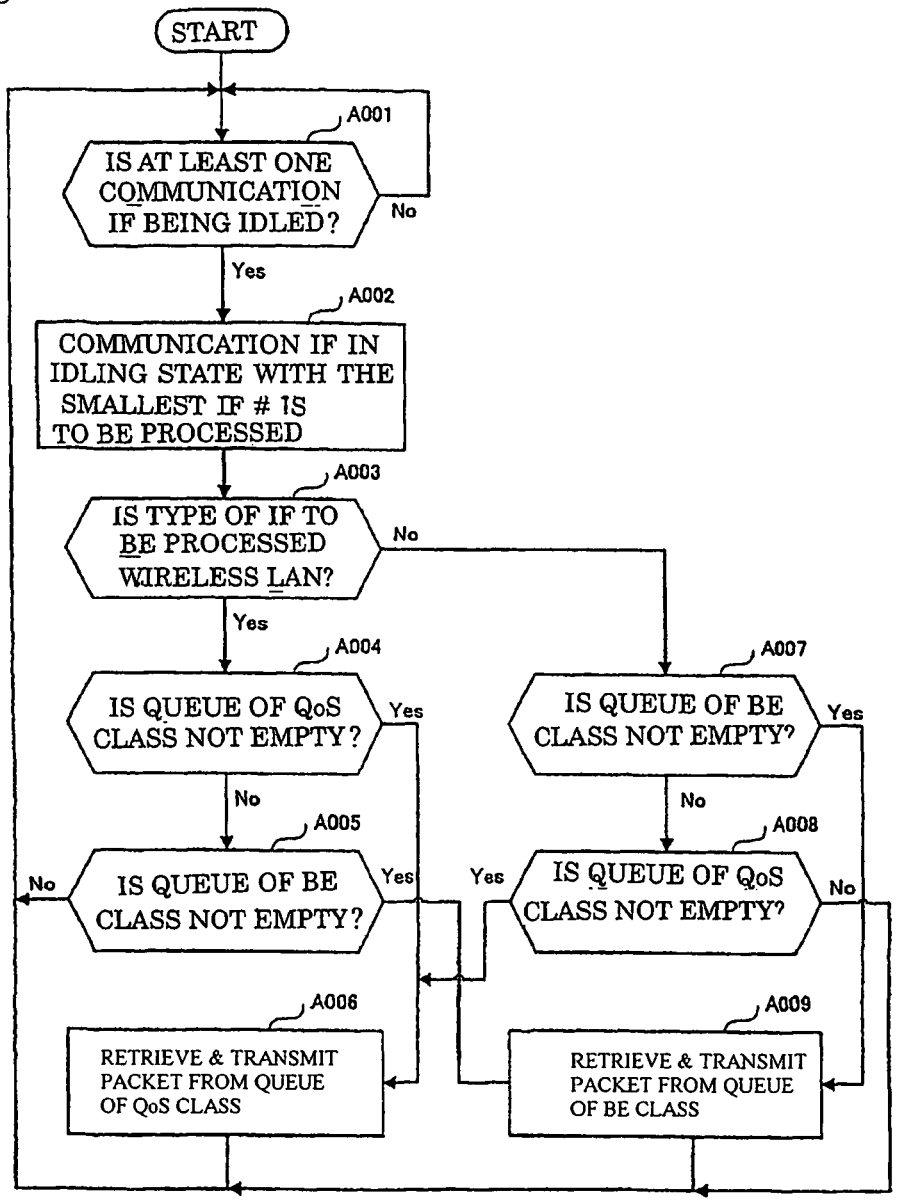
FIG. 7 shows an operation of a transmission interface selection portion 329.

An operation of the transmission interface selection portion 329 will be explained, referring to FIG. 7. Note that, for explanatory purpose, it is assumed that there are two classes: QoS and Best Effort (BE) in the QoS class and the QoS class requires a high throughput. Moreover, there are two types of communication interfaces; that are IMT-2000 and wireless LAN. However, in actual applications, any number of QoS classes is acceptable, and a communication interface with another type may also be used.

The transmission interface selection portion 329 manages the communication interface based on the route information in the control table of the memory portion 325, and judges whether at least one communication interface is in the idle state (that is, the status of the route information is "registered") and packet transmission is possible (Step A001). In the case where all communication interfaces are in a busy status (that is, status of the route information is "being registered" or "being stopped"), the operation returns to Step A001. In the case where there is at least one communication interface, a communication interface which is in the idle state and numbered with the smallest number that is assigned for administration purpose is subject to the process (Step A002).

Next, the route information in the memory portion 325 is referred to, and a type of the communication interface to be processed is identified, and it is judged whether the communication interface is wireless LAN (Step A003).

In the case of the wireless LAN, since higher throughput is expected than IMT-2000, traffic transmission in the QoS class is tried. Next, it is judged whether queue for the QoS class is empty or not (Step A004). At this time, a queue for the QoS class may exist for each flow. In the case where there is a queue for each flow, it is judged whether at least one queue is not empty. If the queue for the QoS class is not empty, it is determined that the packet is retrieved from the queue for the QoS class of the queuing portion 328 and transmitted (Step A006).

If there is a queue for each flow, a queue which retrieves a packet using any desired algorithm may be selected. If the queue for the QoS class is empty, it is judged whether the queue for the BE class is not empty (Step A005).

In a similar manner, if there is a queue for each flow, it is judged whether at least one queue is not empty. If the queue for the BE class is not empty, it is determined that the packet is retrieved from the queue for the BE class of the queuing portion 328 and transmitted (Step A009). In the case where there is a queue for each flow, a queue which retrieves the packet using any desired algorithm may be selected. In the case where the queue for the BE class is also empty, the operation returns to Step A001.

When it is judged at Step A003 that a type of the communication interface is IMT-2000, traffic transmission in the BE class is tried. Next, it is judged whether the queue for the BE class is empty or not (Step A007).

At this time, the queue for the BE class may exist for each flow. In the case where there is a queue for each flow, it is judged whether at least one queue is not empty. If the queue for the BE class is not empty, it is determined that the packet is retrieved from the queue for the BE class of the queuing portion 328 and transmitted (Step A009). In the case where there is a queue for each flow, a queue which retrieves a packet using any desired algorithm may be selected. If the queue for the BE class is empty, it is judged whether the queue for the QoS class is not empty (Step A008).

In a similar manner, in the case where there is a queue for each flow, it is judged whether at least one queue is not empty. If the queue for the QoS class is not empty, it is determined that the packet is retrieved from the queue for the QoS class of the queuing portion 328 and transmitted (Step A006). In the case where there is a queue for each flow, a queue which retrieves a packet using any desired algorithm may be selected. If the queue for the QoS class is also empty, the operation returns to Step A001.

Note that, in place of a type of the communication interfaces, the QoS class may be selected based on other information such as the bandwidth, the bit error rate in the wireless period, or the like. Moreover, the communication interface may be selected using another indicator such as reliability.

Next, the transmission interface selection portion 329 sets the sender address in the header portion of the packet to the address of the selected communication interface (address B.B.B.200 in FIG. 4 (packet B205).

Furthermore, in the case where the communication interface is selected based on the policy information, for example, a following operation is possible. Hereafter, the transmission interface selection operation of the transmission interface selection portion 329 will be explained referring to FIG. 11, in the case where the billing information as the policy information is used and a traffic of a single class is handled for the sake of simplicity.

Note that this operation may be combined with the transmission interface selection operation in the above described multi-traffic environment. FIG. 9 and FIG. 10 show examples of a control tables containing the billing information, which the mobile router 105 and the home agent 117 have.

Figure 11:
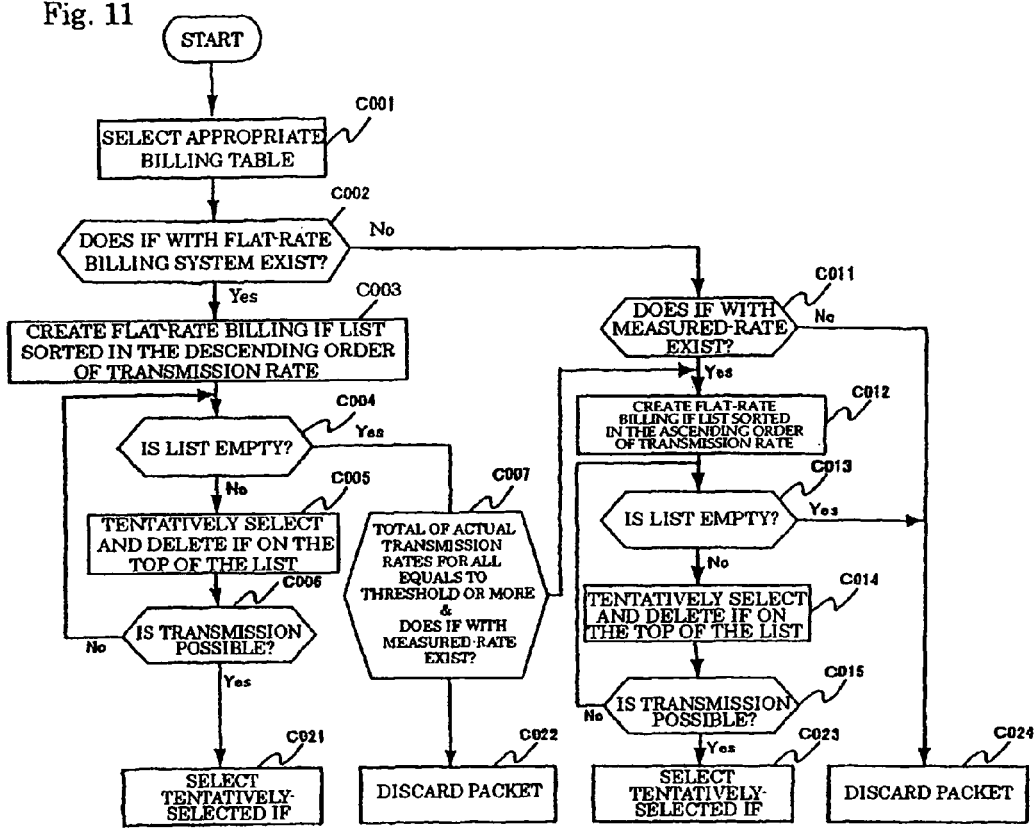
FIG. 11 is a flowchart showing a transmission interface selection algorithm of the mobile router and a destination address selection algorithm of the home agent.

Provided that it is assumed that all interfaces that exist in the tables shown in FIG. 9 and FIG. 10 are usable. FIG. 11 shows an example of an interface selection algorithm of the mobile router 105 when the packet is transmitted. The transmission interface selection portion 329 makes available the billing information, which is the policy information it already has and is applied at that time. For example, in the case where the billing system changes depending on time, a table as shown in FIG. 5 is made referable. On the other hand, in the case where the billing system changes depending on a position of the mobile router, a positional information of the mobile router is acquired and a table as shown in Table 10 is made referable (Step C001).

Note that a table may depend both on time and positional information.

Next, it is checked whether there is an interface adopting the flat-rate billing system among the interfaces that the transmission interface selection portion 329 has (Step C002).

In the case where there is such an interface, a list is created by sorting the interfaces adopting the flat-rate billing system in the descending order of the transmission rate (Step C003).

When it is checked whether the list is empty (Step C004), since at least one list exists, an interface described in the front line of the list is tentatively selected and deleted from the list (Step C005). Next, it is checked whether transmission is possible with the temporarily selected interface, assuming a case where transmission is not possible because the queue for transmission is full (Step C006). If transmission is possible, that interface is selected (Step C021).

If transmission is not possible, the operation returns to Step C004, and the interface is selected again from the list. In the case where transmission is impossible with all interfaces, the list becomes empty at Step C004.

Therefore, it is subsequently checked whether the both the condition that a total of actual transmission rates of all interfaces equals to or is greater than a threshold; and the condition that there is an interface adopting the measured-rate billing system are both satisfied (Step C007). The threshold herein refers to the total of the transmission rate of the interface adopting a flat-rate billing system plus the margin. (Provided that the margin is 0 or more.) If either of the conditions is not satisfied, the packet is discarded (Step C022).

In this case, based on the condition that the total of the actual values of the transmission rate of all interfaces equals to or greater than the threshold, in the case where a traffic load does not exceed a certain level, it is possible to curb a service fee by using only the interface adopting the flat-rate billing system. Moreover, the packet may not be discarded at Step C022, and interfaces may be selected again after a certain period of time has passed.

In the case where the conditions are satisfied, the operation proceeds to Step C012.

In the case where there is not an interface adopting the flat-rate billing system at Step C002, it is checked whether there is an interface adopting the measured-rate billing system (Step C011).

In the case where there is no such interface, the packet is discarded (Step C024).

In the case where there is an interface adopting the measured-rate billing system, a list of the interfaces adopting the measured-rate billing system which is sorted in the ascending order of the unit price is created (Step C012). When it is checked whether the list is empty (Step C013), since there is at least one list, an interface described in the front line of the list is tentatively selected and deleted from the list (Step C014). Next, it is checked whether transmission is possible with the temporarily selected interface (Step C015), if transmission is possible, that interface is selected (Step 023). If transmission is impossible, the operation returns to STEP C013 and the interface is selected again from the list. In the case where transmission is impossible with all interfaces, since the list becomes empty in the list at Step C013, the packet is discarded (Step C024).

Next, as another method of selecting the communication interface, an example will be explained in which the billing information is used as the policy information and communication interface is selected so that a user's communication fee is minimized, referring to FIG. 19.

FIG. 19 shows an example of a control table containing the billing information that the mobile router 105 has. The addresses and the route information for four communication interfaces are registered in the control table as shown in FIG. 19. Among the four communication interfaces, the communication interface with the communication interface number 1 is wireless LAN, with a bandwidth of 11 Mbps and adopts the measured-rate billing system. The rest of the communication interfaces with the communication interface numbers 2, 3, 4 is IMT-2000 with a bandwidth of 384 kbps and adopt the measured-rate the billing system.

The communication interface is selected in the case where all communication interfaces adopt the measured-rate billing system as described above.

First, available communication interface is examined. In this case, in the control table as shown in FIG. 19, all communication interfaces are registered and available.

Next, a bandwidth required for communication is examined. It is assumed herein that the required bandwidth is 11.5 Mbps. Note that the required bandwidth may be predetermined and stored, or may be acquired from the outside as necessary.

Each bandwidth is added in the ascending order of the communication interface number so that the total thereof does not exceed but is the closest to the required bandwidth. In this case, addition of the bandwidths of the wireless LAN and the two IMT-2000, the total bandwidth becomes 11.384 Mbps. Furthermore, a difference from the required bandwidth is 11.5−11.384=116 kbps. Accordingly, only 116 kbps of the bandwidths of IMT-2000 of the communication interface 3 is used.

Accordingly, the communication interfaces (lines) to be selected are the wireless LAN of communication interface number 1, and IMT-2000 of communication interface numbers 2, 3. Only 116 kbps of IMT-2000 of communication interface number 3 is used.

Next, as another method of selecting the communication interface (line), an example will be explained in which the billing information is used as the policy information and both flat-rate billing and measured-rate billing exist, and a communication interface (line) is selected so that the user's communication fee is minimized, referring to FIG. 20.

FIG. 20 shows an example of a control table containing the billing information, which the mobile router 105 has. The addresses and the route information for four communication interfaces are registered in the control table as shown in FIG. 20. Among the four communication interfaces, the communication interface with communication interface number 1 is wireless LAN with a bandwidth of 11 Mbps and adopts the flat-rate billing system. The rest of the communication interfaces with the communication interface numbers 2, 3, 4 are IMT-2000 with a bandwidth of 384 kbps and adopt the measured-rate the billing system. The communication interface is selected as follows, in the case where both the flat-rate billing system and the measured-rate billing system exist.

First, available communication interface is examined. In this case, in the control table as shown in FIG. 20, all communication interfaces are registered and available.

Next, a bandwidth required for communication is examined. It is assumed herein that the required bandwidth is 11.5 Mbps. First, the communication interface adopting the flat-rate billing system is selected. Since the wireless LAN with communication interface number 1 adopts the flat-rate billing system, this wireless LAN with communication interface number 1 is selected.

Subsequently, a difference between the total of the bandwidths of the selected communication interfaces and the required bandwidth is found. Since the bandwidth of the selected communication interfaces is 11 Mbps, the difference from the required bandwidth is 0.5 Mbps.

Next, another communication interface adopting the flat-rate billing system is searched, and the total bandwidth is found by adding each bandwidth of the already selected communication interfaces. In the case where there is no other communication interface adopting the flat-rate billing system, communication interfaces adopting the measured-rate billing system are searched. In this example, since there is no other communication interface adopting the flat-rate billing system, a communication interface adopting the measured-rate billing system is searched, and IMT-2000 with communication interface number 2 is selected. Since the total bandwidths of the selected communication interfaces is 11.384 Mbps, the difference from the required bandwidth is 116 kbps. Accordingly, only 116 kbps of the bandwidth of IMT-2000 of the communication interface 3 is used.

Accordingly, the communication interfaces (lines) to be selected are the wireless LAN of communication interface number 1, and IMT-2000s of communication interface numbers 2, 3. Only 116 kbps of IMT-2000 with the communication interface number 3 is used.

Use of the method of selecting the communication interface like this reduces the user's communication fee.

In the communication interface selected by the method as described above, the transmission interface selection portion 329 assigns sequential numbers such as 1, 2, 3 . . . to the packet B205, so that the packets are aligned in order.

Provided that combination of the destination and sender and the correspondent node and mobile network node may be distinguished, and independent serial numbers may be assigned for individual combinations. Any method may be used for assigning serial numbers.

The packet B205 is transmitted to the home agent 117, passing through the I/O terminal corresponding to the selected communication interface. The packet B205 reaches the home agent 117, through the access line terminal equipment and the packet exchange network.

When the packet B205 reaches the home agent 117, it passes through the I/O terminal 401 and the communication interface 411 in the home agent 117, and reaches the packet classification portion 428.

The packet classification portion 428 identifies that the received packet is the data communication packet from the mobile network node to the correspondent node, and delivers the packet B205 to the buffer and sequence control portion 425.

Next, an operation of the buffer and sequence control portion 425 will be explained using positive numbers p and q.

In the case where the packet is not buffered, the buffer and sequence control portion 425 refers to the serial number which is added to the packet by the mobile router 105. If the serial number is the next serial number (p+1) of the latest original serial number (p) of the packets that were received so far, the packet is delivered to the decapsulating portion 424.

In the case where the received packet has the serial number (p+q) due to a loss of packet with the serial number (p) or thereafter, a delay, or the like, the received packets are buffered for, for example, at most 1 second. In the case where the next packet is delivered within a buffer period, packets that continue starting from the original serial number, including the packet to be buffered and the packet that was delivered, are sorted in the order of the serial number, and then delivered to the decapsulating portion 424.

Next, the original serial number is changed to the largest serial number of the packets that were delivered to the decapsulating portion 424. If the numbers are not serial, the packets are not delivered to the decapsulating portion 424 at that point. This process is repeated every time the packet is delivered.

In the case where all packets up to the serial number (p+q−1) are not delivered to the buffer and sequence control portion 425 within 1 second, all packets up to the serial number (p+q) are sorted in the order of the serial number, and delivered to the decapsulating portion 424.

The operation described above is one example of the operations of the buffer and sequence control portion 425. The packet may be buffered for any time period. Moreover, another type of sequence control algorithm may be used.

The decapsulating portion 424 removes the header of the delivered packet, and retrieves the packet A206 which corresponds to the payload portion.

The retrieved packet A206 passes through the communication interface 411 and the I/O terminal 401, and is transferred to the correspondent node.

The packet A206 passes through the packet exchange network and reaches the correspondent node.

Next, a flow of the packet from the correspondent node to the mobile network node will be explained.

The route of the packet C207 transmitted from the correspondent node to the mobile network node is controlled by the router, and is transferred to the home agent 117.

When the packet C207 reaches the home agent 117, it passes through the I/O, terminal 401 and the communication interface 411 in the home agent 117, and reaches the packet classification portion 428.

The packet classification portion 428 identifies that the received packet is the data communication packet from the correspondent node to the mobile router 105, and delivers the packet C207 to the encapsulating portion 423. The encapsulating portion 423 capsulates the received packet. Specifically, the encapsulating portion 423 uses the received packet C207 as the payload to generate a packet with the destination in the header portion set as the mobile router 105 (address B.B.B.200 in FIG. 4). The encapsulating portion 423 delivers the packet it generated to the queuing portion 422.

The queuing portion 422 temporarily stores the delivered packet which is waiting for transmission.

In a multi-traffic environment that includes traffics that belong to different QoS classes, the queuing portion 422 stores the packet in a queue classified by QoS class. The queue may further be divided for each flow.

Figure 8:
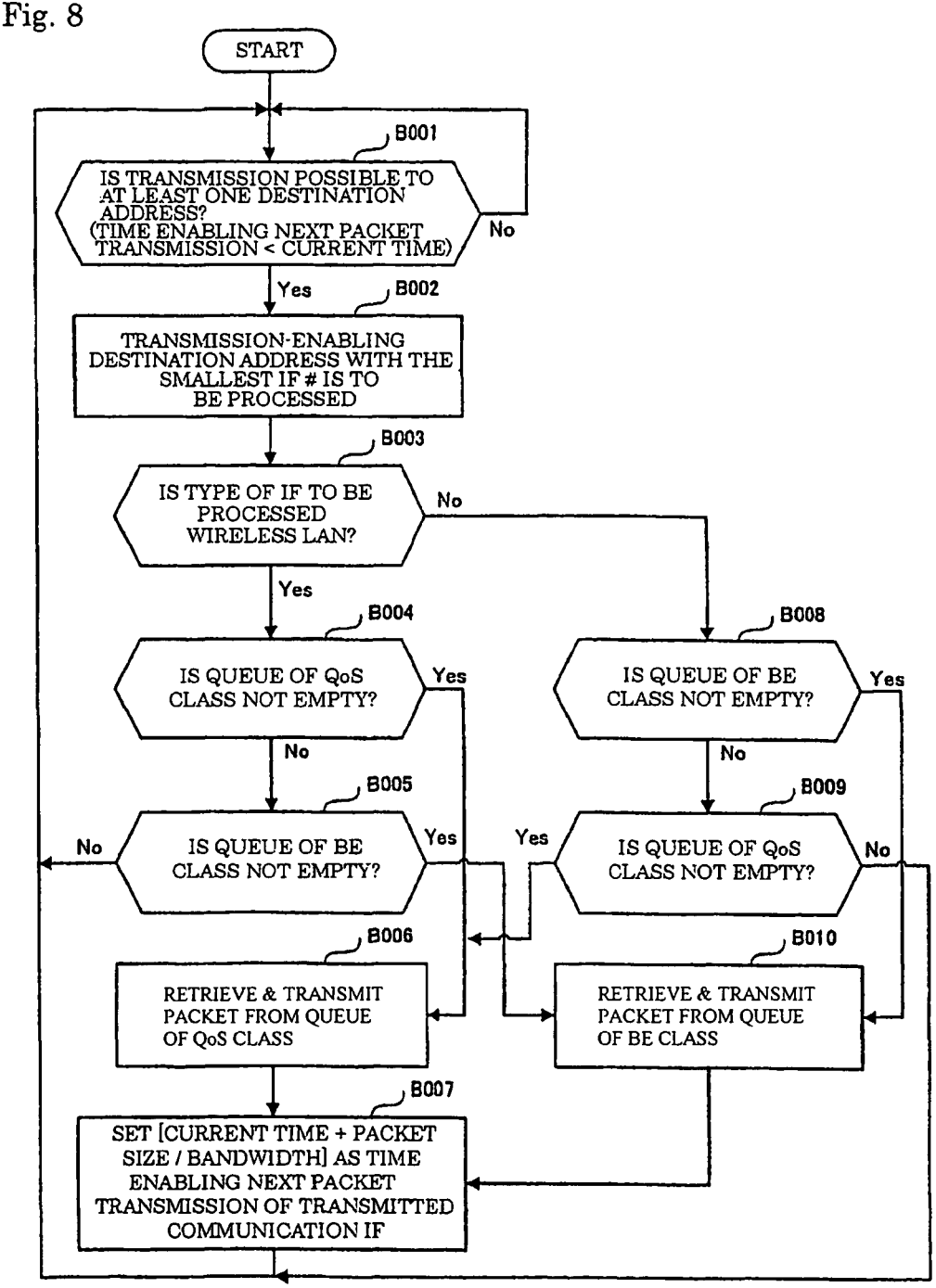
FIG. 8 shows an operation of an destination selection and timing control portion 421.

Next, an operation of the destination selection and timing control portion 421 in the multi-traffic environment will be explained, referring to FIG. 8.

Note that, there are two classes: QoS and BE in the QoS class, and the QoS class requires high throughput. Moreover, there are two types of communication interfaces: IMT-2000 and wireless LAN. However, in actual applications, any number of QoS classes is acceptable, and a communication interface with another type may also be used.

The destination selection and timing control portion 421 manages the transmission timing of the packet, and judges whether transmission of the packet is possible to at least one destination address (Step B001).

Specifically, the destination selection and timing control portion 421 refers to the memory portion 426, and judges whether the time allowing the next packet transmission held for each destination address is before the current time. This is in order to prevent too many packets from being delivered from the home agent on the route, and them from being lost in the router on the route.

In the case where it is judged that transmission is impossible to all destination addresses at B001, the operation returns to Step B001 again.

In the case where there is at least one destination address to which transmission is possible, the destination address to which transmission is possible, and which has the smallest communication interface number assigned for management purpose is subject to the process (Step B002).

Next, the information in the memory portion 426 is referred to, a type of the communication interfaces to be processed is identified, and it is judged whether the communication interface is the wireless LAN or not (Step B003).

In the case of the wireless LAN, since higher throughput is expected than IMT-2000, traffic transmission in the QoS class is tried. Next, it is judged whether queue for the QoS class is empty or not (Step B004). At this time, a queue for the QoS class may exist for each flow. In the case where there is a queue for each flow, it is judged whether at least one queue is not empty.

If the queue for the QoS class is not empty, it is determined that the packet is retrieved from the queue for the QoS class of the queuing portion 422 and transmitted (Step B006). In the case where there is a queue for each flow, a queue may be selected which retrieves a packet using any desired algorithm.

If the queue for the QoS class is empty, it is judged whether the queue for the BE class is not empty (Step B005).

Similarly, in the case where there is a queue for each flow, it is judged whether at least one queue is not empty. If the queue for the BE class is not empty, it is determined that the packet is retrieved from the queue for the BE class of the queuing portion 422 and transmitted (Step B010). In the case where there is a queue for each flow, a queue retrieving the packet using any desired algorithm may be selected. In the case where the queue for the BE class is also empty, the operation returns to Step B001.

When it is judged at Step B003 that a type of the communication interface is IMT-2000, traffic transmission in the BE class is tried. Next, it is judged whether the queue for the BE class is empty or not (Step B008).

At this time, the queue for the BE class may exist for each flow. In the case where there is a queue for each flow, it is judged whether at least one queue is not empty.

If the queue for the BE class is not empty, it is determined that the packet is retrieved from the queue for the BE class of the queuing portion 422 and transmitted (Step B010). In the case where there is a queue for each flow, a queue which retrieves a packet using any desired algorithm may be selected. If the queue for the BE class is empty, it is judged whether the queue for the QoS class is not empty (Step B009).

In a similar manner, in the case where there is a queue for each flow, it is judged whether at least one queue is not empty. If the queue for the QoS class is not empty, it is determined that the packet is retrieved from the queue for the QoS class of the queuing portion 422 and transmitted (Step B006). In the case where there is a queue for each flow, a queue which retrieves a packet using any desired algorithm may be selected. If the queue for the QoS class is also empty, the operation returns to Step B001. Note that, the QoS class may be selected based on other information such as the bandwidth, the bit error rate in the wireless period, or the like, in place of a type of the communication interfaces. Moreover, the communication interface may be selected using another indicator such as reliability.

In the process as described above, in the case where packet transmission is executed, the next packet transmission timing has been calculated (Step B007). For example, in the case where the destination address with the bandwidth of 384 kbps (that is, the address of the communication interface of the mobile router 105) is selected, when the packet with a data size of 1500 bytes is transmitted, the time allowing the next packet transmission is updated for the applicable destination address in the control table stored in the memory portion 426, so that the next packet is transmitted after 31.25 ms. Provided that the transmission timing may be updated, allowing burst characteristics to some extent, such as by using a leaky bucket.

Furthermore, in the case where the communication interface is selected from the policy information, an operation such as one described below is possible. Since the operation is the same as the transmission interface selection operation of the transmission interface selection portion 329 as explained using FIG. 11, only a portion different from that operation will be explained.

The destination selection and timing control portion 421 is different from the transmission interface selection portion 329, in that it determines the destination address in place of the transmission interface, and in determination criteria as to whether transmission is possible to the destination address. Whether transmission is possible or not is judged by calculated packet transmission timing, rather than by whether the queue for transmission is flooded or not.

For example, in the case where the destination address with a bandwidth of 384 kbps is selected, and when a packet with a data size of 1500 bytes is transmitted, the time allowing the next packet transmission is updated for the applicable destination address in the control table stored in the memory portion 426 so that the next packet is transmitted after 31.25 ms. When the same destination address is selected in the next time, even in the case where the time is not the exact timing allowing next packet transmission, it is judged that transmission is possible, in order to allow a certain degree of burst characteristic. Later, an operation of updating the timing allowing next packet transmission is repeated. When transmission possibility is checked, the timing allowing next packet transmission deviates from the current time by the threshold or more, it is judged that transmission is not possible.

By satisfying this condition, it is possible to select the destination address, and control the transmission timing.

Next, the destination selection and timing control portion 421 sets the destination in the header of the packet (packet D208).

As an example of other methods of selecting such a destination address (address of the communication interface of the mobile router 105), the aforementioned method of selecting the communication interface (i.e. line) of the mobile router 105 may also be used. Hereinafter, an example thereof will be explained. FIG. 21 is an example of the control table containing the billing information, which is retained by the home agent 117.

Four addresses: C.C.C.50, B.B.B.200, B.B.B.201 and B.B.B.202 and the route information are registered in the control table as shown in FIG. 21.

Among the four addresses, the address C.C.C.50 has a wireless LAN-type communication interface with a bandwidth of 11 Mbps and the measured-rate billing system. The remaining three addresses: B.B.B.200, B.B.B.201 and B.B.B.202 has an IMT-2000-type communication interface, with a bandwidth of 384 kbps and the measured-rate billing system. In the case where all communication interfaces adopt the measured-rate billing system as described above, the communication interface is selected as described below.

First, the bandwidth required for communication is examined. In this example, the required bandwidth is assumed to be 11.5 Mbps. Next, each bandwidth of the addresses that is on the upper level of the control table is added sequentially, so that the total does not exceed but is the closest to the required bandwidth. In this example, by adding the bandwidth of the address C.C.C.50 of the wireless LAN and the bandwidths of the two addresses B.B.B.200, B.B.B.201 of the IMT-2000, the total bandwidth reaches 11.384 Mbps. Furthermore, the difference from the required bandwidth is 11.5−11.384=116 kbps. Therefore, to fill the shortage of the bandwidth of 116 kbps, the remaining B.B.B.202 of the IMT-2000 will be used.

Accordingly, the addresses (i.e. lines) to be selected are C.C.C.50, B.B.B.200, B.B.B.201 and B.B.B.202. Only 116 kbps is used out of all bandwidths in the address B.B.B.202.

Next, as another method of selecting the communication interface (line), an example will be explained in which the billing information is used as the policy information, so that the user's communication fee is minimized, referring to FIG. 22.

FIG. 22 is an example of the control table containing the billing information, which is retained by the home agent 117. In the control table as shown in FIG. 22, out of the four addresses, the address C.C.C.50 is for a wireless LAN type communication interface with a bandwidth of 11 Mbps and the flat-rate billing system. The three remaining addresses, B.B.B.200, B.B.B.201, and B.B.B.202 are for IMT-2000-type communication interface with a bandwidth of 384 kbps and the measured-rate billing system. As described above, in the case where both the flat-rate billing system and the measured-rate billing system exist together, the communication interface is selected as follows.

First, the bandwidth required for communication is examined. In this example, it is assumed that the required bandwidth is 11.5 Mbps. First, the address adopting the flat-rate billing system is selected. In this example, since the wireless LAN of the address C.C.C.50 adopts the flat-rate billing system, the address C.C.C.50 is selected.

Subsequently, the difference between the total of the bandwidths of the selected addresses and the required bandwidth is found. Since the selected address C.C.C.50 has a bandwidth of 11 Mbps, the difference from the required bandwidth is 0.5 Mbps.

Next, other addresses adopting the flat-rate billing system are searched, and each of the bandwidths of the selected addresses is added to find the total bandwidth. In the case where there is no other address adopting the flat-rate billing system, the addresses adopting the measured-rate billing systems are searched. In this example, since there is no other address adopting the flat-rate billing system, the address adopting the measured-rate billing system is searched, and IMT-2000 with the address B.B.B.200 is selected. Since the total amount added with the bandwidth of the selected address B.B.B.200 is 11.384 Mbps, the difference from the required bandwidth is 116 kbps. Accordingly, only 116 kbps of the bandwidth of the address B.B.B.201 is used.

Therefore, the addresses (i.e. line) to be selected are wireless LAN with the address C.C.C.50 and IMT-2000 with the addresses B.B.B.200, B.B.B.201. In the IMT-2000 with the address B.B.B.201, only 116 kbps out of the all bandwidth is used.

Use of a method of selecting the address (i.e. line) like this reduces the user's communication fee.

In the address (i.e. line) as selected by the method as described above, the packet D208 is assigned with serial numbers, such as 1, 2, 3, . . . , so that the packets are sequentially aligned in the mobile router 105. Provided that any method of assigning the serial numbers may be used. Moreover, combination of the destination and sender, and the mobile network node and correspondent node may be identified, and serial numbers that are independent of each combination may be assigned.

The packet D208, in accordance with the destination, passes through the packet exchange network and the access line terminal equipment, and reaches the mobile router 105.

The mobile router 105 receives the packet D208, through one of the I/O terminals 302 to 305 and one of the corresponding communication interfaces 312 to 315. The packet analysis portion 323 analyzes the packet.

The packet analysis portion 323 identifies that the received packet is a packet addressed to the mobile network node, and delivers it to the buffer and sequence control portion 322.

The buffer and sequence control portion 322 uses the serial numbers added by the home agent 117 to execute a sequence control operation which is, for example, the same as one executed by the buffer and sequence control portion 425 of the home agent 117. Provided that the sequence control may be executed using a method different from that of the buffer and sequence control portion 425 of the home agent 117.

The decapsulating portion 321 removes the header of the delivered packet and retrieves the packet B209 corresponding to the payload portion. The retrieved packet B209 passes through the communication interface 311 and the I/O terminal 301, and is transferred to the correspondent node.

The packet B209 reaches the destination mobile network node in the mobile network 104.

Note that, the encapsulating technology explained above is one example of executing tunneling between the mobile router and the home agent. The tunneling may be realized by using the header option of MIPv6 or Multi Protocol Label Switching (MPLS), as another means. In this case, the encapsulating portion and the decapsulating portion of the mobile router and the home agent are replaced by the functional portions corresponding to the art used herein.

Moreover, in the embodiment described above, a case, as an example, is explained where the mobile router 105 and the home agent correspond to each other in one-to-one association. However, the invention is not limited to this, and they may have many-to-one association in which a plurality of the mobile routers correspond to a single home agent. In this case, the home agent is configured to have a control table that stores the address and the route information of the mobile router for each mobile router.

According to the present invention, even in the case where the network, such as a network configured in the vehicle, moves in a wide area, the best communication environment in the area where the network is located can be provided by combining the lines of the services available to the users of the mobile network.

Figure 37:
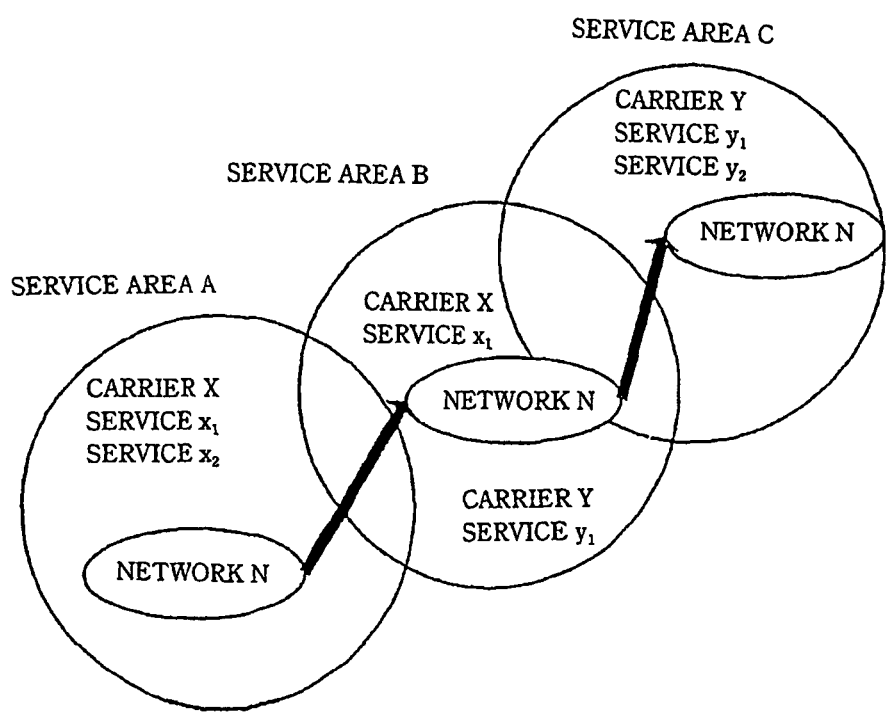
FIG. 37 is a chart explaining a conventional art.

For example, under a condition as described related to the conventional art as shown in FIG. 37, there may be a case where the network N moves in the order of the area A, the area B and the area C. Even in this case, the network N is able to use a single logical line configured by combining the lines under the services x1, x2 provided by the carrier X in the area A, a single logical line configured by combining the lines under the service x1 provided by the carrier X and the service y1 provided by the carrier Y in the area B, and a single logical line configured by combining the lines under the services y1, y2 provided by the carrier Y in the area C. As a result, influence of the position of the network on the communication can be reduced to the minimum.

Moreover, in the aforementioned embodiment, all or some of the packet analysis portion 323, the buffer and sequence control portion 322, the decapsulating portion 321, the line management and address acquisition portion 324, the signaling packet generation portion 326, the encapsulating portion 327, the queuing portion 328, the transmission interface selection portion 329 and the traffic measurement portion 330 of the mobile router may be replaced by CPU or MPU. Furthermore, a program stored in the storage media such as ROM, RAM or the like may be used, to configure the CPU or MPU such that it operates as the packet analysis portion 323, the buffer and sequence control portion 322, the decapsulating portion 321, the line management and address acquisition portion 324, the signaling packet generation portion 326, the encapsulating portion 327, the queuing portion 328, the transmission interface selection portion 329 and the traffic measurement portion 330.

Moreover, in a similar manner, all or some of the packet classification portion 428, the packet analysis portion 429, the signaling packet generation portion 427, the encapsulating portion 423, the destination selection and timing control portion 421, the buffer and sequence control portion 425, the decapsulating portion 404 of the home agent may be replaced by CPU or MPU. Furthermore, a program stored in the storage media such as ROM, RAM or the like may be used to configure the CPU or MPU such that it operates the packet classification portion 428, the packet analysis portion 429, the signaling packet generation portion 427, the encapsulating portion 423, the destination selection and timing control portion 421, the buffer and sequence control portion 425 and decapsulating portion 404, as described above.

Furthermore, the aforementioned embodiment may be configured such that, when updating the route information, the transmission history after upgrade becomes effective and the route information after upgrade are referred to such that the transmission delay after the upgrade is estimated, and the result is reflected to the packet scheduling which selecting the route and transmits the packet. Accordingly, decrease in efficiency in multiplication in a system where the status of individual routes are dynamically changes can be prevented.

Hereafter, the packet scheduling will be explained.

Figure 12:
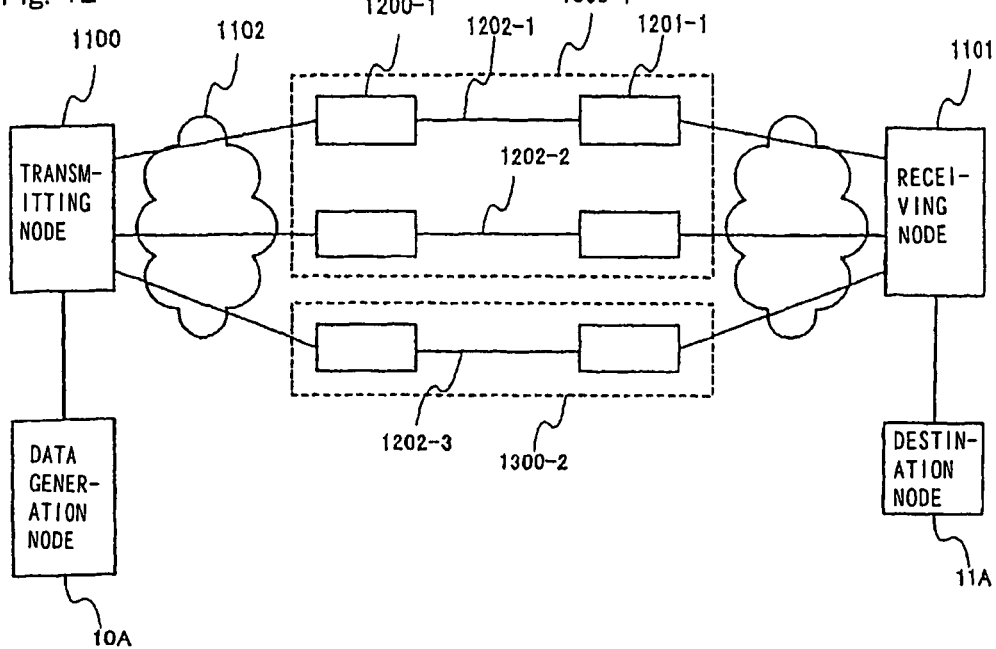
FIG. 12 shows a configuration of a node-to-node route.

In order to facilitate understanding of the packet scheduling, FIG. 12 shows an example of the whole configuration of a system which simplifies the configuration as shown in FIG. 1. In this example, a transmitting node 1100 and a receiving node 1101 are provided on a route starting from a data generation node 10A to the destination node 1A. The transmitting node 1100 and the receiving node 1101 configures a single logical line by appropriately combining lines of a plurality of communication means containing a same or different types of services, as proposed by the present invention. Moreover, the transmitting node 1100 and the receiving node 1101 correspond to the mobile router 105 and the home agent 117.

There are three routes between the transmitting node 1100 and the receiving node 1101, each of which includes wireless links 1202-1 to 1202-3 as the communication path between wireless transmission means 1200-1 to 1200-3 and wireless receiving means 1201-1 to 1201-3.

Although the diagram shows the case where three routes are used, any number of routes which is more than one may be used. Although all routes between the transmitting and receiving nodes may be wireless, in generally cases the routes include a wired network 1102. Moreover, generally, individual wireless links belong to different wireless networks 1300. In this example, the routes 1202-1, 1202-2 are cellular networks, and a wireless network 1300-1 and a wireless network 1300-2 are wireless LANs.

In a system as shown in FIG. 12, the transmitting node 1100 distributes the traffic received from the data generation node 10A based on the status information to each route, and the receiving node 1101 reintegrates the traffic from the transmitting node 1100 through each route, and transmits it to the destination node 11A.

Figure 13:
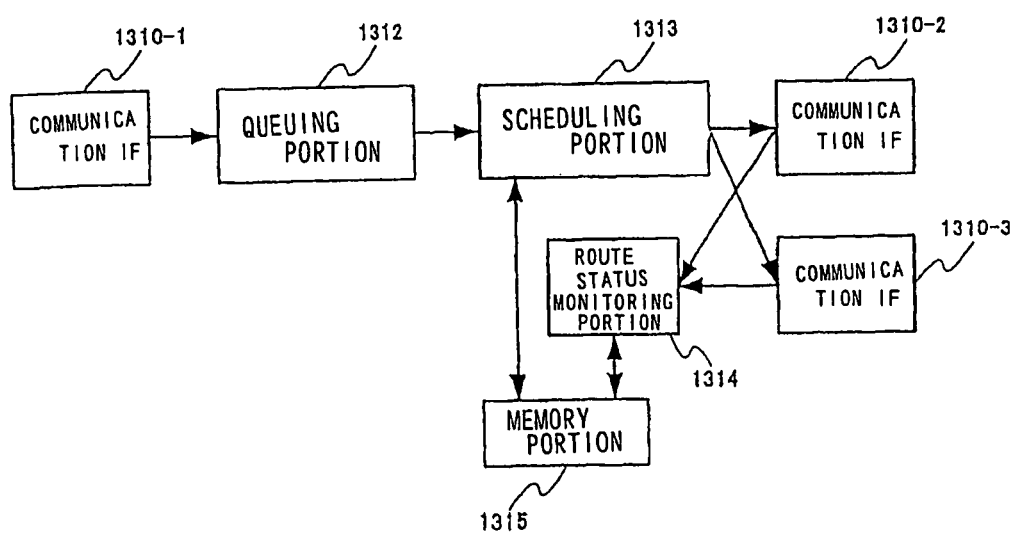
FIG. 13 shows a configuration of the transmitting node.

FIG. 13 shows an internal configuration of the transmitting node 1100.

The traffic transmitted from the data generation node 10A to the destination node 11A is input through the communication interface 1310-1. Further, the traffic passes through the queuing portion and the scheduling portion, and is sent out from transmitting communication interfaces 1310-2 or 1310-3 of the multiplexed line. There may be a case where a plurality of the routes share a physical link which is the closest to the transmitting node. Therefore, the route configuring the link does not always correspond one-to-one to the communication interface.

The scheduling portion 1312 retrieves the input data from the queuing portion and sends it out to a specific route. The route used for transferring the retrieved data is selected by referring to the route status managed by a route status monitoring portion 1314. The route status monitoring portion 1314 intermittently receives, from the receiving node 1101 through the communication interface 1310-2 or 1310-3, the status information of the route and information identifying a transmission packet which makes the upgrade effective, and upgrades the status information stored in the memory portion 1315 based on such information. The status information of the route herein refers to general information which serves as an indicator of the communication performance. The present embodiment uses a transmission rate of the route and a packet delay. Various methods have been proposed as a method in which the receiving node measures the transmission rate and delay. Hereafter, a method which is assumed in the present embodiment will be explained.

The transmitting node transfers packets while inserting an identifier and transmission time in each of the packets addressed to the receiving node.

The receiving node measures the packet delay by comparing the transmission time inserted by the transmitting node and the time at which the receiving node receives the packet. Moreover, the transmitting node regularly transmits the packet array for measurement, and the receiving node is able to estimate the transmission rate based on variance of the arrival time thereof. Details of the estimation method are disclosed, for example, in the literature "Dovrolis, Ramanathan, and Moore; What Do Packet Dispersion Techniques Measure?," IEEE INFOCOM 2001".

The receiving node regularly transmits the measured values as the status information to the transmitting node. Furthermore, at the same time, the receiving node transmits the latest identifier among those that were received until that time, as the identification information of the packet in which transmitted status information becomes effective.

The method described above is an example, and therefore enablement of the present invention is independent of the status information and a method of determining and delivering a packet in which transmitted status information becomes effective.

The scheduling portion 1312 refers, for a packet to be transmitted next, to current route information and a transmission history after a packet in which the information becomes effective is transmitted, and estimates delay in arrival at the receiving node. The transmission history is stored in the memory portion 1315. The scheduling portion 1312 selects the route which minimizes the estimated delay in arrival, as the transmission route of the packet to be transferred next. After the scheduling portion 1312 transfers the packet to the selected route, it adds the transmission time to the transmission history in the memory portion 1315.

Figure 14:
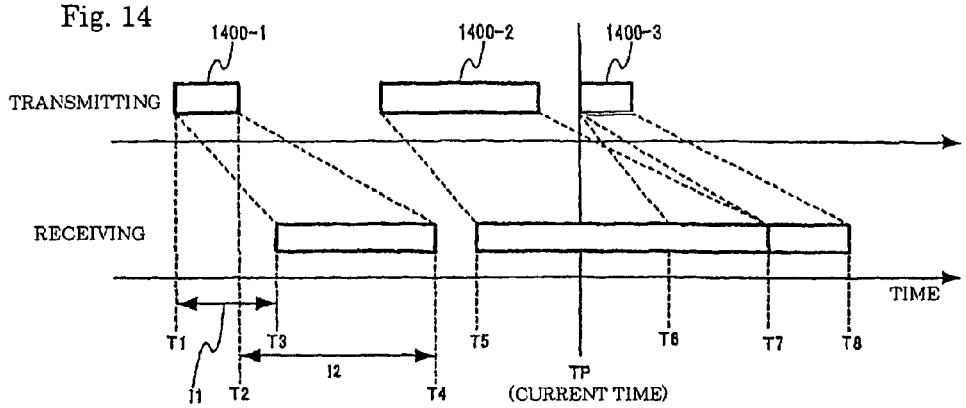
FIG. 14 shows a packet process timing at the transmitting node and a receiving node.

FIG. 14 shows an example of a method of estimating delay in arrival for each route, which is operated by the scheduling portion 1312. In the diagram, each numerical 1400-1, 1400-2 and 1400-3 denotes a data packet, and its transmission history and the prediction at the transmitting node and its receiving history and prediction at the receiving node are indicated on the time axis. For example, transmission of the data packet 1400-1 is initiated at the transmitting node at a time T1 and completed at a time T2.

Receiving of this packet 1400-1 is initiated at the receiving node at a time T3 and completed at a time T4. Herein, the difference 11 between T1 and T3 is a transmission delay, and the difference between T4 and T2 is a total delay which is calculated by adding a packet distribution caused by difference in transmission rate between the transmission interface and the transfer route, to the transmission delay. Suppose that the packet 1400-3 is to be transmitted at a current time TP on the time axis. Moreover, in the packet 1400-1, it is assumed that the status information acquired at the time point TP becomes effective in this route. In this case, the receiving start time and the completion time, at the receiving node, of the packet 1400-2 which is transmitted after the packet 1400-1 are estimated based on the transmission rate and transmission delay included in the current status information. The estimated receiving start time is T5, and the receiving completion time is T7 in the diagram. In this case, if it is assumed that the transmission delay indicated by the status information equals to I1, the packet 1400-3 of which the transmission started at TP, is supposed to be started to be received at time T6. However, at this time point T6, receiving of the packet 1400-2 is estimated to be not complete at the receiving node. Therefore, the estimated receiving start time of the packet 1400-3 is T7, at which receiving of the packet 1400-2 is estimated to be complete, and the estimated receiving completion time is T8 which is calculated by adding the packet distribution estimated based on the route transmission rate included in the status information. In a similar manner, the receiving completion time of the packet 1400-3 is estimated for each route, and the packet 1400-3 is sent to the route which achieves the earliest receiving completion time.

Suppose that the status information used for estimating arrival time at the receiving side at a time point TP as shown in FIG. 14 is updated, for example, upon receipt of notification of the report result between T2 and T5. In this case, the arrival time TP when the packet 1400-2 is transmitted was estimated based on older status information than that at the time point TP. Suppose that this old status information is information A, and the new information updated between T2 and T5 is information B. If the delay and the route transmission rate included in the information A is different form those in the information B due to change in the link status, the estimated arrival time based on the information A should have been different from the estimated arrival time based on the information B as shown in FIG. 14. Therefore, the estimated arrival times of the packets 1400-1 and 1400-2 shown in FIG. 14 reflect modification of the result of the information B. Once the status information is updated, the transmission history before the packet in which the upgrade becomes effective no longer needs to be referred to, therefore, the transmission history is discarded.

Figure 15:
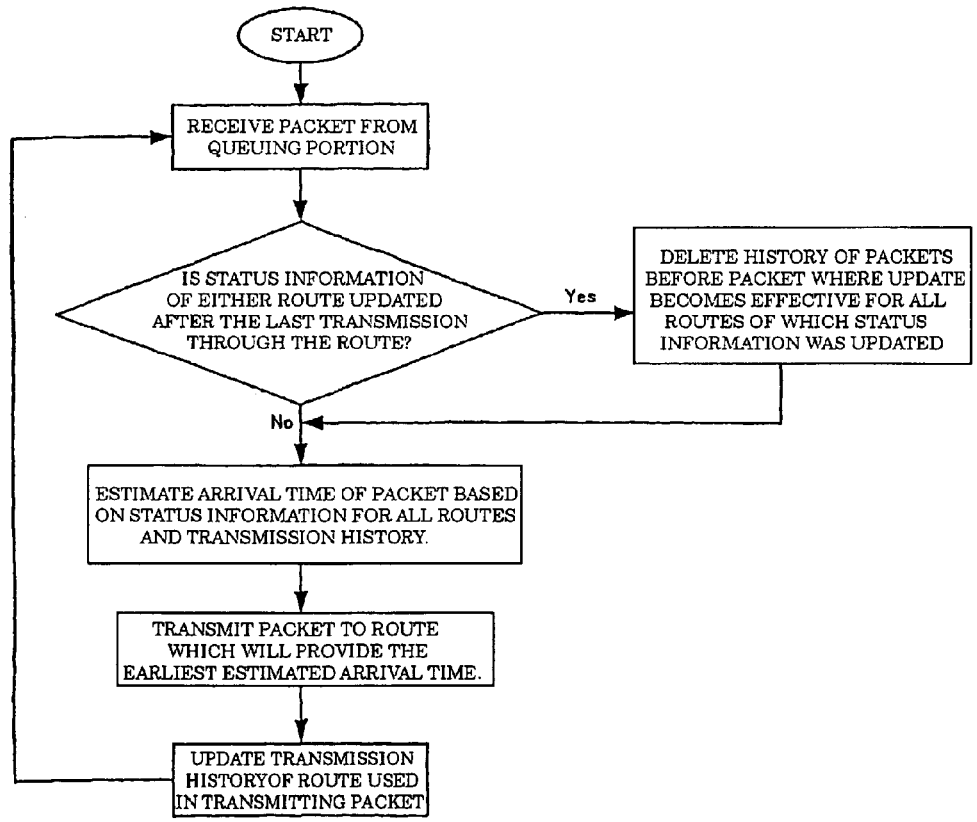
FIG. 15 is an operational flowchart of a scheduling portion.

FIG. 15 shows a procedure in which the scheduler selects a route including a step of estimating the arrival time as described above. When the status information is updated, the estimated arrival time of the previously-transmitted packets is modified, and this modification is reflected in the judgment of packet transmission thereafter, which enables compensation of the previous transmission record. The effect of this compensation is remarkable in the case where the round-trip delay in each route is large enough so as not to be negligible with respect to the period of change in the route status. The reason of this will be hereafter explained.

In the case where the change in the route status occurs in the period similar to the round-trip delay, when certain status information is acquired by the transmitting node, the route status may have already been changed.

Accordingly, the information is not reliable. Therefore, it is impossible to optimally select the route and set the timing at the time point when the packet is transmitted, and thus, generally, the packet is transmitted with a non-optimal route and timing. Modification of the estimated arrival time when the status information is updated corresponds to estimating impact of a previously-made non-optimal transmission after a lapse of time equivalent to the status information update interval. For example, in the case where transmission was made at a rate which is too high, the estimated arrival time of the already-transmitted packet is postponed by update of the status information, whereby the transmission cost of that route increases.

Modification of the estimated arrival time of the previously-transmitted packets using update of the status information as described above has an effect of optimizing route selection. Moreover, when the modified estimated arrival time is fed back not only to the route selection but also to the transmission timing control, congestion control of individual routes is also optimized in the long term.

Next, in the following example, an operation when a simple timing control is implemented will be explained hereafter.

As with the case with the example described above, in an example as hereafter described, the receiving completion time of the packet to be transmitted is estimated for each route and the route rated with the higher evaluation score is selected. However, unlike the example described above, this example allows a simple timing control which defines allowable estimated delay for each route and controls the transmission timing at the transmitting node such that the estimated delay does not exceed the allowable estimated delay.

Figure 16:
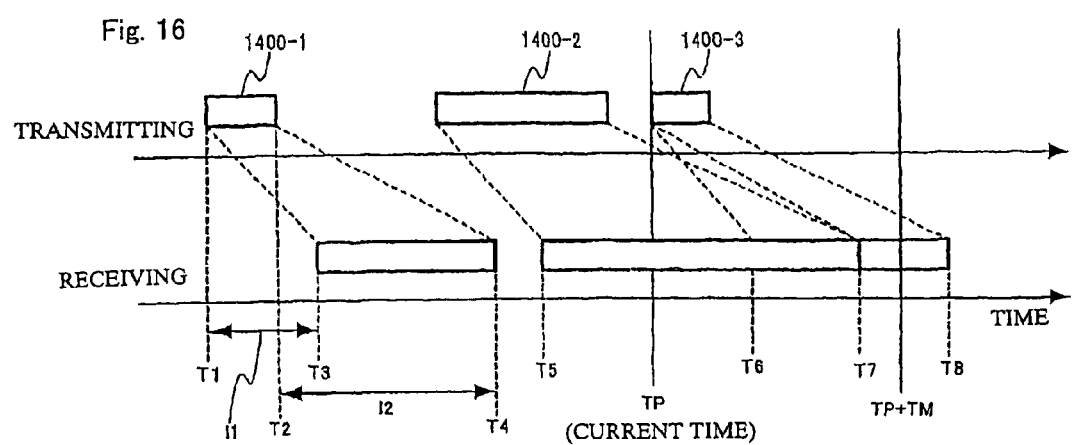
FIG. 16 shows another packet process timing at the transmitting node and the receiving node.

An operation of the present example will be explained referring to FIG. 16.

In the diagram, the character TM denotes the allowable estimated delay.

Figure 17:
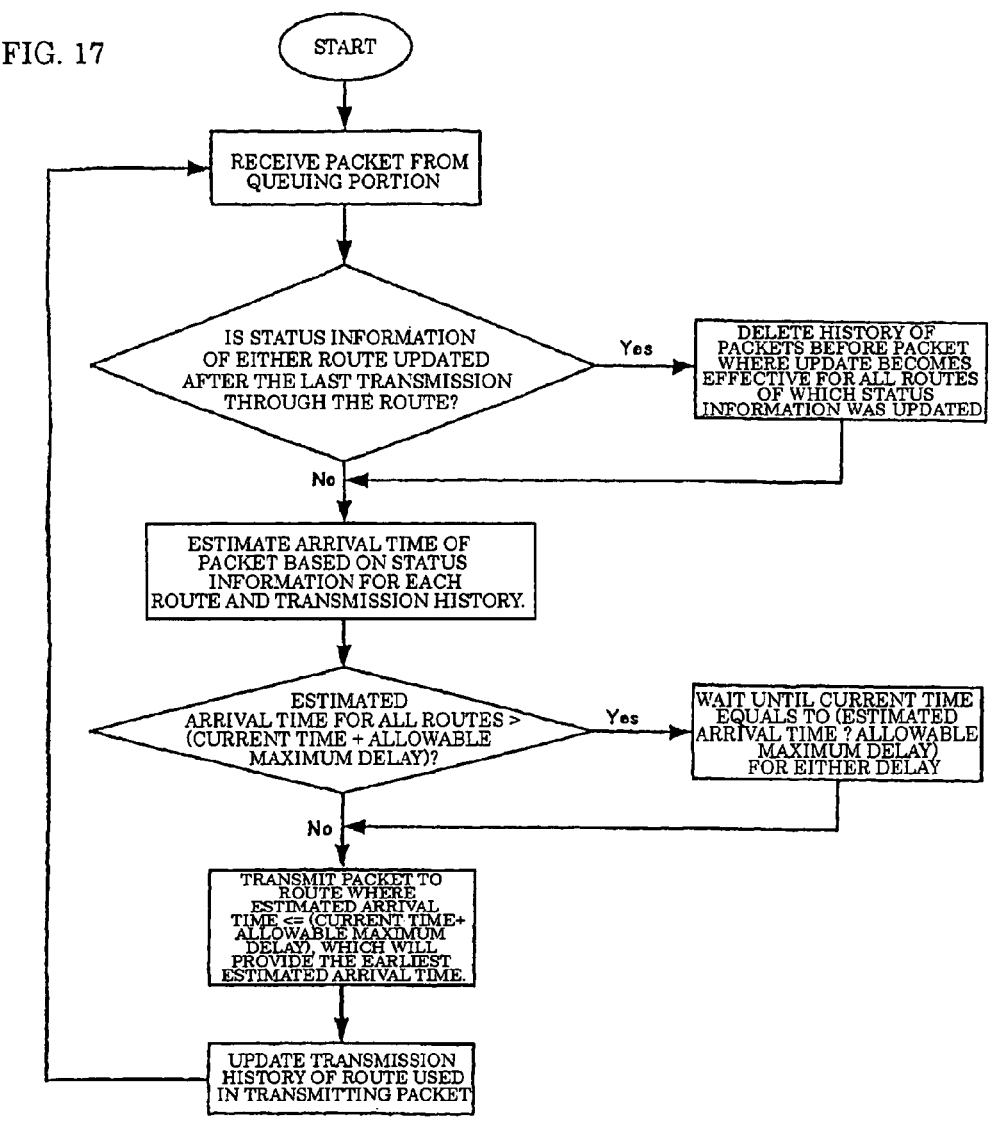
FIG. 17 is an operational flowchart of another scheduling portion.
Figure 18:
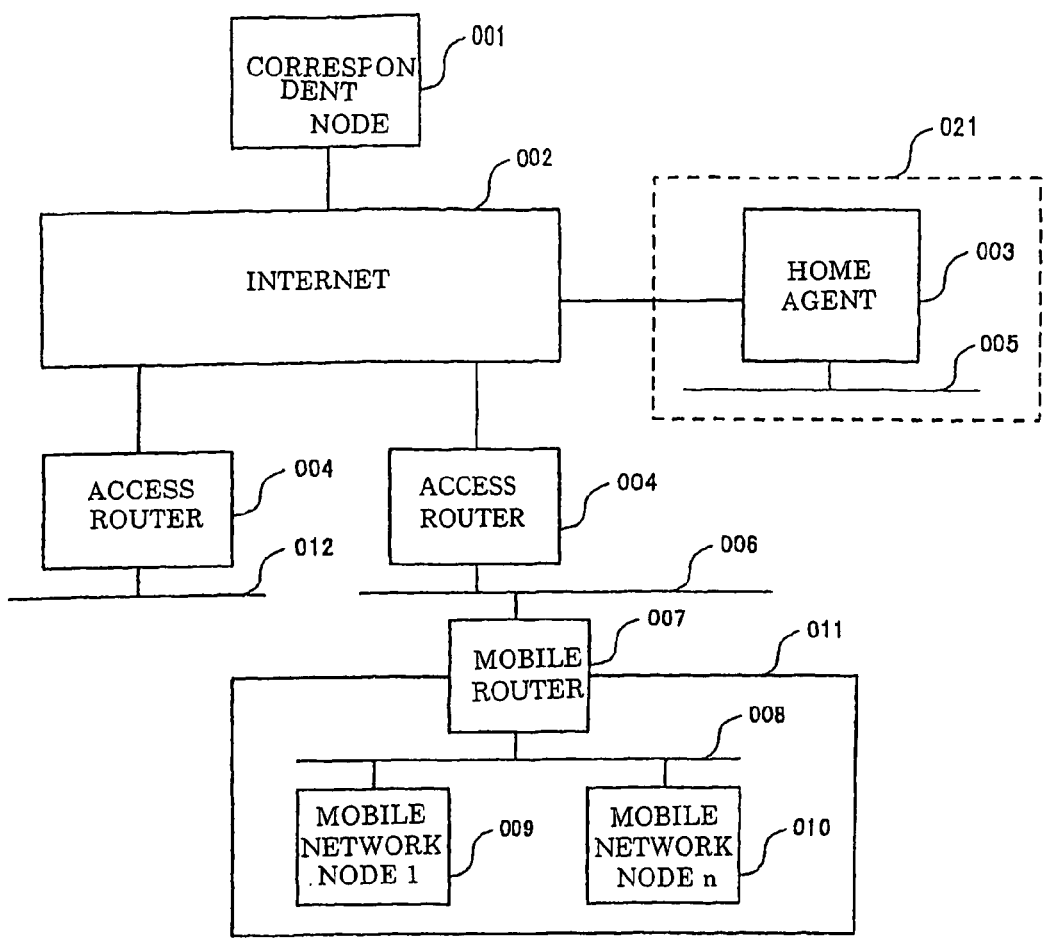
FIG. 18 is a chart explaining a conventional art.

This means that, in order to transmit a packet at the time point TP, it needs to be estimated that receiving of the packet is complete by the time point TM+TP. However, if the receiving completion time of the packet 1400-3 is estimated using the same method as in the previous example, the receiving completion time is T8, which is a future time with respect to the time point TM+TP. Accordingly, the transmitting node cannot transmit the packet 1400-3 through this route, until the estimated receiving completion time becomes TM+TP. In this case, the transmitting node reserves the packet 1400-3 until the estimated receiving completion time in either one of the routes becomes TM+TP or less, and transmits this packet using a route in which this reservation is cancelled earliest. FIG. 17 shows an operation flow of the scheduling portion in the example as described above.

Values of allowable estimated delay TP may be set independently for individual routes, For example, there is a case where there is a great difference in a delay among routes or buffer volumes among servers in the route or the like. In this case, particularly under a high load, the bandwidth for each route can be effectively utilized by setting different TM values for individual routes.

Moreover, in addition to the estimated receiving completion time, the route may be selected based on packet loss rate and the line service fee in preference to the estimated completion time, if they are monitorable.

Furthermore, a judgment method may differ depending on data attribute. For example, selection is made giving priority to delay for the audio data, and the line service fee for file transfer which is not urgent. The present invention is characterized in that, in either of the cases, when the route status information is updated by the transmitting node the transmission packet or the time at which the update becomes effective, the impact on the transmission cost is estimated based on the transmission history after the effective packet or the effective time, and the next packet is transmitted in the route which will provide the minimum cost. As a result, even in the case where the delay is large enough so as to be ineligible with respect to the time constant of the route status variation, the delay can be compensated by reflecting the already-provided impact of the previous non-optimal transmissions on the cost criteria, on adjustment of the transmission timing thereafter.

Next, another embodiment will be explained which relates to a communication interface selection operation of the transmission interface selection portion 329.

This embodiment relates to a case where an operation policy desired by the user, for example, on the target maximum communication fee per unit hour or the target communication rate, is stored in the control table as the policy information, and the communication interface is selected within the stored range. This example will be hereafter explained.

The control table of the memory portion 325 stores policy information 2300, statistic information 2400 and communication interface quality information 2500.

Figure 23:
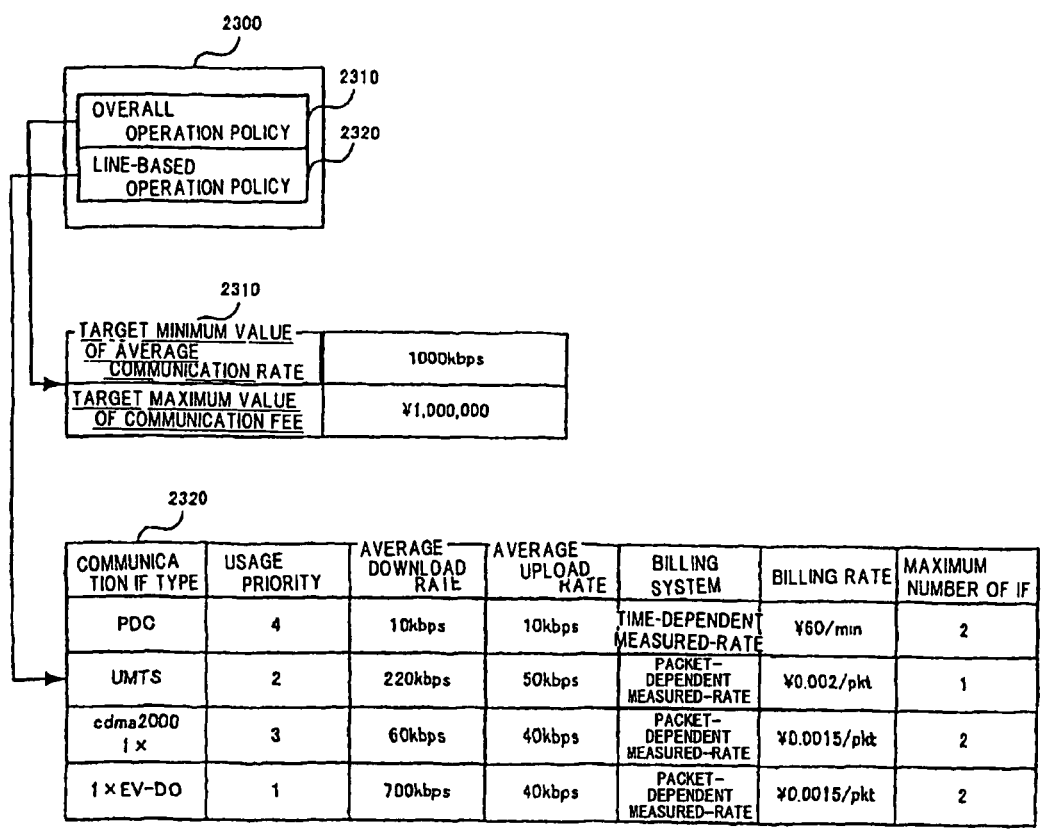
FIG. 23 shows one example of a control table the mobile router has.

The policy information 2300 is, for example as shown in FIG. 23, is configured by overall operation policy information 2310 and communication interface-based operation policy information 2320.

The overall operation policy information 2310 is configured by target minimum value of the average communication rate of the mobile network 104 and the target maximum value of the communication fee.

The line-based operation policy information 2320 is configured by usage priority of the communication interface type, expected communication rates (an average download rate and an average upload rate), a billing system, a billing rate and the maximum number of lines, by each communication interface type.

The statistic information 2400 is, for example as shown in FIG. 24, is configured by a status of the communication interface (whether the interface is "being used (On)," or "not being used(Off)"), a download communication rate, an upload communication rate, a number of received packets per unit hour, a number of transmitted packets per unit hour, a connection time and line utilization, by each communication interface.

Note that, the information is recorded in the statistic information 2400 as shown in FIG. 24, not on the basis of the communication interface type but on the basis of the communication interface. For example, in the case of the line-based operation policy information 2320 shown in FIG. 23, the PDC (line type) has two communication interfaces. Therefore, the information is separated into so as to be recorded in two communication interfaces: PDC#1 and PDC#2 in the statistic information 2400 as shown in FIG. 24.

Figure 25:
FIG. 25 shows one example of a control table the mobile router has.

Moreover, the communication interface quality information 2500 is configured, for example, by the status of the communication interface, judgment as to whether the communication is within/without the area and the receiving quality. As is the case with the statistics information 2400 shown in FIG. 24, the communication interface quality information 2500 shown in FIG. 25 is not recorded not on the basis of the communication interface type, but on the basis of the communication interface. For example, PDC of the communication interface-based operation policy information 2320 shown in FIG. 24 has two communication interfaces.

For example, in the case of the communication-based operation policy information 2320 shown in FIG. 24, the PDC has two communication interfaces. Therefore, the information is separated into so as to be recorded in two communication interfaces (lines): PDC#1 and PDC#2 in communication interface quality information 2500 as shown in FIG. 24.

The information as described above is collected by the line management and address acquisition portion 324 and the traffic measurement portion 330, and registered in the memory portion 325.

Figure 26:
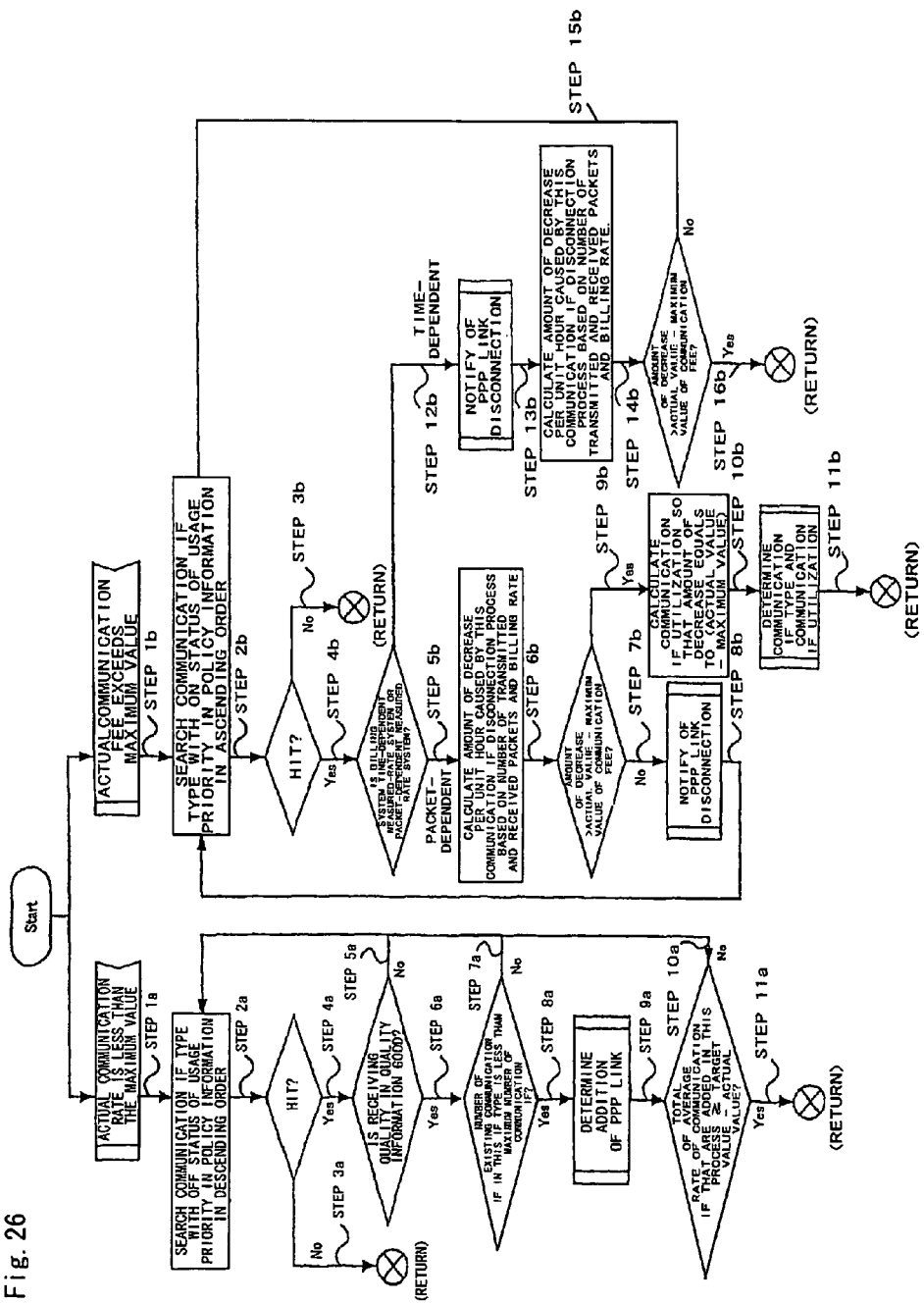
FIG. 26 shows an operation of the transmission interface selection portion 329.

Next, a communication interface selection operation of the transmission interface selection portion 329 will be explained in detail referring to FIG. 26. FIG. 26 is a flow chart showing an operation of the transmission interface selection portion 329.

First, in the case where the process is triggered by the fact that the actual communication rate is below the target value (Step 1*a*), a communication interface of which the status is Off according to the communication interface quality information 2500, in other words, a communication interface which is not being used is searched, in the descending order of the communication interface type-based usage priority which is one of the policy information (Step 2a). In the case where there is no applicable communication interface, communication interface selection process is terminated (Step 3a). In the case where there is an applicable communication interface, it is checked whether the receiving quality in the communication interface quality information 2500 of the applicable communication interface (Step 4a) is good.

In the case where the receiving quality is not good, the operation returns to search of the communication interface type as described above (Step 5a).

In the case where the receiving quality is good, it is checked whether the number of interfaces that are currently being used of that type is less than a predetermined maximum number of communication interfaces (Step 6a).

When the number equals to or is greater than the maximum number of communication interfaces, the operation returns to the search of the communication interface type ad described above (Step 7a). In the case where the number is smaller than the maximum number of communication interfaces, the communication interface is instructed to establish the PPP link (Step 8a).

Subsequently, the total of the average rates of the communication interfaces that are added in this communication interface selection process is compared with the difference between the target value and the actual value of the communication rate (Step 9a). In the case where the total of the average rates is smaller than the above mentioned difference, the operation returns to the aforementioned search of the communication interface type (Step 10a). In the case where the total of the average rates equals to or is greater than the aforementioned difference, the communication interface selection process is terminated.

In the case where there is no applicable communication interface after all the communication interface types are searched, the communication interface selection process is terminated.

Next, a case where the process is triggered by the fact that the actual value of the communication fee exceeds a predetermined target maximum value will be explained.

In the case where the process is triggered by the fact that the actual value of the communication fee exceeds a predetermined target maximum value (Step 1b), a communication interface of which the status in the communication interface quality information 2500 is On, in the ascending order of the communication interface type-based usage priority which is one of the policy information (Step 2b). In the case where there is no applicable communication interface, the communication interface selection process is terminated (Step 3b).

In the case where there is a communication interface type having a communication interface of which the status is On, its billing system is identified (Step 4b). In the case where the billing system is the packet-dependent measured-rate billing system (Step 5b), the amount of decrease per unit hour caused by disconnection of the communication interface in this communication interface selection process is calculated based on the number of the received and transmitted packets and the billing rate (Step 6b).

In the case where the aforementioned amount of decrease is compared with the amount of difference between the actual value and the target maximum value of the communication fee, and the amount of decrease equals to or is smaller than the amount of difference (Step 7b), disconnection of the PPP link is requested and the operation returns to the search of the communication interface type as described above (Step 8b). In the case where the aforementioned amount of decrease is larger than the amount of difference (Step 9b), the communication interface utilization is calculated such that the amount of decrease equals to the amount of difference between the actual value and the maximum amount (Step 10b), the communication interface type and the communication interface utilization are determined.

Moreover, in the case where the communication interface type having a communication interface of which the status is On adopts a time-dependent measured-rate billing system (Step 12b), disconnection of the PPP link of the applicable communication interface is requested (Step 13b). Then, the amount of decrease per unit hour caused by this communication interface disconnection process is calculated based on the connection time and the billing rate (Step 14b). Next, the amount of decrease is compared with the amount of difference between the actual value and the target maximum value of the communication fee. In the case where the amount of decrease equals to or is smaller than the amount of difference, operation returns to the search of the communication interface type as described above (Step 15b), and in the case where the amount of decrease is larger than the amount of difference, the communication interface selection process is terminated (Step 16b).

Note that, as a method of selecting a communication interface that belongs to the same communication interface type, a selection method in the order of the previously-assigned identifiers is proposed. However, selection may be made randomly.

Moreover, as a method of selecting the communication interface that belongs to the same communication interface type when disconnecting the communication interface, for example, a communication interface with poor receiving quality may be preferentially selected and disconnected.

Next, the specific examples of the above will be explained.

Example 1

For explaining Example 1, the overall operation policy information 2310, the communication interface-based operation policy information 2320, the statistic information 2400 and the communication interface quality information 2500 will be explained referring to those shown in FIG. 23, FIG. 24 and FIG. 25. Moreover, a specific operation flow will be explained referring to the operational flowchart shown in FIG. 26.

Figure 27:
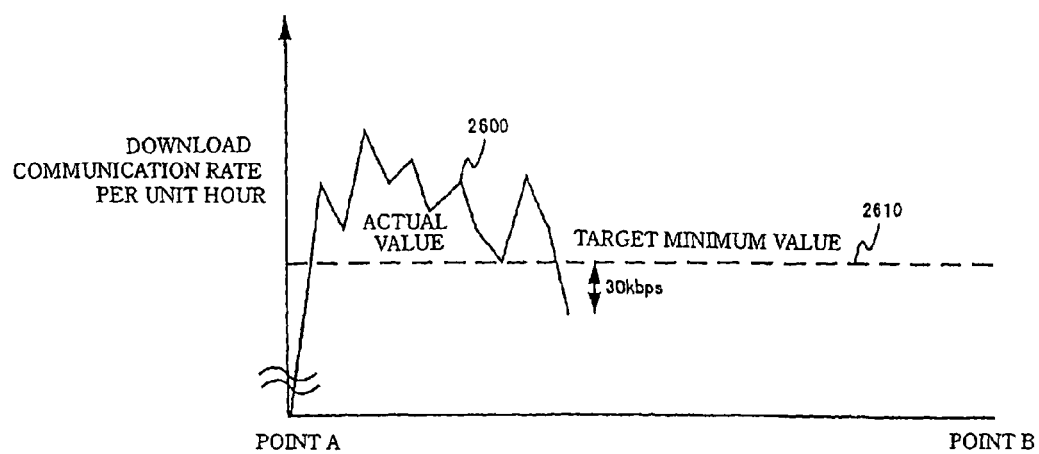
FIG. 27 is a chart explaining an operation of an example.

FIG. 27 is a graph plotting an actual value 2600 and a target minimum value 2610 of the communication rate per unit hour in the case where the mobile network 104 moves from Point A to Point B.

As shown in the flowchart, the transmission interface selection portion 329 initiates the communication interface selection process, which is triggered by the fact that the actual value 2600 of the communication rate is below the target minimum value 2610.

Based on the fact that the download communication rate to be compensated is 30 kbps, the transmission interface selection portion 329 searches a communication interface of which the status is Off according to the communication interface quality information 2500, in other words, a communication interface which is not being used is searched, in the descending order of the communication interface type-based usage priority which is one of the policy information (Step 2a). Since cdma2000 1x has a grade "3" for usage priority and one unused communication interface, the communication interface for cdma2000 1x 1x#2 is selected.

Next, it is checked whether the receiving quality of the selected line of cdma2000 1x 1x#2 is good (Step 4a). The line has a "good" receiving quality line according to the quality information 2500.

In the case where the receiving quality is good, it is checked whether the number of lines in use of that type is smaller than a predetermined maximum number of communication interfaces (Step 6*a*). In his case, since the maximum number of communication interfaces of cdma2000 1x is two according to the communication interface-based operation policy information 2320, even if the communication interface for cdma2000 1x 1x#2 is selected, the number does not exceed the maximum number of communication interfaces.

Next, instruction is made to the transmission interface selection portion 329 to establish the PPP link in cdma2000 1x 1x#2 (Step 8*a*).

Subsequently, the total of the average rates of the communication interfaces that are added in this communication interface selection process is compared with the difference between the target minimum value and the actual value of the communication rate of the communication rate (Step 9*a*).

The interface which was added in this communication interface selection process is one communication interface for cdma2000 1x 1x#2, and its average download rate is 60 kbps. Meanwhile, the difference between the target minimum value and the actual value of the communication rate of the communication rate is 30 kbps. Therefore, since the total of the average download rates equals to or is greater than the aforementioned difference, the communication interface selection process is terminated.

Example 2

The specific operation of the aforementioned embodiment will be explained, with reference to Example 2.

Unlike Example 1 described above in which the target minimum value of the download communication rate is constant from Point A to Point B, this Example 2 will be explained with a case where weighted distribution is given to the target minimum value of the communication rate in accordance with rate of riding.

Figure 28:
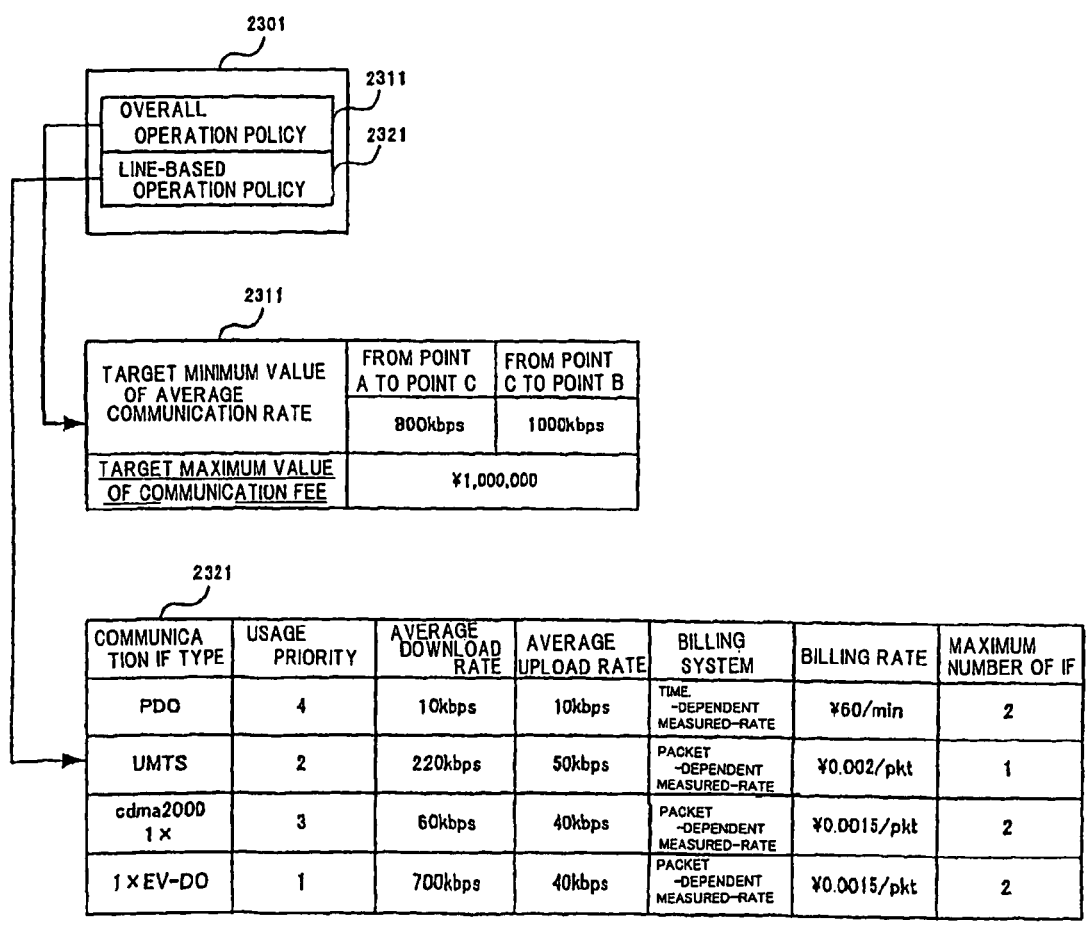
FIG. 28 shows one example of a control table the mobile router has.

In explaining Example 2, the overall operation policy information 2310 shown in FIG. 28 and the statistic information 2400 and the communication interface quality information 2500 shown in FIG. 23 and FIG. 24 will be used. A specific flow of operation will be explained, referring to the operational flowchart in FIG. 26.

Figure 29:
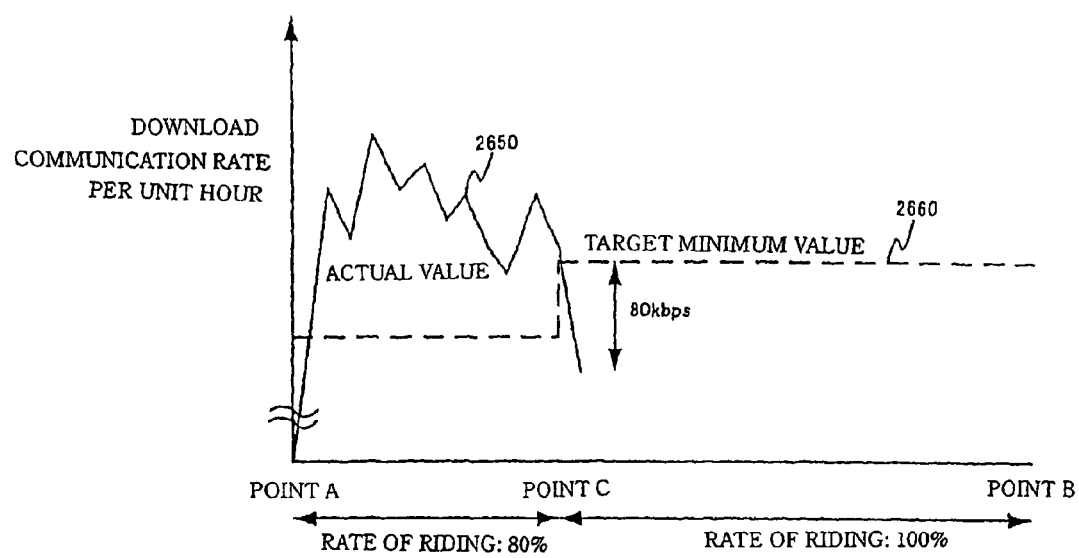
FIG. 29 is a chart explaining an operation of an example.

FIG. 29 is a graph plotting an actual value 2650 and a target minimum value 2660 of the communication rate per unit hour in the case where the mobile network 104 moves from Point A to Point B. FIG. 28 shows the policy information 2301 in Example 2. In this example, as shown in the overall operation policy information 2311, weighted distribution is given to the target minimum value 2660 of the average rate target minimum value 2660, taking into consideration the fact that the rate of riding between Point A and Point C is 80% and rate of riding between Point C and Point B is 100%.

As a method of switching the overall operation policy, it may be configured such that the rate of riding is acquired in advance from the reservation conditions or the like of a train which installs the mobile network 104 and recorded in the overall operation policy information 2310, and switching is made at a timing when the rate of riding changes (i.e., Point C in this example). Moreover, the method may be configured such that the communication rate corresponding to the rate of riding is predetermined and described in the overall operation policy information 2310, and then the rate of riding is updated real time. Next, operation is executed at the communication rate corresponding to the rate of riding.

Next, a specific operation thereof will be explained.

First, when the mobile network 104 has passed Point C, the transmission interface selection portion 329 initiates the communication interface selection process, which is triggered by the fact that the actual value 2650 is below the target minimum value 2660. The transmission interface selection portion 329 searches a communication interface of which the status is Off according to the communication interface quality information 2500, in other words, a communication interface which is not being used is searched, in the descending order of the communication interface type-based usage priority which is one of the policy information (Step 2*a*).

Since cdma2000 1x has a grade "3" for usage priority and one unused communication interface, the communication interface for cdma2000 1x 1x#2 is selected.

Next, it is checked whether the receiving quality of the selected communication interface for cdma2000 1x 1x#2 is good (Step 4*a*). That communication interface has a "good quality" according to the communication interface quality information 2500.

In the case where the receiving quality is good, it is checked whether the number of communication interfaces for that type which is in use is smaller than the predetermined maximum number of communication interfaces (Step 6*a*). In this case, since the maximum number of communication interfaces of cdma2000 1x is "two" according to the communication interface-based operation policy information 320, even if the communication interface for cdma2000 1x 1x#2 is selected, the number does not exceed the maximum number of communication interfaces.

Therefore, cdma2000 1x#2 is instructed to establish the PPP link (Step 8*a*).

Subsequently, the total of the average rates of the communication interfaces that are added in this communication interface selection process is compared with the difference between the target minimum value and the actual value of the communication rate (Step 9*a*). The interface which was added in this communication interface selection process is one communication interface for cdma2000 1x 1x#2, and its average download rate is 60 kbps. Meanwhile, the difference between the target minimum value and the actual value of the communication rate is 80 kbps.

Therefore, since the total of the average download rates is smaller than the aforementioned difference, the operation returns to the search of the communication interface type as described above (Step 10*a*).

Again, the transmission interface selection portion 329 searches the so communication interface of which the status is Off according to the communication interface quality information 2500, in other words, a communication interface which is not being used, in the descending order of the communication interface type-based usage priority which is one of the policy information (Step 2*a*). Since PDC has a grade "4" for usage priority and two unused communication interfaces, the communication interface of PDC PDC#1 is selected.

Next, it is checked whether the receiving quality of the selected communication interface of PDC PDC#1 is good (Step 4*a*). That communication interface has a "good quality" according to the communication interface quality information 2500.

In the case where the receiving quality is good, it is checked whether the number of communication interfaces for that type which is being used is smaller than the predetermined maximum number of communication interfaces (Step 6*a*). In this case, since the maximum number of communication interfaces of PDC is "two" according to the communication interface-based operation policy information 320, even if the communication interface of PDC PDC#1 is selected, the number does not exceed the maximum number of communication interfaces.

Next, PDC PDC#1 is instructed to establish the PPP link (Step 8a).

Subsequently, the total of the average rates of the communication interfaces that are added in this communication interface selection process is compared with the difference between the target minimum value and the actual value of the communication rate (Step 9a). PDC PDC#1 which was added in this communication interface selection process has an average download rate of 10 kbps. Since the average download rates of cdma2000 1x 1x#2 that was previously added is 60 kbps, the total of the average rates is 70 kbps.

Meanwhile, the difference between the target minimum value and the actual value of the communication rate is 80 kbps. Therefore, since the total of the average download rates is smaller than the aforementioned difference, the operation returns to the search of the communication interface type as described above (Step 10a).

Again, the transmission interface selection portion 329 searches a communication interface of which the status is Off according to the communication interface quality information 2500, in other words, a communication interface which is not used, in the descending order of the communication interface type-based usage priority in the communication interface-based operation policy information 2320 (Step 2a). Since PDC has a grade "4" for usage priority and one unused communication interface, the communication interface of PDC PDC#2 is selected.

Next, it is checked whether the receiving quality of the selected communication interface of PDC PDC#2 is good (Step 4a). That communication interface has a "good quality" according to the communication interface quality information 2500.

In the case where the receiving quality is good, it is checked whether the number of communication interfaces for that type which is being used is smaller than the predetermined maximum number of communication interfaces (Step 6a). In this case, since the maximum number of communication interfaces of PDC is two according to the communication interface-based operation policy information 2320, even if the communication interface of PDC PDC#2 is selected, the number does not exceed the maximum number of communication interfaces.

Next, PDC PDC#2 is instructed to establish the PPP link (Step 8a).

Subsequently, the total of the average rates of the communication interfaces that are added in this communication interface selection process is compared with the difference between the target minimum value and the actual value of the communication rate (Step 9a). PDC PDC#2 which was added in this communication interface selection process has an average download rate of 10 kbps. Since the total of the average download rates of cdma2000 1x#2 1 and PDC PDC#1 that were added previously is 70 kbps, the total of the average rate calculated by this addition sums up to 80 kbps. Meanwhile, the difference between the target minimum value and the actual value of the communication rate is 80 kbps. Therefore, since the total of the average download rates equals to or is greater than the aforementioned difference, the communication interface selection process is terminated.

Example 3

The specific operation of the aforementioned embodiment will be explained, with reference to Example 3.

In the previously described Example 1 and Example 2, change in the download communication rate is the initiation trigger of the communication interface selection process. Unlike these two examples, change in the communication cost is the initiation trigger of the communication interface selection process in this example.

In explaining Example 3, the overall operation policy information 2310 shown in FIG. 23 and the statistic information 2400 shown in FIG. 24, and the communication interface quality information 2500 shown in FIG. 25 will be used. A specific flow of operation will be explained, referring to the operational flowchart in FIG. 26.

Figure 30:
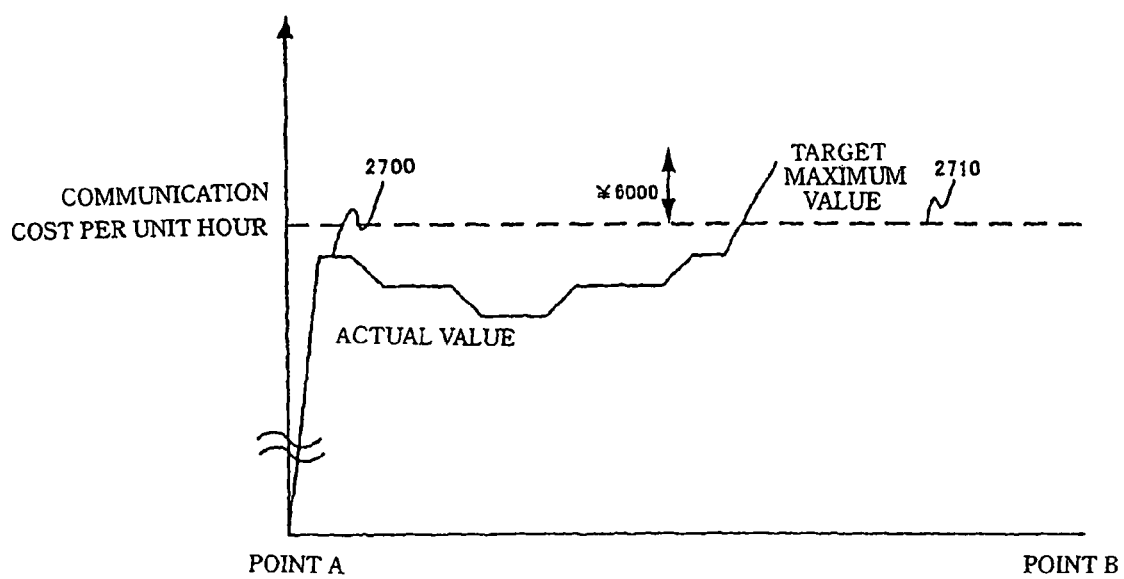
FIG. 30 is a chart explaining an operation of an example.

FIG. 30 is a graph plotting an actual value 2700 and a target maximum value 2710 of the communication cost per unit hour in the case where the mobile network 104 moves from Point A to Point B.

As shown in the diagram, a communication interface selection portion 2210 initiates the communication interface selection process, which is triggered by the fact that the actual value 2700 of the communication cost exceeds the target maximum value 2710.

The communication interface of which the status is On according to the communication interface quality information 2500 is searched, in the ascending order of the communication interface-based usage priority which is one of the policy information. Since cdma2000 1x has a grade "3" for usage priority and cdma2000 1x 1x#1 is being used, the communication interface for cdma2000 1x 1x#1 is selected.

Next, since there is a communication interface type having a communication status of which the status is On, its billing system is determined (Step 4b). Since the communication interface for cdma2000 1x 1x#1 adopts the packet-dependent measured-rate billing system (Step 5b), the amount of decrease per unit hour caused by disconnection of the communication interface in this communication interface selection process is calculated based on the number of the received and transmitted packets and the billing rate (Step 6b). In this example, the amount of decrease per unit hour is 6,660 yen per unit hour (¥0.0015/packet×(4200000+240000) packets).

Next, the aforementioned amount of decrease is compared with the amount of difference between the actual value and the target maximum value of the communication fee. In this example, since the amount of decrease is 6,660 yen (¥0.0015/packet×(4200000+240000) packets) and the amount of difference between the actual value and the target maximum value of the communication fee is 6,000 yen, the aforementioned amount of decrease is larger than the amount of difference. Therefore, the communication interface utilization is calculated so that the amount of decrease equals to the amount of difference between the actual value and the maximum value (Step 10b), and the communication interface type and communication interface utilization are determined.

In this case, the communication interface utilization of cdma2000 1x 1x#1 is determined as 100−((6000/6660)×100) >10%.

Example 4

The specific operation of the aforementioned embodiment will be explained, with reference to Example 4.

Unlike Example 3 as described above in which the target maximum value of the communication cost is constant from Point A to Point B, weighted distribution is given to the target maximum value of the communication cost in accordance with rate of riding in this example.

Figure 32:
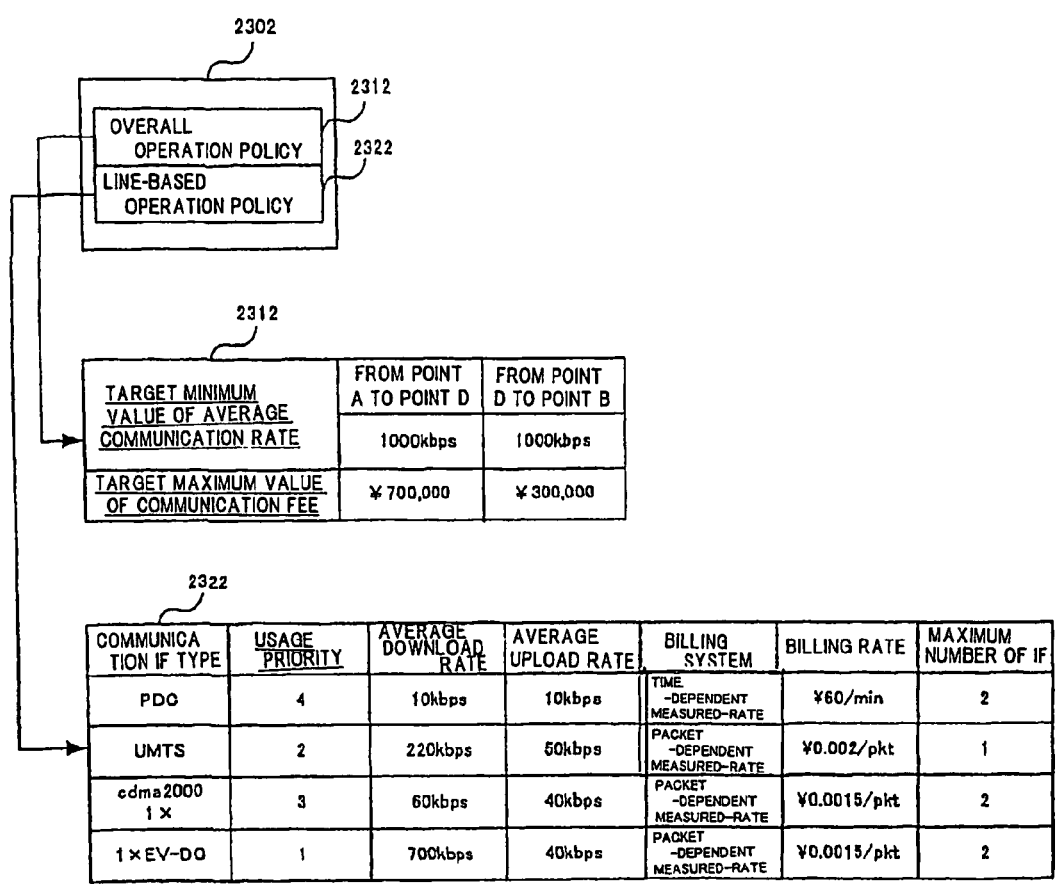
FIG. 32 shows one example of a control table the mobile router has.

In explaining Example 4, the overall operation policy information 2310 shown in FIG. 32, the statistic information

2400 shown in FIG. 24, and the communication interface quality information 2500 shown in FIG. 25 will be used. A specific flow of operation will be explained, referring to the operational flowchart in FIG. 26.

Figure 31:
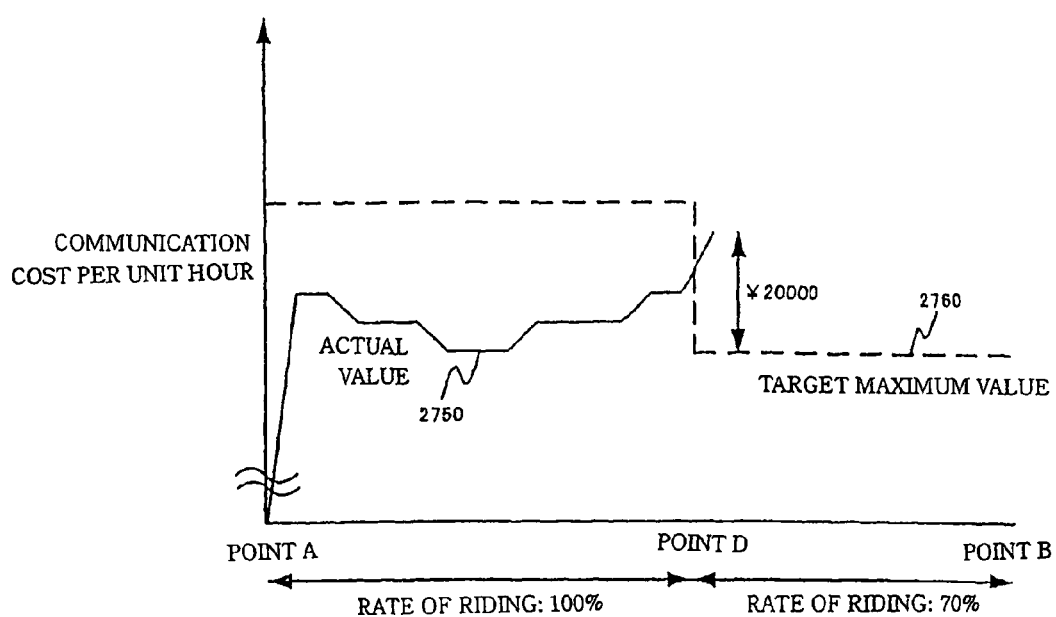
FIG. 31 is a chart explaining an operation of an example.

FIG. 31 is a graph plotting an actual value 2750 and a target maximum value 2760 of the communication cost per unit hour, in the case where the mobile network 104 moves from Point A to Point B. In this example, weighted distribution is given to the communication cost, taking into consideration the fact that the rate of riding between Point A and Point D is 100% and the rate of riding between Point D and Point B is 70%.

As a method of switching the overall operation policy, it may be configured such that the rate of riding is acquired in advance from the reservation conditions of a train which installs the mobile network 104 and is recorded in the overall operation policy information 2310, and switching is made at a timing when the rate of riding changes (i.e., Point D in this example).

Moreover, the method may be configured such that the communication rate corresponding to the rate of riding is predetermined and described in the overall operation policy information 2310. Next, the rate of riding is updated real time, and operation is executed at the communication rate corresponding to the rate of riding.

Hereafter, a specific operation will be explained.

When the mobile network 104 passed Point D, the communication interface selection portion 2210 initiates the communication interface selection process, which is triggered by the fact that the actual value 2750 exceeds the target maximum value 2760.

The communication interface of which the status is On according to the communication interface quality information 2500 is searched, in the ascending order of the communication interface-type based usage priority which is one of the policy information (Step 2b). Since cdma2000 1x has a grade "3" for usage priority and the communication interface for cdma20001 1x 1x#1 is being used, the communication interface for cdma2000 1x 1x#1 is selected.

Next, since there is a communication interface type having a communication interface with status On, its billing system is determined (Step 4b). Since the communication interface for cdma2000 1x 1x#1 adopts the packet-dependent measured-rate billing system (Step 5b), the amount of decrease per unit hour caused by disconnection of the communication interface in this communication interface selection process is calculated based on the number of the received and transmitted packets and the billing rate (Step 6b). In this example, the amount of decrease per unit hour is 6,660 yen per unit hour (¥0.0015/packet×(4200000+240000) packets).

Next, the aforementioned amount of decrease is compared with the amount of difference between the actual value and the target maximum value of the communication fee. In this example, since the amount of decrease is 6,660 yen (¥0.0015/packet×(4200000+240000) packets) and the amount of difference between the actual value and the target maximum value of the communication fee is 20,000 yen, the aforementioned amount of decrease is smaller than the amount of difference. Therefore, discontinuation of the link is requested, and the operation returns to the search of the communication interface type as described above (Step 8b).

The communication interface of which the status is On according to the communication interface quality information 500 is searched, in the ascending order of the communication interface type-based priority which is one of the policy information (Step 2b). In this case, subsequent to cdma2000 1x 1x#1, UMTS has a grade "2" for usage priority and its UMTS#1 is being used, the communication interface for UMTS#1 is selected.

Next, since there is a communication interface type having a communication status with Status On, its billing system is determined (Step 4b). Since the communication interface for UMTS#1 adopts the packet-dependent measured-rate billing system (Step 5b), the amount of decrease per unit hour caused by disconnection of the communication interface in this communication interface selection process is calculated based on the number of the received and transmitted packets and the billing rate (Step 6b). In this example, the amount of decrease per unit hour is 14,880 yen per unit hour (¥0.002/packet×(6180000+1260000) packets).

Next, the total of the aforementioned amounts of decrease is compared with the amount of difference between the actual value and the target maximum value of the communication fee. In this example, since the amount of decrease of cdma2000 1x 1x#1 is 6,660 yen (¥0.0015/packet×(4200000+240000) packets) and the amount of decrease of UMTS#1 is 14,880 yen (¥0.002/packet×(6180000+1260000) packets), and the amount of difference between the actual value and the target maximum value of the communication fee is 20,000 yen, the aforementioned amount of decrease is larger than the amount of difference. Therefore, the communication interface utilization is calculated so that the amount of decrease equals to the amount of difference between the actual value and the maximum amount (Step 10b), and the communication interface type and communication interface utilization are determined.

In this case, the communication interface utilization of UMTS#1 is determined as 100−((2000−6660)/14880)×100) >10%.

Example 5

The specific operation of the aforementioned embodiment will be explained, with reference to Example 5.

Unlike Example 3 and Example 4 as described above in which the communication cost per unit hour is used as the comparison indicator, in this example, an accumulated communication cost is used as the comparison indicator.

Figure 33:
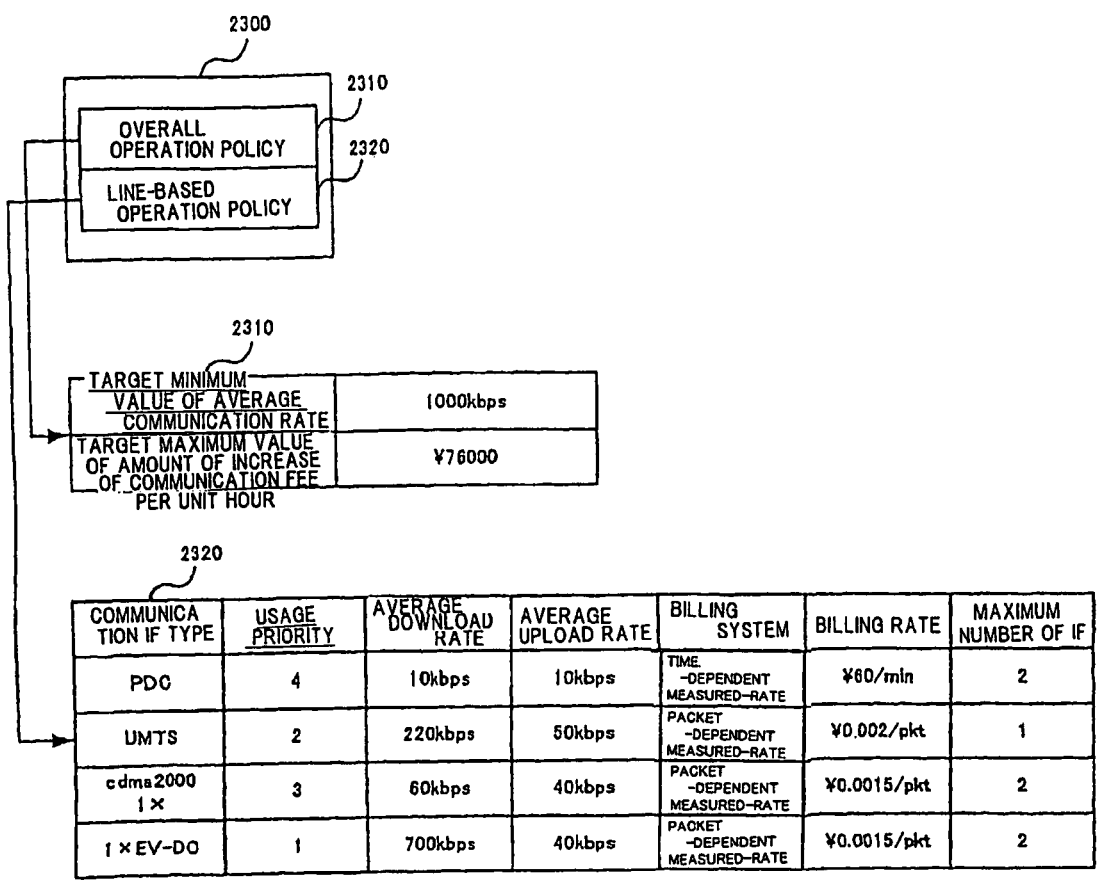
FIG. 33 shows one example of a control table the mobile router has.

In explaining Example 5, the overall operation policy information 2310 shown in FIG. 33, the statistic information 2400 shown in FIG. 24, and the communication interface quality information 2500 shown in FIG. 25 will be used. A specific flow of operation will be explained, referring to the operational flowchart in FIG. 26.

Figure 34:
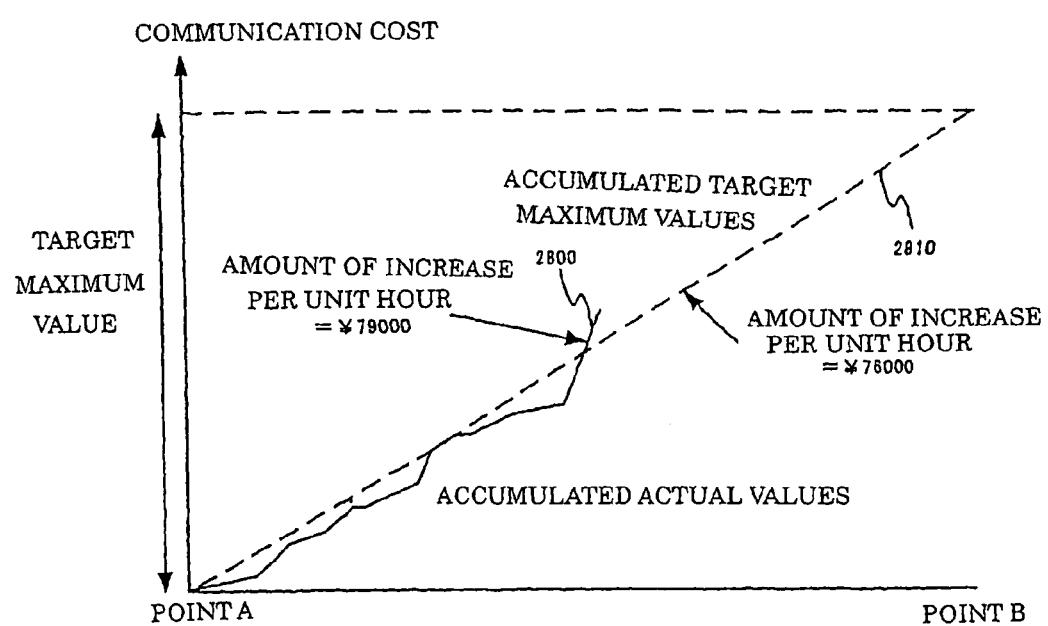
FIG. 34 is a chart explaining an operation of an example.

FIG. 34 is a graph plotting an accumulated actual value 2800 and a accumulated target maximum values 2810 of the communication cost, in the case where the mobile network 104 moves from Point A to Point B. In this example, the transmission interface selection portion 329 initiates the communication interface selection process, which is triggered by the fact that the accumulated actual value 800 exceeds the accumulated target maximum value 2810.

The communication interface of which the status is On according to the communication interface quality information 2500 is searched, in the ascending order of the communication interface type-based priority which is one of the policy information (Step 2b). In this example, since cdma2000 1x has a grade "3" for usage priority and the communication interface for cdma20001 1x 1x#1 is being used, the communication interface for cdma2000 1x 1x#1 is selected.

Next, since there is a case where there is a communication interface type having a communication interface with the status On, its billing system is determined (Step 4b). Since the communication interface for cdma2000 1x 1x#1 adopts the packet-dependent measured-rate billing system (Step 5b), the amount of decrease per unit hour caused by disconnection of the communication interface in this communication interface selection process is calculated based on the number of the received and transmitted packets and the billing rate (Step 6b). In this example, the amount of decrease per unit hour is 6,660 yen per unit hour (¥0.0015/packet×(4200000+240000) packets).

Next, the aforementioned amount of decrease is compared with the amount of difference between the actual value and the target maximum value of the communication fee. In this example, since the amount of decrease is 6,660 yen (¥0.0015/packet×(4200000+240000) packets) and the amount of difference between the actual amount of increase per unit hour and the target maximum amount of increase of the communication fee is 3,000 yen, the aforementioned amount of decrease is larger than the amount of difference. Therefore, the communication interface utilization is calculated so that the amount of decrease equals to the amount of difference between the actual value and the maximum amount (Step 10b), and the communication interface type and communication interface utilization are determined.

In this case, the communication interface utilization of cdma2000 1x 1x#1 is determined as 100−(3000/6660×100) >54%.

Example 6

The specific operation of the aforementioned embodiment will be explained, with reference to Example 6.

Unlike Example 5 as described above in which the accumulated target maximum value is based on that a certain rate of increase from Point A to Point B, the amount of increase in the communication cost per unit hour varies in accordance with rate of riding in this example.

Figure 35:
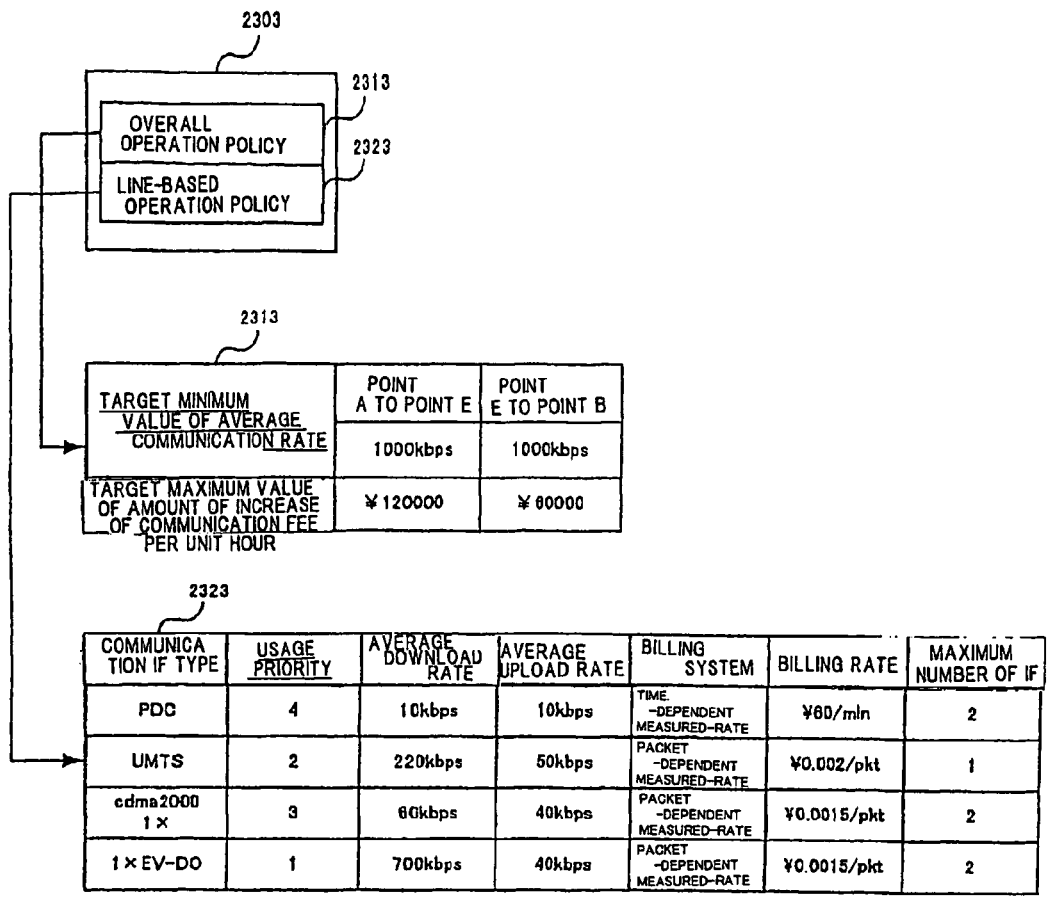
FIG. 35 shows one example of a control table the mobile router has.

In explaining Example 6, the overall operation policy information 2313 shown in FIG. 35, the statistic information 400 shown in FIG. 24, and the communication interface quality information 2500 shown in FIG. 25 will be used. A specific flow of operation will be explained, referring to the operational flowchart in FIG. 26.

Figure 36:
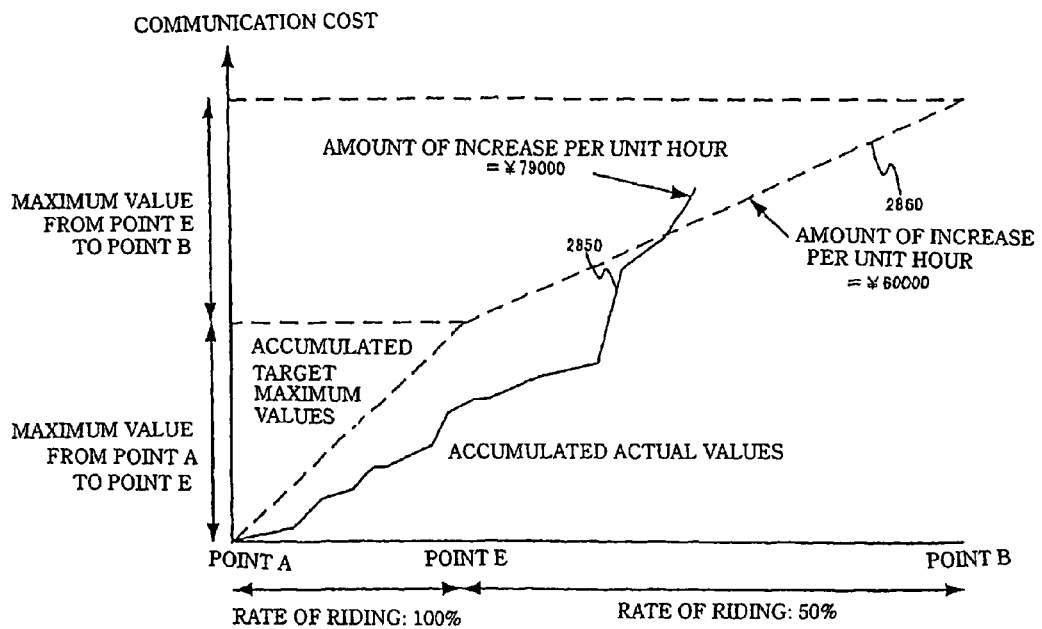
FIG. 36 is a chart explaining an operation of an example.

FIG. 36 is a graph plotting an accumulated actual value 2850 and an accumulated target maximum value 2860 of the communication, in the case where the mobile network 104 moves from Point A to Point B. In this example, different amounts of increase are applied to an area from Point A to Point E and to an area from Point E to Point B, taking into consideration that the rate of riding between Point A and Point E is 100% and the rate of riding between Point E and Point B is 50%.

As a method of switching the overall operation policy, it may be configured such that the rate of riding is acquired in advance from the reservation conditions of a train which installs the mobile network 104 and recorded in the overall operation policy information 2310, and switching is made at a timing when the rate of riding changes (i.e., Point E in this Example).

Moreover, the method may be configured such that the communication rate corresponding to the rate of riding is predetermined and described in the overall operation policy information 2310, and then the rate of riding is updated real time, and operation is executed at the communication rate corresponding to the rate of riding.

Hereafter, a specific operation will be explained.

The transmission interface selection portion 329 initiates the communication interface selection process, which is triggered by the fact that the accumulated actual value 2850 exceeds the accumulated target maximum value 2860.

The communication interface of which the status is On according to the communication interface quality information 2500 is searched, in the ascending order of the communication interface type-based priority which is one of the policy information (Step 2b). Since cdma2000 1x has a grade "3" for usage priority and the communication interface for cdma2000 1x 1x#1 is being used, the line for cdma2000 1x 1x#1 is selected.

Next, since there is a line type having a line with the status On, its billing system is determined (Step 4b). Since the communication interface for cdma2000 1x 1x#1 adopts the packet-dependent measured-rate billing system (Step 5b), the amount of decrease per unit hour caused by disconnection of the communication interface in this communication interface selection process is calculated based on the number of the received and transmitted packets and the billing rate (Step 6b). In this example, the amount of decrease per unit hour is 6,660 yen per unit hour (¥0.0015/packet×(4200000+240000) packets).

Next, the aforementioned amount of decrease is compared with the amount of difference between the actual value of the amount of increase of the communication fee per unit hour and the target maximum value of the amount of increase of the communication fee per unit hour. In this example, since the amount of decrease is 6,660 yen (¥0.0015/packet×(4200000+ 240000) packets) and the amount of difference between the actual value and the target maximum value of the communication fee is 19,000 yen, the aforementioned amount of decrease is smaller than the amount of difference. Therefore, discontinuation of the link is requested, and the operation returns to the search of the communication interface type as described above (Step 8b).

Subsequently, the communication interface of which the status is On according to the communication interface quality information 500 is searched, in the ascending order of the communication interface type-based priority which is one of the policy information (Step 2b). In this case, since subsequent to cdma2000 1x 1x#1, UMTS has a grade "2" for usage priority and its UMTS#1 is being used, the communication interface for UMTS#1 is selected.

Next, since there is a communication interface type having a communication status with Status On, its billing system is determined (Step 4b). Since the communication interface for UMTS#1 adopts the packet-dependent measured-rate billing system (Step 5b), the amount of decrease per unit hour caused by disconnection of the communication interface in this communication interface selection process is calculated based on the number of the received and transmitted packets and the billing rate (Step 6b). In this example, the amount of decrease per unit hour is 14,880 yen per unit hour (¥0.002/packet× (6180000+1260000) packets).

Next, the total of the aforementioned amount of decreases is compared with the amount of difference between the actual value of the amount of increase of the communication fee per unit hour and the target maximum value of the amount of increase of the communication fee per unit hour. In this example, since the amount of decrease of cdma2000 1x 1x#1 is 6,660 yen (¥0.0015/packet×(4200000+240000) packets) and the amount of decrease of UMTS#1 is 14,880 yen (¥0.002/packet×(6180000+1260000) packets), the total of the amount of decrease of the amount of increase per unit hour is 21,540 yen. Meanwhile, since the amount of difference between the actual value and the target maximum value of the communication fee is 19,000 yen, the aforementioned amount of decrease is larger than the amount of difference. Therefore, the communication interface utilization is calculated so that the amount of decrease equals to the amount of difference between the actual value and the maximum amount (Step 10*b*), and the communication interface type and communication interface utilization are determined.

In this case, the communication interface utilization of UMTS#1 is determined as 100−(12340/14880×100)>17%.

Note that in the example described above, weighting is given to the overall operation communication interface policy based on the rate of riding. The present invention is not limited to this, and weighting may be given based on a current position of a train or the like. For example, the invention may be configured such that the positional information is mapped with the so target communication rate or with the target maximum value of the communication fee, the current position of the train is acquired from the positional information acquisition system such as GPS or the like, and that the target value of the communication rate and the target maximum value of the communication fee that correspond to the positional information are acquired. Note that the process after acquiring the target value of the communication rate and the target maximum value of the communication fee is as the same as those previously described in the examples.

INDUSTRIAL APPLICABILITY

The present invention may be applied to any data communication system, communication device, or communication program thereof in a mobile packet communication network, as long as it configures a single logical line by combining lines of communication means containing a same or different types of services and using an art to secure a broad band access line. Furthermore, there is no limitation to the availability thereof.

The present invention was explained with reference to some preferred embodiments and examples, and it would be understood that those embodiments and examples are proposed as examples for the purpose of explaining the invention and that inventers do not mean to limit the invention with these examples or embodiments. It is apparent that those skilled in the art would be able to easily make many modifications or replacements by equivalent components and arts after they read the specification herein. It is also apparent that such modifications and replacements would be under the genuine scope of the claims and the spirit of the present invention.

The invention claimed is:

1. A data communication system comprising a home agent, a correspondent node capable of communicating with the home agent, a mobile router, and a mobile network node capable of communicating with the mobile router, the mobile router comprising:
a plurality of communication equipment of a communication service containing a same or different types of services;
a control table which stores a plurality of addresses each respectively assigned to one of the plurality of communication equipment, and respective route information of the plurality of communication equipment, such that respective address and route information are associated with each other; and
a transferor which receives a packet from the mobile network node to the correspondent node, selects usable communication equipment based on information of the control table, and transfers the packet to the home agent,
the home agent comprising:
an address identifier that identifies the address assigned to the usable communication equipment of the mobile router;
a home agent control table which stores the identified address and route information of the address, such that the address and the route information are associated with each other; and
transferor which receives a packet from the correspondent node addressed to the mobile network node, selects an address based on information of the home agent control table, and transfers the packet to the address, wherein a logical line, through which the mobile network node and the correspondent node communicate with each other, is configured by combining lines of the plurality of communication equipment.

2. A data communication system comprising a home agent and a mobile router,
the mobile router comprising:
a plurality of communication equipment of a communication service containing same or different types of services;
a control table which stores a plurality of addresses each respectively assigned to one of the communication equipment, and respective route information of the plurality of communication equipment, such that respective address and route information are associated with each other; and
a transferor which receives a packet, selects usable communication equipment based on the control table, and transfers the packet to the home agent,
and home agent comprising:
an address identifier that identifies an address assigned to usable communication equipment of the mobile router;
a home agent control table which stores the identified address and route information of the address, such that the address and the route information are associated with each other; and
a home agent transferor which receives a packet, selects an address based on information of the home agent control table, and transfers the packet to the address, wherein a logical line, through which the home agent and the mobile router communicate with each other, is configured by combining lines of the plurality of communication equipment.

3. The data communication system according to claim 2, wherein the mobile router comprises: a detector that detects a change in connection status of the communication equipment currently-in-use; and a notifier that notifies the home agent of the change in connection status and an address assigned to the communication equipment, and the home agent comprises an updater that updates based on the notification, information in the home agent control table that manages an address of the communication equipment of the mobile router.

4. A data communication system comprising a home agent, a correspondent node capable of communicating with the home agent, a mobile router, and a mobile network node capable of communicating with the mobile router, the mobile router comprising:
a plurality of communication equipment which communicate with the home agent;

a control table which stores route information containing a plurality of addresses each respectively assigned to one of the plurality of communication equipment; and a packet receiver that receives a packet from the mobile network node addressed to the correspondent node, selects at least one of the communication equipment based on information of the control table, and transfers the packet to the home agent, the home agent comprising:

an address identifier that identifies an address assigned to usable communication equipment of the mobile router;

a home agent control table which stores route information containing the identified address; and a home agent packet receiver that receives a packet from the correspondent node addressed to the mobile network node, selects at least one address based on information of the home agent control table, and transfers the packet to the address, wherein a logically multiplexed line, through which the mobile network and the correspondent node communicate with each other, is configured by combining the plurality of communication equipment between the mobile router and the home agent.

5. A mobile router in a data communication system comprising a home agent, a correspondent node capable of communicating with the home agent, a mobile router, and a mobile network node capable of communicating with the mobile router, the mobile router comprising:

a plurality of communication equipment of a communication service containing same or different types of services;

a control table which stores a plurality of addresses each respectively assigned to one of the plurality of communication equipment, and respective route information of the communication equipment, such that respective address and route information are associated with each other; and a transferor that receives a packet from the mobile network node addressed to the correspondent node, selects usable communication equipment based on information of the control table, and transfers the packet to the home agent, wherein a logical line, through which a packet addressed to the correspondent node from the mobile network node is transferred to the home agent, is configured by combining lines of the plurality of communication.

6. A mobile router in a data communication system comprising a home agent and a mobile router, the mobile router comprising:

a plurality of communication equipment of a communication service containing same or different types of services;

a control table which stores a plurality of addresses each respectively assigned to one of the plurality of communication equipment, and respective route information of the plurality of communication equipment, such that respective address and route information are associated with each other; and a transferor that receives a packet, selects usable communication equipment based on the control table, and transfers the packet to the home agent, wherein a logical line, through which the mobile router and the home agent communicate to each other, is configured by combining lines of the plurality of communication equipment.

7. A mobile router in a data communication system comprising a home agent, a correspondent node capable of communicating with the home agent, a mobile router, and a mobile network node capable of communicating with the mobile router, the mobile router comprising:

a plurality of communication equipment which communicate with the home agent;

a control table which stores route information containing addresses respectively assigned to the plurality of communication equipment; and a transferor which receives a packet from the mobile network node addressed to the correspondent node, selecting at least one of the communication equipment based on information of the control table, and transfers the packet to the home agent, wherein a logically multiplexed line, through which a packet addressed to the correspondent node from the mobile network node is transferred to the home agent, is configured by combining lines of the plurality of communication equipment.

8. The mobile router according to claim 6, further comprising:

a detector that detects a change in connection status of the communication equipment currently-in-use; and a notifier that notifies the home agent of the change in connection status and an address assigned to the communication equipment.

9. A home agent in a data communication system comprising a home agent and a mobile router, the home agent comprises:

an address identifier that identifies an address assigned to usable communication equipment among a plurality of communication equipment of a communication service containing same or different types of services of the mobile router;

a control table which stores the identified address and route information of the address, such that the address and the route information are associated with each other; and a packet receiver that receives a packet, selects an address based on information of the control table, and transfers the packet to the address, wherein a logical line, through which the home agent communicates with the mobile router, is configured by combining lines of the plurality of communication equipment.

10. The home agent according to claim 9, further comprising:

an updater that updates the information of the control table that manages an address of the communication equipment of the mobile router, based on a change in connection status with the mobile router and notification of the address assigned to the communication equipment.

11. A non-transitory computer-readable medium storing a program for execution by a processor-controlled mobile router in a data communication system comprising a home agent and a mobile router, the program causing the mobile router to function as a plurality of communication equipment of a communication service containing a same or different types of services;

to function to receive a packet, select usable communication equipment based on a control table which stores a plurality of addresses each respectively assigned to one of the plurality of communication equipment, and respective route information of the communication equipment, such that respective address and route information are associated with each other, and transfers the packet to the home agent, wherein a logical line, through which the mobile router and the home agent communicate to each other, is configured by combining lines of the plurality of communication equipment.

12. The non-transitory computer-readable medium according to claim 11, wherein the program causes the mobile router to detect a change in connection status of the communication equipment currently-in-use; and notify the home agent of the change in connection status and an address assigned to the communication equipment.

13. A non-transitory computer-readable medium storing a program for execution by a processor-controlled home agent in a data communication system comprising a home agent and a mobile router, the program causing the home agent to identify an address assigned to a communication equipment which is usable among a plurality of communication equipment of a communication service containing same or different types of services;

and to receive a packet, select an address based on information of a control table which stores the identified address and route information of the address, such that the address and the route information are associated with each other, and transfer the packet to the address, thereby configuring a logical line by combining lines of the plurality of communication equipment, and communicating with the mobile router through this line.

14. The non-transitory computer-readable medium according to claim 13, characterized in that the program causes the home agent to update information in the control table that manages an address of the communication equipment of the mobile router, based on notification of a change in connection status and an address assigned to the communication equipment.

* * * * *

UNITED STATES PATENT AND TRADEMARK OFFICE
CERTIFICATE OF CORRECTION

PATENT NO. : 8,565,227 B2
APPLICATION NO. : 10/526725
DATED : October 22, 2013
INVENTOR(S) : Nakata et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1838 days.

Signed and Sealed this

Fifteenth Day of September, 2015

Michelle K. Lee
*Director of the United States Patent and Trademark Office*